United States Patent
Penilla et al.

(10) Patent No.: US 10,223,134 B1
(45) Date of Patent: *Mar. 5, 2019

(54) METHODS AND SYSTEMS FOR SENDING CONTEXTUAL RELEVANT CONTENT TO CONNECTED VEHICLES AND CLOUD PROCESSING FOR FILTERING SAID CONTENT BASED ON CHARACTERISTICS OF THE USER

(71) Applicant: Emerging Automotive, LLC, Los Altos, CA (US)

(72) Inventors: Angel A. Penilla, Sacramento, CA (US); Albert S. Penilla, Sunnyvale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/290,430

(22) Filed: Oct. 11, 2016

Related U.S. Application Data

(63) Continuation of application No. 14/275,569, filed on May 12, 2014, now Pat. No. 9,467,515, which is a
(Continued)

(51) Int. Cl.
*H02J 7/00* (2006.01)
*G06F 9/451* (2018.01)
(Continued)

(52) U.S. Cl.
CPC ............ *G06F 9/451* (2018.02); *G06F 3/0482* (2013.01); *G06F 3/0484* (2013.01);
(Continued)

(58) Field of Classification Search
CPC ....................................................... Y02T 19/14
(Continued)

(56) References Cited

U.S. PATENT DOCUMENTS 3,690,397 A 9/1972 Parker
3,799,063 A 3/1974 Reed
(Continued)

*Primary Examiner* — Yalkew Fantu

(57) ABSTRACT

Methods and systems are provided. One method includes receiving, by a server, data from a vehicle over a wireless network. The data includes information usable to identify a user account. The user account being accessible by the server to identify a profile of a user, and the profile of the user includes preferences of the user and learned behavior of the user. The method further includes receiving, by the server, a geo-location of the vehicle for a time of day. Then, identifying, by the server, supplemental content that is available for sending to the vehicle based on the geo-location of the vehicle. The method includes filtering, by the server, the supplemental content based on a contextual analysis of one or more preferences of the user, the learned behavior of the user, the time of day and the geo-location of the vehicle. Said filtering eliminates sending supplemental content to the vehicle for display that is predicted to have a likelihood of not being used or preferred by the user based on said contextual analysis. The method includes sending, by the server, supplemental content to the vehicle for display to a screen or output via a speaker of the vehicle, the supplemental content that is sent is not filtered out from being sent to the vehicle.

20 Claims, 47 Drawing Sheets

Related U.S. Application Data continuation of application No. 13/784,823, filed on Mar. 5, 2013, now Pat. No. 9,285,944, and a continuation-in-part of application No. 13/452,882, filed on Apr. 22, 2012, now Pat. No. 9,123,035, and a continuation of application No. 13/842,158, filed on Mar. 15, 2013, now Pat. No. 9,229,905.

(60) Provisional application No. 61/745,729, filed on Dec. 24, 2012, provisional application No. 61/478,436, filed on Apr. 22, 2011.

(51) Int. Cl.

| | |
|---|---|
| G06F 3/0482 | (2013.01) |
| G06F 3/16 | (2006.01) |
| G06F 3/0481 | (2013.01) |
| G06F 3/0488 | (2013.01) |
| G06F 3/0484 | (2013.01) |
| G09G 5/14 | (2006.01) |
| G06F 3/14 | (2006.01) |
| H04W 4/04 | (2009.01) |

(52) U.S. Cl.
CPC ...... *G06F 3/04817* (2013.01); *G06F 3/04845* (2013.01); *G06F 3/04883* (2013.01); *G06F 3/1454* (2013.01); *G06F 3/167* (2013.01); *G09G 5/14* (2013.01); *H04W 4/046* (2013.01); *G09G 2354/00* (2013.01); *G09G 2380/10* (2013.01)

(58) Field of Classification Search
USPC ............ 320/109, 107, 104; 180/65.1, 65.21; 307/10.1; 701/22
See application file for complete search history.

(56) References Cited

U.S. PATENT DOCUMENTS

| | | | |
|---|---|---|---|
| 3,867,682 A | 2/1975 | Ohya | |
| 4,052,655 A | 10/1977 | Vizza | |
| 4,102,273 A | 7/1978 | Merkle et al. | |
| 4,132,174 A | 1/1979 | Ziegenfus et al. | |
| 4,162,445 A | 7/1979 | Campbell | |
| 4,309,644 A | 1/1982 | Reimers | |
| 4,347,472 A | 8/1982 | Lemelson | |
| 4,383,210 A | 5/1983 | Wilkinson | |
| 4,389,608 A | 6/1983 | Dahl et al. | |
| 4,405,891 A | 9/1983 | Galloway | |
| 4,433,278 A | 2/1984 | Lowndes et al. | |
| 4,450,400 A | 5/1984 | Gwyn | |
| 4,532,418 A | 7/1985 | Meese | |
| 4,789,047 A | 12/1988 | Knobloch | |
| 4,815,840 A | 3/1989 | Benayad-Cherif et al. | |
| 5,049,802 A | 9/1991 | Mintus et al. | |
| 5,121,112 A | 6/1992 | Nakadozono | |
| 5,132,666 A | 7/1992 | Fahs | |
| 5,184,058 A | 2/1993 | Hesse | |
| 5,202,617 A | 4/1993 | Nor | |
| 5,297,664 A | 3/1994 | Tseng et al. | |
| 5,306,999 A | 4/1994 | Hoffman | |
| 5,315,227 A | 5/1994 | Pierson | |
| 5,327,066 A | 7/1994 | Smith | |
| 5,343,970 A | 9/1994 | Severinsky | |
| 5,422,624 A | 6/1995 | Smith | |
| 5,434,781 A | 7/1995 | Alofs | |
| 5,441,122 A | 8/1995 | Yoshida | |
| 5,449,995 A | 9/1995 | Kohchi | |
| 5,487,002 A | 1/1996 | Diler et al. | |
| 5,488,283 A | 1/1996 | Dougher et al. | |
| 5,492,190 A | 2/1996 | Yoshida | |
| 5,548,200 A * | 8/1996 | Nor ..................... | B60L 11/184 320/106 |
| 5,549,443 A | 8/1996 | Hammerslag | |
| 5,555,502 A | 9/1996 | Opel | |
| 5,563,491 A | 10/1996 | Tseng | |
| 5,585,205 A | 12/1996 | Kohchi | |
| 5,594,318 A | 1/1997 | Knor | |
| 5,595,271 A | 1/1997 | Tseng | |
| 5,596,258 A | 1/1997 | Kimura et al. | |
| 5,612,606 A | 3/1997 | Guimarin et al. | |
| 5,627,752 A | 5/1997 | Buck et al. | |
| 5,636,145 A | 6/1997 | Gorman et al. | |
| 5,642,270 A | 6/1997 | Green et al. | |
| 5,666,102 A | 9/1997 | Lahiff | |
| 5,691,695 A | 11/1997 | Lahiff | |
| 5,694,019 A | 12/1997 | Uchida et al. | |
| 5,701,706 A | 12/1997 | Kreysler et al. | |
| 5,736,833 A | 4/1998 | Farris | |
| 5,760,569 A | 6/1998 | Chase, Jr. | |
| 5,778,326 A | 7/1998 | Moroto et al. | |
| 5,790,976 A | 8/1998 | Boll et al. | |
| 5,892,598 A | 4/1999 | Asakawa et al. | |
| 5,916,285 A | 6/1999 | Alofs et al. | |
| 5,974,136 A | 10/1999 | Murai | |
| 5,998,963 A | 12/1999 | Aarseth | |
| 6,014,597 A | 1/2000 | Kochanneck | |
| 6,049,745 A | 4/2000 | Douglas et al. | |
| 6,067,008 A | 5/2000 | Smith | |
| 6,081,205 A | 6/2000 | Williams | |
| 6,085,131 A | 7/2000 | Kim | |
| 6,151,539 A | 11/2000 | Bergholz et al. | |
| 6,175,789 B1 | 1/2001 | Beckert et al. | |
| 6,225,776 B1 | 5/2001 | Chai | |
| 6,234,932 B1 | 5/2001 | Kuroda et al. | |
| 6,236,333 B1 | 5/2001 | King | |
| 6,252,380 B1 | 6/2001 | Koenck | |
| 6,301,531 B1 | 10/2001 | Pierro | |
| 6,307,349 B1 | 10/2001 | Koenck et al. | |
| 6,330,497 B1 | 12/2001 | Obradovich et al. | |
| 6,330,499 B1 | 12/2001 | Chou et al. | |
| 6,370,475 B1 | 4/2002 | Breed et al. | |
| 6,373,380 B1 | 4/2002 | Robertson et al. | |
| 6,416,209 B1 | 7/2002 | Abbott | |
| 6,434,465 B2 | 8/2002 | Schmitt et al. | |
| 6,456,041 B1 | 9/2002 | Terada et al. | |
| 6,466,658 B2 | 10/2002 | Schelberg, Jr. et al. | |
| 6,480,767 B2 | 11/2002 | Yamaguchi | |
| 6,487,477 B1 | 11/2002 | Woestman et al. | |
| 6,498,454 B1 | 12/2002 | Pinlam | |
| 6,511,192 B1 | 1/2003 | Henion | |
| 6,586,866 B1 | 7/2003 | Ikedo | |
| 6,614,204 B2 | 9/2003 | Pellegrino et al. | |
| 6,629,024 B2 | 9/2003 | Tabata | |
| 6,727,809 B1 | 4/2004 | Smith | |
| 6,741,036 B1 | 5/2004 | Ikedo | |
| 6,765,495 B1 | 7/2004 | Dunning et al. | |
| 6,789,733 B2 | 9/2004 | Terranova | |
| 6,794,849 B2 | 9/2004 | Mori et al. | |
| 6,850,898 B1 | 2/2005 | Murakami | |
| 6,915,869 B2 | 7/2005 | Botti | |
| 6,922,629 B2 | 7/2005 | Yoshikawa et al. | |
| 6,937,140 B1 | 8/2005 | Outslay | |
| 6,940,254 B2 * | 9/2005 | Nagamine ............... | G06Q 30/06 320/109 |
| 7,013,205 B1 | 3/2006 | Hafner | |
| 7,039,389 B2 | 5/2006 | Johnson, Jr. | |
| 7,084,781 B2 | 8/2006 | Chuey | |
| 7,201,384 B2 | 4/2007 | Chaney | |
| 7,269,416 B2 | 9/2007 | Guthrie et al. | |
| 7,289,611 B2 | 10/2007 | Iggulden | |
| 7,376,497 B2 | 5/2008 | Chen | |
| 7,379,541 B2 | 5/2008 | Iggulden et al. | |
| 7,402,978 B2 | 7/2008 | Pryor | |
| 7,532,965 B2 | 5/2009 | Robillard | |
| 7,565,396 B2 | 7/2009 | Hoshina | |
| 7,630,802 B2 | 12/2009 | Breed | |
| 7,650,210 B2 | 1/2010 | Breed | |
| 7,674,536 B2 | 3/2010 | Chipchase | |
| 7,683,771 B1 | 3/2010 | Loeb | |
| 7,693,609 B2 | 4/2010 | Kressner et al. | |
| 7,698,078 B2 | 4/2010 | Kelty et al. | |
| 7,740,092 B2 | 6/2010 | Bender | |

(56) References Cited

U.S. PATENT DOCUMENTS

| | | |
|---|---|---|
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,050,815 B2 * | 11/2011 | Perry ............... B60R 25/2018 340/425.5 |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0035741 A1 * | 2/2005 | Elder ............... B60L 3/0046 320/116 |
| 2005/0044245 A1 | 2/2005 | Hoshina |
| 2005/0110460 A1 * | 5/2005 | Arai ............... B60L 3/0046 320/116 |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olsen et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0304101 A1 * | 12/2009 | LoPorto ............... H04L 27/2626 375/260 |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0037057 A1 * | 2/2010 | Shim ............... H04L 63/0823 713/171 |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichal et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |

(56) References Cited

U.S. PATENT DOCUMENTS

| | | |
|---|---|---|
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Tucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0028255 A1 * | 1/2014 | Brimacombe ...... B60L 11/1824 320/109 |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

* cited by examiner

Manufacturer API    130
Class:
HVAC

↙1950

1954 — Data declarations:
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 — Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

104
```
        ─EZ FUN HVAC APP
1972
    ─updateTemp(80,76);
    {
            setLeftTo = 80;
            setRightTo = 76;
            theCurrentTempR = getTempRight(temp);
            theCurrenTempL = getTempLeft(temp);
            if setLeftTo != theCurrentTempL
            {
                    setTempLeft(left);
            }
            if setRightTo != theCurrentTempR
            {
                    setTempRight(right);
            }
            updateDisplay()

If isError()
            {
                    return isError();
            }

Learned Behavior Vehicle Application

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Learned Behavior Vehicle Application

Learned Behavior Logic Assumptions and Deductive Reasoning

Check the user's calendar and adjust assumptions based on when the first meeting is, the meeting's location, how long it will take to get the vehicle's temperature and defrosting if applicable completed and if the user needs to re-fuel before arriving at work.

User most likely will start the engine between 803am and 805am

If the temperature is in the 30s inside the vehicle, the user will most likely heat the vehicle to the mid 70s to 80 degrees. Also the user is not likely to use the AC.

If there is ice present on the windshield, the user will most likely activate defrosting measures for 7 minutes before departure.

User usually drives between 15 and 18 miles

The user usually starts the vehicle in the afternoon between 5:05 and 5:10PM

If the temperature is in the mid 70s, the user usually activates the AC to achieve a temperature of 65 degrees The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

Vehicle Interaction Mode Wizard

Click all that apply

Vehicle or Computing device / output GUI

| | | | |
|---|---|---|---|
| | | | I like large icons |
| I get distracted easily | Technology scares me | Please don't change without telling me | I check the weather often |
| I am a multitasker | I love technology | I like change | I love music |
| I don't like changing settings | I am hard of hearing | I do not use social media | I love coupons and deals |
| I like to have control of my settings | I use glasses | I love social media | Wait to alert me |
| | Smaller but more icons please | | |
| | Keep me up to date instantly (notifications) | | |
| | My car's vitals are important | | |

The computer has determined that SENIOR MODE is best

APPLY?

BACK

FIG. 29A

Vehicle Interaction Mode Wizard

Click all that apply

- I like to have control of my settings *(selected)*
- I don't like changing settings
- I get distracted easily
- I like large icons
- I use glasses
- I am hard of hearing
- Technology scares me
- Smaller but more icons please *(selected)*
- I love social media *(selected)*
- I do not use social media
- Please don't change without telling me
- Keep me up to date instantly (notifications) *(selected)*
- Wait to alert me
- I love coupons and deals *(selected)*
- I check the weather often *(selected)*
- My car's vitals are important
- I am a multitasker *(selected)*
- I love technology *(selected)*
- I like change *(selected)*
- I love music *(selected)*

The computer has determined that INFORMED MODE is best

APPLY?

BACK

Vehicle or Computing device / output GUI

METHODS AND SYSTEMS FOR SENDING CONTEXTUAL RELEVANT CONTENT TO CONNECTED VEHICLES AND CLOUD PROCESSING FOR FILTERING SAID CONTENT BASED ON CHARACTERISTICS OF THE USER

CLAIM OF PRIORITY

The present application is a continuation application of U.S. application Ser. No. 14/275,569, filed on May 12, 2014, entitled "Methods and Systems for Sending Contextual Content to Connected Vehicles and Configurable Interaction Modes for Vehicle Interfaces," which is a continuation of U.S. application Ser. No. 13/784,823, filed on Mar. 5, 2013, entitled "Methods and Systems for Defining Custom Vehicle User Interface Configurations and Cloud Services for Managing Applications for the User Interface and Learning Setting Functions," which claims priority to U.S. Provisional Patent Application No. 61/745,729, filed on Dec. 24, 2012, and entitled "Methods and Systems For Electric Vehicle (EV) Charging, Charging Systems, Internet Applications and User Notifications", and which are herein incorporated by reference.

U.S. application Ser. No. 14/275,569 is a continuation-in-part of U.S. application Ser. No. 13/452,882, filed Apr. 22, 2012, and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

U.S. application Ser. No. 14/275,569 is a continuation in part of U.S. application Ser. No. 13/842,158, filed on Mar. 15, 2013, and entitled "Methods and Systems for Defining Vehicle User Profiles and Managing User Profiles via Cloud Systems and Applying Learned Settings to User Profiles," which is herein incorporated by reference

FIELD OF THE EMBODIMENTS

The present invention relates to systems and methods for customizing vehicle user interfaces of connected vehicles, setting configurations and exchanges of information with cloud-based processing systems.

BACKGROUND

Vehicles, such as motorized vehicles and electric vehicles have been around for some time. Vehicles provide a way that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles.

It is in this context that embodiments of the invention arise.

SUMMARY

The methods, systems and apparatus include electronics and software of vehicles that drive display devices in vehicles and communicate wirelessly with Internet services. Some embodiments define method and systems for enabling customization of displays of a vehicle. The displays can be customized based on a user profile, and can include settings based on learned preferences. In one embodiment, a learned preference is one that identifies a like, or acceptance, or comfort level, or tendency, or pattern, or behavior for or toward a type of preference or setting or action, or content. The displays and outputs of the vehicle are also configured to output or display supplemental content obtained for the user profile, based on contextually relevant information data and/or state.

The contextual relevance can be based on information associated with the geo-location of the vehicle, the state/condition of the vehicle, learned preferences, information in user online accounts, information from social networks, information from patterns of use by the user, information based on the time of day, week, month or based on when certain inputs or data that is requested or looked up by the user, or combinations of one or more of the foregoing. The intersection or analysis of these information points allows for the system to provide contextually relevant information to the vehicle, when the user needs the information and/or when it is anticipated that the information will be consumed, used, accessed, viewed, or desired. In one embodiment, this processing acts to filter out information that is not useful or relevant for the particular time, circumstances, state of the vehicle, geographic location, time of day, etc., and as a result, reduced or un-needed or un-desired information is provided or sent to the vehicle for presentation, which beneficially acts to reduce driver distraction.

Further, the vehicle can be customized or the user account/profile can be customized for vehicles to allow interaction modes to be used. Interaction modes define the way of accessing input, displaying a look and feel, providing content, setting simplicity or complexity of user interface inputs, controls and settings, and defining skins and modes of interaction. In one embodiment, this customization is transferred, sent, enabled, or added to the user interfaces, settings, controls, and instrument panels, dashboards and input controls of the vehicle. By enabling custom levels of customization, vehicles can be configured or customized over time to the way each user is most comfortable, thus reducing distracted driving.

In one embodiment, a method includes receiving, by a server, data from a vehicle over a wireless network. The data includes information usable to identify a user account. The user account being accessible by the server to identify a profile of a user, and the profile of the user includes preferences of the user and learned behavior of the user. The method further includes receiving, by the server, a geo-location of the vehicle for a time of day. Then, identifying, by the server, supplemental content that is available for sending to the vehicle based on the geo-location of the vehicle. The method includes filtering, by the server, the supplemental content based on a contextual analysis of one or more preferences of the user, the learned behavior of the user, the time of day and the geo-location of the vehicle. Said filtering eliminates sending supplemental content to the vehicle for display that is predicted to have a likelihood of not being used or preferred by the user based on said contextual analysis. The method includes sending, by the server, supplemental content to the vehicle for display to a screen or output via a speaker of the vehicle, the supplemental content that is sent is not filtered out from being sent to the vehicle.

In one example, an interaction mode defines one or more settings of a vehicle that can be customized for user interaction. For a particular interaction mode, settings within settings may also be configured. In still other implementations, interaction modes can be defined, selected and customized via any connected device over the Internet or through the vehicle computer and interfaces inputs. In some embodiments, the interaction modes can be applied to the vehicle dynamically, so such as when the interaction mode is specific to a particular driver profile. In such embodiments, the interaction mode can be set once the user logs in to the vehicle, is identified using biometrics, synced via wireless keys or detection, pairing, or the like. As the user makes use of the inputs and settings provided the interaction mode, refinements can occur based on learned preferences.

In one embodiment, an interaction mode can define a single setting, or a plurality of settings. If a plurality of settings is defined for one interaction mode, individual settings of that interaction mode may be modified by the user or automatically in view of learned patterns, learned behavior, or the like. In some embodiments, the learned patterns can be identified from a collection of similar users. For example, if other users are registered with a cloud service for connected vehicles, typical settings, changes, control modifications, preferences, demographic preferences, regional/cultural preferences, language preferences, etc. can be mined to identify patterns. In one embodiment, these patterns can be mined without requiring the actual identify of a user, so that privacy protection can be maintained for all user accounts.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without explicit input, request or programming by a user at that time.

Overtime, machine learning can be used to reinforce learned behavior, which can provide weighting to certain inputs.

In one embodiment, a method includes receiving, at a server, a geo-location of a vehicle. The method further includes receiving from time to time, at the server, vehicle condition. The method includes identifying a user account for the vehicle. The user account includes preferences associated with a profile of a user, and the preferences include at least one learned preference. The method also includes sending data to the vehicle. The data is for presentation on a display screen or output via an audio system of the vehicle. The data is selected based on a context of the geo-location and the vehicle condition or the preferences associated with the profile of the user. Interaction modes can be used to define what information is displayed and when information is provided to the display screen.

In one implementation, the context is used to identify when information associated with the geo-location, or information associated with the vehicle condition, or information associated with the profile of the user for processing when and when not to enable the data to be sent to the vehicle.

In one implementation, data for information associated with the geo-location is sent to the vehicle when the profile of the user identifies a likelihood for consumption of the information associated with the geo-location.

In one implementation, the likelihood for consumption of the information is based on explicit preferences in the profile or the at least one learned preference, or based on user data obtained from one or more internet services.

In one implementation, the geo-location of the vehicle is one or more geo-locations that can be different based on geographic changes or movements in position of the vehicle at particular times or over time.

In one implementation, the data sent to the vehicle and presented on the display screen is configured in accordance with an interaction mode setting, the interaction mode setting defines a style of user interfaces of the display screen of the vehicle, the style of user interfaces of the display screen identify one or more of text format, gauges, clutter level, skins, wallpaper, styles, design, or voice input/output display features.

In one implementation, the preferences associated with the profile of the user include a setting for a level of information items to be displayed on the display screen of the vehicle, wherein recommendation data is sent to the vehicle for surfacing on the display screen based on a contextual analysis of the geo-location at a particular time, at least one aspect of the vehicle condition or at least one of the preferences associated with the profile of the user, such that at least one aspect of one of the preferences is defined or associated with data obtained from an internet service.

In one implementation, the preferences associated with the profile of the user include a setting for a level of information items to be displayed on the display screen of the vehicle, wherein recommendation data is sent to the vehicle for surfacing on the display screen based on a contextual analysis of the geo-location at a particular time and at least one of the preferences associated with the profile of the user, and wherein the at least one aspect of one of the preferences is data obtained from an internet service.

In one implementation, the recommendation data is not sent when a rule of an interaction mode identifies that the sending should not occur at least at a particular time, or based on a condition, or based on a conflict with a learned pattern, or based on notifications limitations for the interaction mode, or based on a clutter level setting, or based on a combination of rules.

In one implementation, recommendation data is sent to the vehicle for surfacing on the display screen based on a contextual analysis of the geo-location at a particular time and at least one of the preferences associated with the profile of the user, which include the at least one learned preference, wherein the at least one aspect of one of the preferences is data obtained from an internet service, wherein data obtained from the internet service is sent to the vehicle along or in addition to the recommendation data, the data obtained from the internet service includes data or instructions for causing at least the display screen of the vehicle to be populated with content from the internet service automatically or automatically launch an application by the vehicle for rendering specific supplemental content on the display screen.

In one implementation, the at least one aspect of one of the preferences is data obtained from an internet service, wherein the internet service is one of a website, or a calendar, or social network website, or a news site, or a dictionary site, or mapping service, or a to-do list, or a phone list, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet.

In one implementation, the preferences associated with the profile of the user include a setting for an interaction mode that defines how information items are to be displayed and when information items are to be presented on the display screen of the vehicle, wherein the interaction mode is customizable or customized for the user account.

In one implementation, the interaction mode provides a range of modes that extend from simple modes that include less information items displayed on the display screen and reduce distractive notifications to intense modes that increase a number (e.g., or level, i.e., some number or grouping or selection of items) of information items displayed on the screen and increase notifications, or custom hybrids modes that selection of a level of information items and a level of notifications to be sent to the display screen, or a learning mode that enables dynamic changes to the information items and notifications based on use over time and predictive use, or combinations of simple, intense, hybrid and learning modes.

In one implementation, an interaction mode is further configured to dynamically change a display associated with physical inputs of the vehicle, wherein the physical inputs can change in function, or complexity, or display, or tone, or color, or font, or text, or icons, or combinations thereof to be consistent with the interaction mode.

In one embodiment, a method is provided. The method includes receiving geographic locations of a vehicle over time, at a server configured to execute cloud services for a user account. The user account identifies the vehicle, and the user account further includes a profile for a user of the vehicle. The method also includes accessing the profile to identify a history of use of the vehicle for the user. The method also includes generating, from time to time, a plurality of learned preferences that are associated to the profile of the user by examining the history of use of the vehicle for the user. The history of use of the vehicle includes geographic locations of the vehicle, inputs made to a user interface of the vehicle at particular times or when the vehicle is at particular geographic locations. The method also includes, for a current geographic location and for a current time, identifying supplemental content for display on the user interface. The supplemental content is contextually related and filtered based on the current geographic location of the vehicle, the current time, and the learned preferences. Then, sending the supplemental content to the vehicle over a wireless network. The supplemental content is configured for display on the user interface of the vehicle; the method is executed by a processor.

In one implementation, the user interface of the vehicle is integrated in one or more display screens of the vehicle, the one or more display screens being configured to display a level of information items based on an interaction mode.

In one implementation, settings of the interaction mode define a style of user interfaces of the display screens of the vehicle, the style of user interfaces of the display screen identify one or more of text format, text size, icon types, simplicity of interface features, types of gauges, clutter levels, skins, wallpaper, styles, designs, colors, and/or voice input/output display features.

In one implementation, some of the supplemental content includes identification of goods or services proximate to at least one of the geographic locations of the vehicle, the goods or services identified being filtered to include goods or services predicted to be of interest for display based on examination of the profile of the user account, and the profile of the user account further includes data regarding user preferences and context information regarding likelihood of interest for goods or services at other times similar to a current time.

In one embodiment, a method is provided that includes receiving a request to access a user account of a user for a vehicle. The user account providing access to cloud services. The cloud services are accessible via one or both of a computing device or a vehicle computer. The method includes providing data for display of a plurality of preferences associated with interacting with and receiving information from user interface systems of the vehicle. The method further includes receiving selections of at least two of the plurality of preferences. And, determining an interaction mode for the vehicle based on the received selections. The interaction mode defines a level of information items to be displayed on a screen of the vehicle and defining an intensity of interactive notifications to be received at the vehicle for display on the screen of the vehicle. The method also includes sending configuration settings to the vehicle. The configuration settings are used to implement the interaction mode on the vehicle when the user account of the user is active on the vehicle.

In one implementation, the method further includes detecting interaction over time with interaction items defined by the level of interaction items. The interactions are analyzed to learn patterns or predict future interactions, and adjusting settings of the interaction mode based on the learned patterns or predicted future interactions, such that the interaction mode becomes custom for the user account. The method includes, based on the interaction mode, identifying data to send to the vehicle for display or instructions for launching applications or displaying information on the display screen of the vehicle.

One method includes receiving a request to access a server that provides logic for defining a custom user interface for a vehicle associated with a user account. The method also includes receiving selection options for associating applications to the custom user interface. The applications including interfaces associated with functionalities of the vehicle and interfaces for connecting with internet accessible services. The method includes receiving arrangement selections for placing at least one of the interfaces at a user defined location of a display screen of the vehicle. The selection options of the associated applications and the arrangement selections defining the custom user interface for the user account. The method further includes communicating the custom user interface to memory and electronics of the vehicle over a wireless internet connection. The custom user interface is to be rendered on the display screen of the vehicle.

Other examples include methods for providing access to cloud services over the Internet for customizing a user interface of a vehicle. The method includes providing selection options to identify a vehicle type among a plurality of vehicle types, where each vehicle type is associated with a system component native to the vehicle type. The system component provides native interfaces for the vehicle type. The method includes identifying a plurality of applications available for the vehicle type. Each of the applications provided with predefined code for communicating with at least one control interface of the system component. The method includes identifying an application from the plurality of applications. The application providing an app interface to be added to the user interface of the vehicle. The method generates a custom configuration of the user interface for the vehicle type that includes native interfaces for components native to the vehicle type and the app interface for the application. The custom configuration is defined to render or set at least one screen or part of one screen of the user interface for display on a vehicle display. The custom configuration is wirelessly transferred to memory and electronics of the vehicle from the database, from cloud processing (e.g., servers/storage having access via the Internet). The custom configuration is saved to a user account in the database interfaced over the Internet with the cloud services, the method being executed by a processor. The custom configuration can be updated from time to time and can be transferred to other vehicles.

In some embodiments, the method includes receiving a request to modify the custom configuration; enabling changes to the identified application, the changes including adding additional applications or removing the application; updating the custom configuration with the changes; saving the custom configuration to the user account.

In some embodiments, the method includes enabling identification of a second vehicle for the user account, the second vehicle having a second vehicle type.

In some embodiments, the method includes processing a request to transfer the custom configuration to the second vehicle, the processing of the request includes, automatically updating the system component for the second vehicle type, the system component of the second vehicle including more or less native interfaces based on the second vehicle type as defined by a manufacturer of the second vehicle; and determining if the application is compatible for the second vehicle type, and providing options to select an update for the application in response to processing the request to transfer the custom configuration when the application is not compatible for the second vehicle type.

In some embodiments, the manufacturer of the vehicle and the second vehicle is either the same or different.

In some embodiments, the method includes processing a request to use the custom configuration on the second vehicle, the processing of the request includes, receiving login credentials for the user account to enable use of the custom configuration at the second vehicle automatically updating the system component for the second vehicle type, the system component of the second vehicle including more or less native interfaces based on the second vehicle type as defined by a manufacturer of the second vehicle; and determining if the application is compatible for the second vehicle type, and if the application is not compatible for the second vehicle type, either omitting the application from the custom configuration or providing a replacement application for the application with or without user input.

In some embodiments, the method includes maintaining a database of user accounts, each user account having one or more custom configurations of user interfaces; processing a request to use a second custom configuration on the vehicle, the request being received from the vehicle upon entering credentials to access a second user account; transferring the second custom configuration to the vehicle for use while the credentials of the second user account are active on the vehicle, wherein a verified request to use the second custom configuration terminates use of the custom configuration in favor of the second custom configuration.

In some embodiments, the method includes terminating a session of use of the custom configuration on the vehicle, termination of the session acts to, reset the display of the vehicle to provide the user interface with system interfaces that are default-set by the manufacturer of the vehicle; or set a second custom configuration for a second user account.

In some embodiments, the vehicle display of the vehicle includes any one or more of a main dashboard display, or a center console display, or a combined main dashboard and center console display, or a glass surface, or a windshield display, or a window display, or a touch surface display, or a headrest display, or a movable display, or a wireless display, or a wire-connected display, or combinations of one or more thereof.

In some embodiments, the method includes receiving a request to make changes to add or remove applications from the custom configuration.

In some embodiments, the method includes enabling a user interface tool to arrange some of the system components and app components of the application on a display, the arranging includes defining positional locations for graphical user interface (GUI) items of the custom configuration, the user interface tool being provided via a website of the cloud processing that manages the user account.

In some embodiments, the method includes enabling linking of one or more applications executed on a mobile device to be presented on the vehicle display of the vehicle in accordance with the custom configuration, the linking enabled upon pairing the mobile device with electronics of the vehicle. In one example, the applications from the mobile device can be presented in a split screen region of the vehicle display. The split screen can allow presentation of apps and content from the mobile device or cloud services of the mobile device, along with services and apps of the vehicle. In this implementation, the split screen provides for a seamless presentation of data from devices of the user and data managed by cloud services or programs of the vehicle.

In another embodiment, split screen presentation allows mirroring of content generated by the mobile device on screens of the vehicle. In one configuration, restrictions on use can be applied by algorithms managed by the vehicle code or cloud code to enable safe driving. For instance, if the data of the mobile device requires interactivity that may cause distractions, such as texting, entering data by hand, gesturing, etc., such features may be disabled or a function can be provided to translate the entry to voice/audio output and voice input by the driver or occupants. In one embodiment, if a passenger is able to handle the input, the features may be enabled, provided the input is coming from a passenger seat. Logic in the vehicle can detect if a person is sitting in the vehicle, and voice authentication or video confirmation can be performed to determine if the person entering the data is a passenger. Thus, verification of the person entering data to user interface components can be made on the fly.

In some embodiments, the method includes receiving user input via the custom configuration; learning patterns of user input over time; automatically programming one or more components of the custom configuration based on the learned patterns of user input, automatic programming changing over time based on the received user input via the custom configuration and saved periodically to the user account in the database via a wireless connection to the Internet.

In some embodiments, the method includes automatically adjusting positional locations for graphical user interface (GUI) items of the custom configuration based on the learned patterns; and saving the adjustments to the user account, the user account being saved in a database that is interfaced over the Internet with cloud services that execute code using one or more processors.

In some embodiments, the programming of one or more components of the custom configuration includes automatically setting input based on times of day, or days of week, or dates of month, or times of year, or combinations thereof.

In some embodiments, the method includes associating biometrics to the user account, the biometrics being used to monitor use of the vehicle and determine if the custom configuration is enabled, or if a guest custom configuration should be enabled, or if public custom configuration should be enabled, the user account includes profile data defining when particular configurations should be enabled based on the biometrics.

In some embodiments, the custom configuration is saved to the user account in cloud storage having the database, and cloud processing provides communication with the vehicle over the Internet via wireless Internet communication.

In some embodiments, cloud processing provides a website interface or backend server or services interface to enable selection of the vehicle type and the application to define the custom configuration and also enables updates to the custom configuration to add, delete or update applications to be associated with the custom configuration.

In some embodiments, the code for the custom configuration is transferred to the vehicle upon receiving credentials to access the user account from the vehicle so as to associate the vehicle to the custom configuration, the association of the custom configuration to the vehicle being for a period of time.

In some embodiments, the period of time is for a session that remains until logged out of the user account, or a period of inactivity, or when biometrics detects use by other than a person associated with the user account, or a second user account logs in to define a new session with a second custom configuration of the second user account.

In some embodiments, vehicle electronics are programmed with a master account, the master account being provided access communication with cloud services over the Internet, the master account enabling use of the custom configuration with one or more restrictions.

In some embodiments, the restrictions include enabling, disabling or regulating system components of the vehicle, enabling or disabling certain applications of the custom configuration, wherein the restrictions being updateable over a website that enables remote configuration and monitoring of the vehicle using cloud services over the Internet for the master account, the master account enabling one or more guest accounts to be used on the vehicle, such that one or more custom configurations are usable on the vehicle during respective sessions.

In some embodiments, the method includes associating logins to the user account, the logins being used to determine if the custom configuration is enabled, or if a guest custom configuration should be enabled, or if public custom configuration should be enabled, the user account includes profile data defining which particular configurations should be enabled based on the logins, wherein the logins are made via the vehicle that communicates with cloud services via the Internet through a wireless link.

In some embodiments, the method includes saving use data of the vehicle for each login, the use data further being linked to automatic notifications, such that certain use data triggers an automatic notification to an administrator of the user account, the notifications including text notifications, phone call notifications, web notifications, smartphone notifications, social network notifications, or combinations thereof.

In some embodiments, biometrics include one or more of image data of a driver's face, a passenger's face, a finger print, a retina scan, a signature, a gesture, or combinations thereof.

In one embodiment, a method is provided. The method includes providing access to cloud services over the Internet for customizing a user interface of a vehicle. The method includes providing selection options to identify a vehicle type among a plurality of vehicle types, each vehicle type being associated with a system component native to the vehicle type, the system component providing native interfaces for the vehicle type. A plurality of applications are provided as available for the vehicle type, and each of the applications may be provided with predefined code for communicating with at least one control interface of the system component. The method includes defining a custom configuration of the user interface for the vehicle type that includes native interfaces for components native to the vehicle type and an app interface for an application added to the user interface of the vehicle. The custom configuration is defined to set or program at least one screen of the user interface for display on a vehicle display when the custom configuration is wirelessly transferred to memory and electronics of the vehicle from the database. The custom configuration is saved to a user account in a database interfaced over the Internet with the cloud services. The method further includes receiving user input via the custom configuration and learning patterns of user input over time. The method automatically programs one or more components of the custom configuration based on the learned patterns of user input. The automatic programming changes over time based on the received user input over time via the custom configuration. The changes to the automatic programming are saved periodically to the user account in the database via a wireless connection to the Internet. The method being executed by a processor.

In one embodiment, the custom configuration is generated using tools and programs made available on a website. The tools and programs may be executed by computers, such as computers of a data center to provide cloud based processing. The data centers can be distributed geographically and the communication to specific vehicles can be dynamically assigned to various geographic data centers, as the vehicles move around geographically.

BRIEF DESCRIPTION OF DRAWINGS

FIG. 19B describes one example of how stored data and function declarations may be compiled to provide intermediary access to a vehicle's computer controlling vehicle systems, in accordance with one embodiment.

FIG. 19C describes a set of computer readable and executable code that can be compiled together by a third party APP developer in the form of an APP, in accordance with one embodiment.

FIG. 22B describes how one of many types of inputs into an assumption and reasoning logic module can be compiled over time, in accordance with one embodiment.

FIG. 22C describes one example of what an assumption and reasoning logic module may produce using the data points collected on an ongoing basis in FIG. 22B, in accordance with one embodiment.

FIG. 22D describes an example list of decision the decision and action engine may take based on information provided by the assumption and reasoning logic module and sets of assumptions created, in accordance with one embodiment.

FIGS. 29A-29B illustrate examples of ways for selecting and interaction mode for a vehicle, where in descriptive statements can be selected that identify the likes, dislikes, preferences, tendencies, or other descriptive elements concerning information and content that may be preferred to a particular user, and methods for automatically determining in interaction mode based on the descriptive selections.

FIG. 37 illustrates an example of a car dashboard having interaction styles and screens and settings therefore, in accordance with one embodiment.

DETAILED EMBODIMENTS

Figure 1:
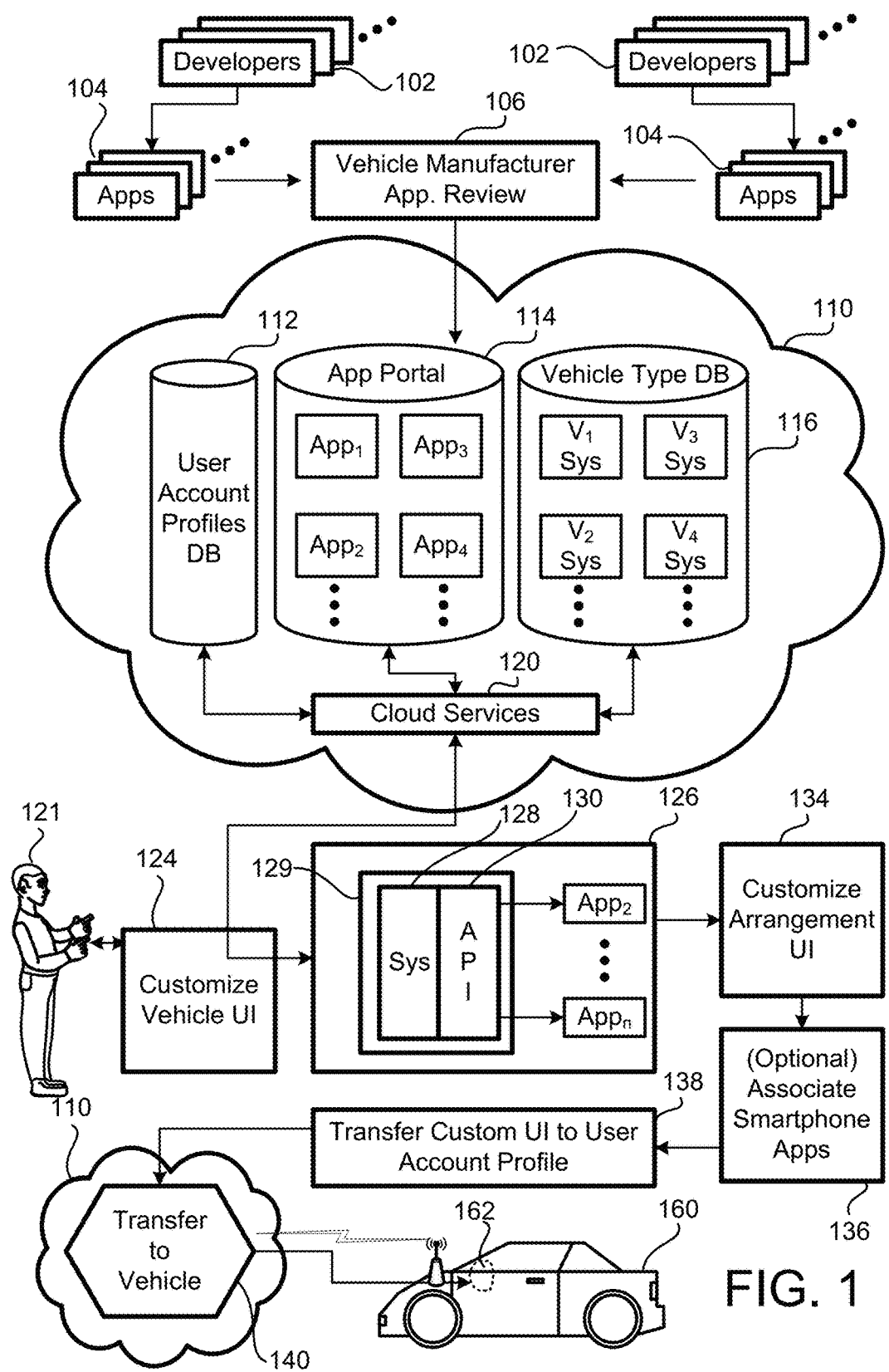
FIG. 1 shows a block diagram of a system for allowing developers to create applications for specific features and functionality to be integrated with one or more vehicles of vehicle databases, in accordance with one embodiment.

Embodiments of the present invention define methods, systems and apparatus for use in vehicles. The methods, systems and apparatus include electronics of vehicles that drive display devices in vehicles and communicate wirelessly with Internet services. Some embodiments define method and systems for enabling customization of displays of a vehicle. The displays can be customized based on a user profile, and can include settings based on learned preferences. The displays and outputs of the vehicle are also configured to output or display supplemental content obtained for the user profile, based on contextually relevant information.

The contextual relevance can be based on information associated with the geo-location of the vehicle, the state/condition of the vehicle, learned preferences, information in user online accounts, information from social networks, information from patterns of use by the user, information based on the time of day, week, month or based on when certain inputs or data is requested or looked up by the user. The intersection of these information points allows for the system (e.g., server, vehicle computer, user device, or combinations thereof) to provide contextually relevant information to the vehicle, when the user needs the information, so that distracted driving can be reduced.

Further, the vehicle can be customized or the user account/profile can be customized for vehicles to allow interaction modes to be used. Interaction modes define the way of access-input, look and feel, content, simplicity, complexity, skins, etc. of the user interfaces or controls of the vehicle. By enabling this level of customization, vehicles can be configured or customized over time to the way each user is most comfortable, thus reducing distracted driving. This customization can also extend to physical inputs, such as knobs, switches, buttons, dials, etc. The customization can be, in one embodiment, by adding display screens to physical inputs to define hybrid inputs. The display screens can be on the physical inputs or beside the inputs, so that the content displayed can change, thus changing the functionality of each or some or one of the physical input based on an interaction mode or setting. By providing this level of customization, distracted driving can be reduced, as the vehicle is customized to what the user is most comfortable with and can thus concentrate on driving.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use by the user, and automatically implements settings or programming to aspects of the user interface. The programming can include automatic programming at certain times, days, months, years, etc., and can be updated or molded over time as the user continues to use the vehicle UI.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the users saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile. The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

FIG. 1 shows a block diagram of a system for allowing developers to create applications for specific features and functionality to be integrated with one or more vehicles of vehicle databases. As shown, developers 102 create APPS 104 which is provided to a vehicle manufacturer 106. The APPS, in one embodiment, can be reviewed by the manufacturer to determine if they are save to play in the vehicle or can add restrictions. The restrictions can include, for example, allow access when the vehicle is in "park" mode, stopped, or access may be enabled by passengers. Passengers may be verified for presence, before enabling features for the passengers.

The applications provided to the vehicle manufacturers can also verify functionality and approve aspects of the application to be provided to an applications database. Users of vehicles, made by the manufacturer, can then access a website to select specific applications for addition to their vehicles. In one example, an Internet site 110 may therefore be managed by or for the vehicle manufacture. User account profiles 112 can be managed to provide access to APPS of an app portal 114. In other examples, the site 110 can be managed by third party companies, partner companies that cooperate with a vehicle manufacturers, and/or internet companies that provide some or all of the backend or front end services and cloud storage and processing.

The vehicle manufacturer may also manage or provide a vehicle type database 116, or provide data for the database 116. As the vehicle manufacturer makes updates to existing APPS, systems or adds new vehicles to its vehicle lines, the vehicle type database may also be updated accordingly. Updates can also be forwarded to the vehicle over time or can be automatically installed. The updates, in one embodiment, can provide new UI features, controls, etc. As shown, the app portal 114 may include a plurality of applications that have been developed by developers 102 and/or also approved by the manufacturer of the vehicle.

The app portal 114 can also include APPS that are produced by the vehicle manufacturer or applications that are made for the vehicle manufacturer. Cloud services 120 includes various modules that allow customers of the vehicle manufacturers to access the vehicle manufacturers cloud services, and provide interconnection to the vehicles in operation. In one example, a user 121 uses a computing device to access cloud services 120 in order to customize 124 the user interface of a vehicle. Broadly speaking, the user interface of a vehicle can include any display device in the vehicle.

In one embodiment, the display device can include displays that can provide instrumentation normally provided by standard vehicle indicators. The display device is not limited to a display normally placed in the center console, but can also any display screen. The display screen can also include that used to normally provide speed, and systems settings in the dash over the wheel. The display screen can also include other screens in a vehicle, such as those in passenger areas. Additionally, the user interface can also include display devices that display systems and auxiliary information, such as that provided by applications generated by developers 102, and/or applications produced by the vehicle manufacture. In one embodiment, the vehicle manufacturer will produce a software module for systems information that allows access to the system components of the vehicle.

The systems component is shown as "SYS" 128, which is interfaced with an application-programming interface (API) 130. The vehicle module 129 will therefore include the systems component and the API that will provide access and interface with applications produced by third parties and applications produced by the vehicle manufacture. In one embodiment, the system components interfaced with selected ones of the applications will produce a customized configuration 126. The customize configuration 126 will define the selected applications that were interfaced with the systems of the selected vehicle by the user 121. Once the customize configuration 126 has been selected (e.g., the APPS selected by the user to add or augment the current system APPS or system controls), the user may be provided with options to customize the arrangement of the UI (user interface) 134.

The customization, in one embodiment includes enabling the user to customize the user interface by arranging specific components of the user interface and specific locations on the display. For example, a user is allowed to select specific components, modules, applets, widgets, code pieces, and arrange them in specific locations that are preferred to the specific user for ease-of-use, or frequency of use, or for a specific look and feel.

This arrangement of the UI will therefore enable specific applications to act as modules that can be arranged on a display. The applications can then expand or contract to occupy the entire display when selected and exposing additional functions buttons annualize when selected. As will be defined below, additional customization of the arrangement of the UI 134 will allow user interaction with the user interface to customize itself based on learned use activity (e.g., over a history period) by the user.

In one optional embodiment, a user is allowed to associate a smartphone or portable device having applications with the customization configuration 126, in operation 136. For example, if certain applications are already loaded on a smartphone or portable device that is proximate or in the vehicle, the applications can synchronize or pair with the applications that are part of the customize configuration 126. The capability of synchronizing certain applications with the customize configuration 126 of the vehicle, allows for an integration of applications known and used by the user on the personal device, and applications that were made part of the customize configuration 126, using the customization tools of the vehicle manufacturer.

Once the user has customized the arrangements and has associated any portable device applications to the customized configuration 126, the custom UI may be transferred to the user account profile in operation 138. The transfer of the customize UI to that user account profile can include saving specific identifier information, application information, and any customization desired by the user for that specific vehicle or plurality of vehicles. Once the custom UI has been saved to the user account profile database 112, the user can then transfer or the manufacturer cloud services 120 can transfer the profile and custom UI to the vehicle in operation 140.

The transfer of the custom UI to the vehicle can be made by Internet connection between the vehicle electronics and the Internet 110. As shown in FIG. 1, the transfer of the custom UI to the vehicle 160 can occur once the customization has occurred. In one embodiment, the customization configured by the user 121 can also be saved to the user account of user 121 in a database of the manufacturer. If the user 121 then buys another car from the same manufacturer, the custom user interface can be transferred to the other vehicle in a seamless manner. If the other vehicle has additional features not provided by the earlier, a mapping algorithm provided by cloud services 120 can adjust the settings for the new vehicle to match or substantially match those of the earlier vehicle based on the user's preferences. In one embodiment, the matching can be a best-fit or compatible scenario, which provides the user with substantially similar configuration. The configuration can then be updated by the user if the custom settings or configurations made by the cloud services do not meet the user's desire or configuration.

Figure 2:
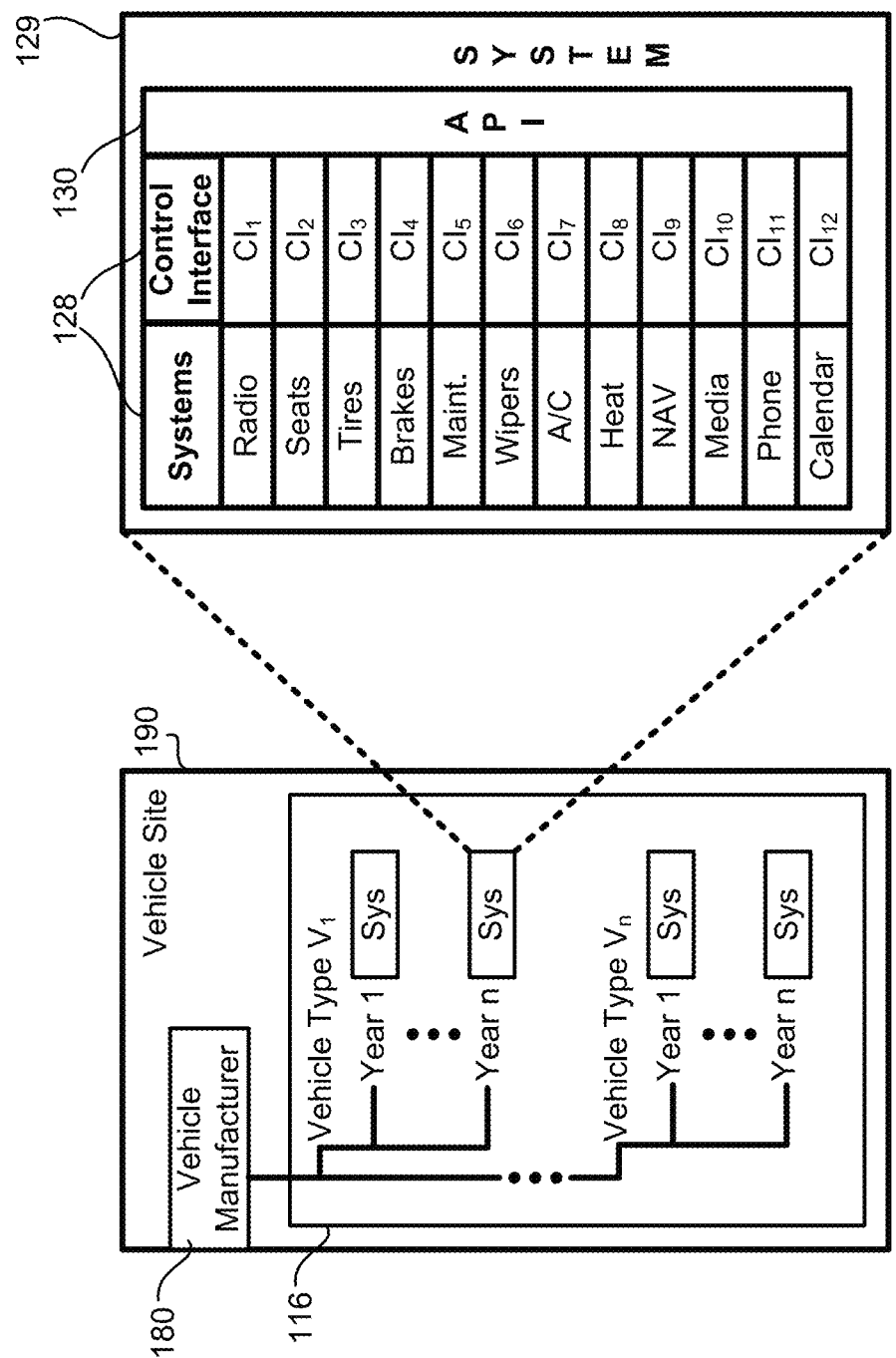
FIG. 2 illustrates one embodiment where a system component is provided, for interfacing with applications, in accordance with one embodiment.

FIG. 2 illustrates one embodiment where a system component 129 is provided, for interfacing with applications. In one embodiment, the system component 129 includes a definition of systems and control interfaces (CIs). The systems can include a number of standard systems utilized, which are commonly provided in manufacturing settings of vehicles by vehicle manufacturers. These systems are provided with corresponding control interfaces, which enable access to the system components. The control interfaces, for example, may enable access to the functionality provided by each of the system elements. For example, if the system is a radio, the radio will be provided with control interfaces or a control interface that enable functional access to the features of the radio. Functional features can include for example, volume, station selection, seek, pause, base, balance, storing of stations, etc. Other system features will be provided with their corresponding control interfaces, which will be then accessible via an application programming interface (API) 130.

The API provides a defined method and structure for accessing the various control interfaces of the system elements of a vehicle. Other types of systems can also include add-on components, plug-ins, such as those that may be downloaded to the vehicle from third party companies, from the manufacturer, or installed by the manufacturer automatically (or with pre-permission). Still further, other systems can include displays, which may be part of the vehicle. The displays can be provided with a control interface to enable the API to access the display functionality. In one embodiment, a vehicle can have a number of displays. The number displays can be, for example, the main dashboard for vehicle, a center console of the vehicle, a rear display, a passenger display, a glass display, a mirror display, a heads-up display, glasses of the driver, the windshield of a vehicle with display capability, a window of the vehicle, a touch surface of the vehicle, or portable devices link or synchronized to the vehicle electronics that provide access to the display system and control interfaces via the API 130.

As illustrated, the system component 129 may be defined by a vehicle manufacturer for a specific vehicle type. In one embodiment, a vehicle website 190, or third-party site may provide access to system component definitions for specific vehicles. In one example, the vehicle website 190 may be provided by a vehicle manufacturer 180. The vehicle manufacturer 180 may provide a listing of the types of vehicles sold by the manufacturer, and the various years for those vehicles as model types and functionality in each model change over time. In one embodiment, a user can visit the vehicle manufacturer 180 via websites or a cloud service, and select the vehicle to obtain the system component 129. In one embodiment, a particular vehicle type and year of vehicle may make use of more than one system component 129 if the manufacturer provided more than one system component or update.

Figure 3:
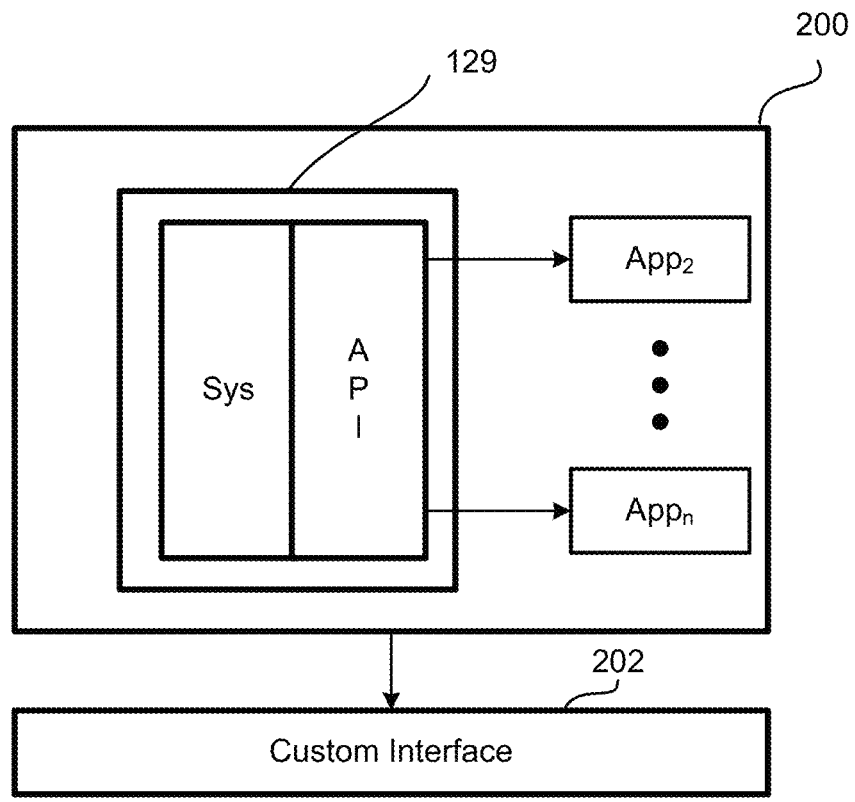
FIG. 3 illustrates an example where the system component, including the systems and control interfaces and associated API are linked or associated to a number of applications to define a custom configuration, for one embodiment.

FIG. 3 illustrates an example where the system component 129, including the systems and control interfaces and associated API are linked or associated to a number of applications to define a custom configuration 200. Custom configuration 200 was defined by allowing a user to select various applications that will be integrated with to provide supplemental content or functionality to the vehicle. In one embodiment, the applications can also replace application functionality provided by the systems in system component 129.

For example, an application can be selected by the user to provide a custom radio interface, which replaces the radio interface provided by the vehicle manufacturer. In still another example, an application can be provided to replace the temperature meters with custom temperature meters, and provide additional data on the display not provided by the standard vehicle manufacturer user interfaces.

In still another embodiment, the application selected by the user can define complementary functionality that will function in conjunction with the system components. In this example, the application functionalities that are paired with the system component 129 to define the custom configuration 200 will provide a hybrid user interface that is custom to the user. The customization is defined by the user, for example, by selecting specific applications, selecting different background colors, wallpapers, for the user interfaces, selecting different input interfaces, adjusting the location and positioning of application components displayed on a vehicle display, and programming the various application elements and functions to operates and provide feedback based on user-defined programming.

In still another embodiment, the custom configuration can be defined by the user to provide a different background color on different days of the week. The background color can be customized or replaced with pictures or photographs customized and selected or uploaded by the user. In this way, the user interface, system components, and applications installed on the vehicle will provide a customized look and feel that is defined by the user for the vehicle, and additional functionality will cooperate and function with the systems of the vehicle by providing the mapping to the API to each of the applications that are selected by the user.

In still another embodiment, the applications can function alongside system components without requiring the applications to interface directly with manufacturers systems the of the control interfaces. In this scenario, applications can function and be placed in the user interface of the custom configuration in the same locations set by the user.

Figure 4:
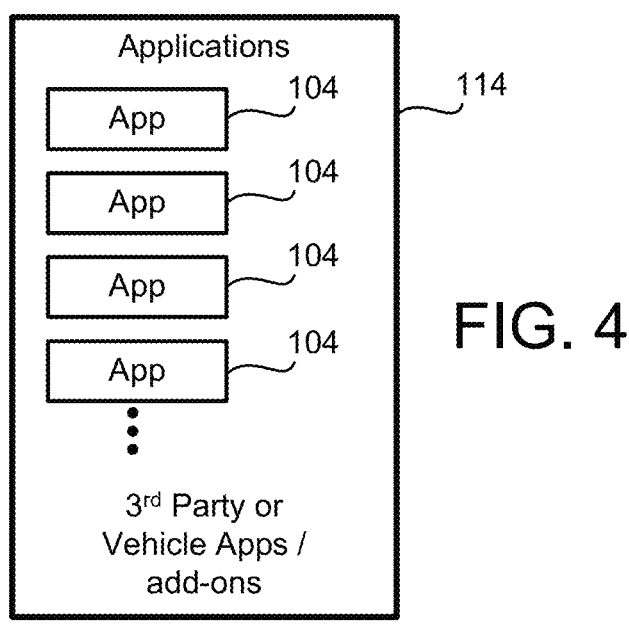
FIG. 4 illustrates an example of an array of applications that can be provided for use with the vehicle that a user is customizing to provide a customized configuration, for one embodiment.

FIG. 4 illustrates an example of an array of applications that can be provided for use with the vehicle that a user is customizing to provide a customized configuration. As illustrated, the applications 104 provided in a menu or listing 114 show particular applications that can be made accessible to the user for the selected vehicle that is being customized In one embodiment, depending on the vehicle being customized, a different subset of applications will be provided to the user for selection. The subset of applications provided to the user will be those that are known to operate or interface with the selected system components of the selected vehicle.

In one embodiment, the custom configuration 200 will define a custom interface 202 that will be rendered on a display of a vehicle or on more than one display of vehicle. In one embodiment, the applications that are provided for selection in listing 114 may include third-party produced applications as well as applications produced by the vehicle manufacturer. Still further, the applications may be add-on applications that provide additional functionality to existing applications or existing system configurations. In still other embodiments, the applications can be defined as applets, plug-ins, widgets, code subsets, skins, code, or combinations of one or more thereof.

Figure 5:
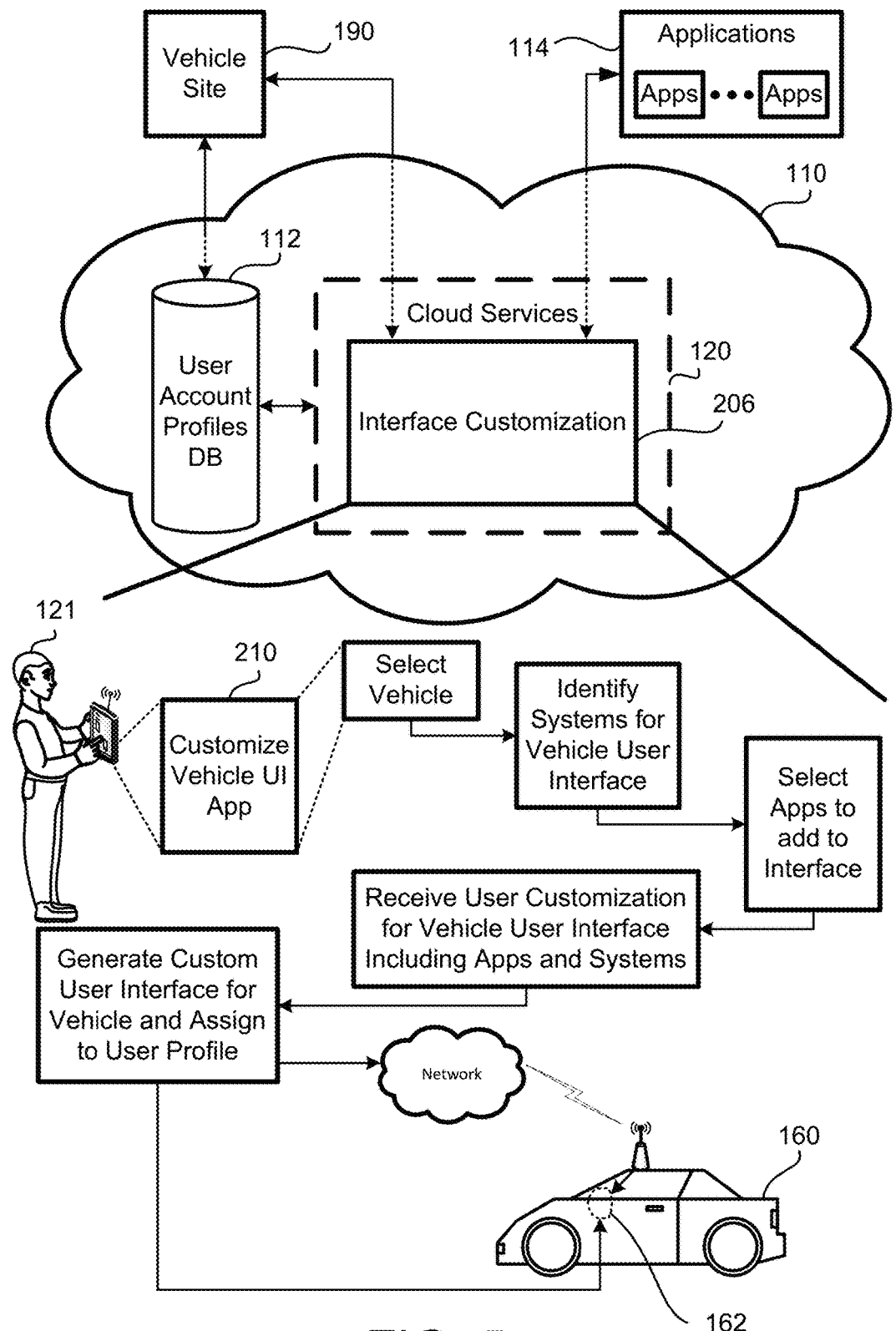
FIG. 5 illustrates a system and use diagram, of the configuration of the user interface, in accordance with one embodiments of the present invention.

FIG. 5 illustrates a system and use diagram, of the configuration of the user interface, in accordance with one embodiments of the present invention. As shown, applications 114 may be selected by a user that wishes to generate a custom configuration for a vehicle. In one embodiment, the user may go to a vehicle website 190 where the user may select a vehicle system component that matches the vehicle that the user wishes to customize. In one embodiment, the user would establish a user account in a cloud service of the vehicle manufacturer, or a third-party site that provides customization features for the vehicle manufacturer.

The cloud services 120 may provide interface customization 206 tools that will allow the user to select the application 114, select the system component for the vehicle, and arrange the selected applications, arrangement of the applications on the display screen, settings for the different applications, etc., to thus define a custom configuration for the user interface. The custom configuration will then be saved to a user profile database 112, which saves the custom configuration and provides access to the custom configuration for updates from time to time by the user, or for updates provided by the vehicle manufacturer.

In one specific example, a user 121 can visit a website, an app, or a portal to customize a vehicle display 210 using tools provided by a website that allows the customization. The tools can include pull-down menus, selection icons, text entries, radio buttons, arrangement and customization feature selectors, program settings, etc. The user can access the website using any user device. The user device can also include setting the custom configuration via a vehicle 160. In general, the configuration can be made using any device that has access to the Internet.

In operation 220, the user will select a vehicle using the tools provided by the website. Selecting the vehicle will allow the correct selection of the system component for that vehicle, and any other updates or parameters defined by the vehicle manufacturer. The systems for the vehicle user interface will then be identified in operation 222. A tool than be provided to allow selection of the apps to add to the interface in operation 224. As mentioned in this disclosure, the user can select any number of applications to add to the custom configuration. From time to time, the user can select additional applications to add to the custom configuration or removed from the custom configuration. In operation 226, the user customization for the user interface will be received including the defined applications and systems.

In operation 228, the custom configuration will then be generated and can be assigned to the user profile of a user account, in a database(s) of websites handling the cloud services 220. In some embodiments, the website may be hosted in a distributed manner, using virtualization and distributed data centers. The distributed data centers can then communicate data and process operation to the vehicle to execute the applications and system components, and provide resources from third-party applications and applications over the Internet.

The generated custom configuration can then be transferred to the vehicle 160 and operated using vehicle electronics 162. Vehicle electronics 162 can also include a display. As mentioned above, the display can be a single display or a plurality of displays. The displays are configured to generate images for various screens, selections, icons, buttons, controls, and received touch input and communicate text information and other data to users.

Figure 6:
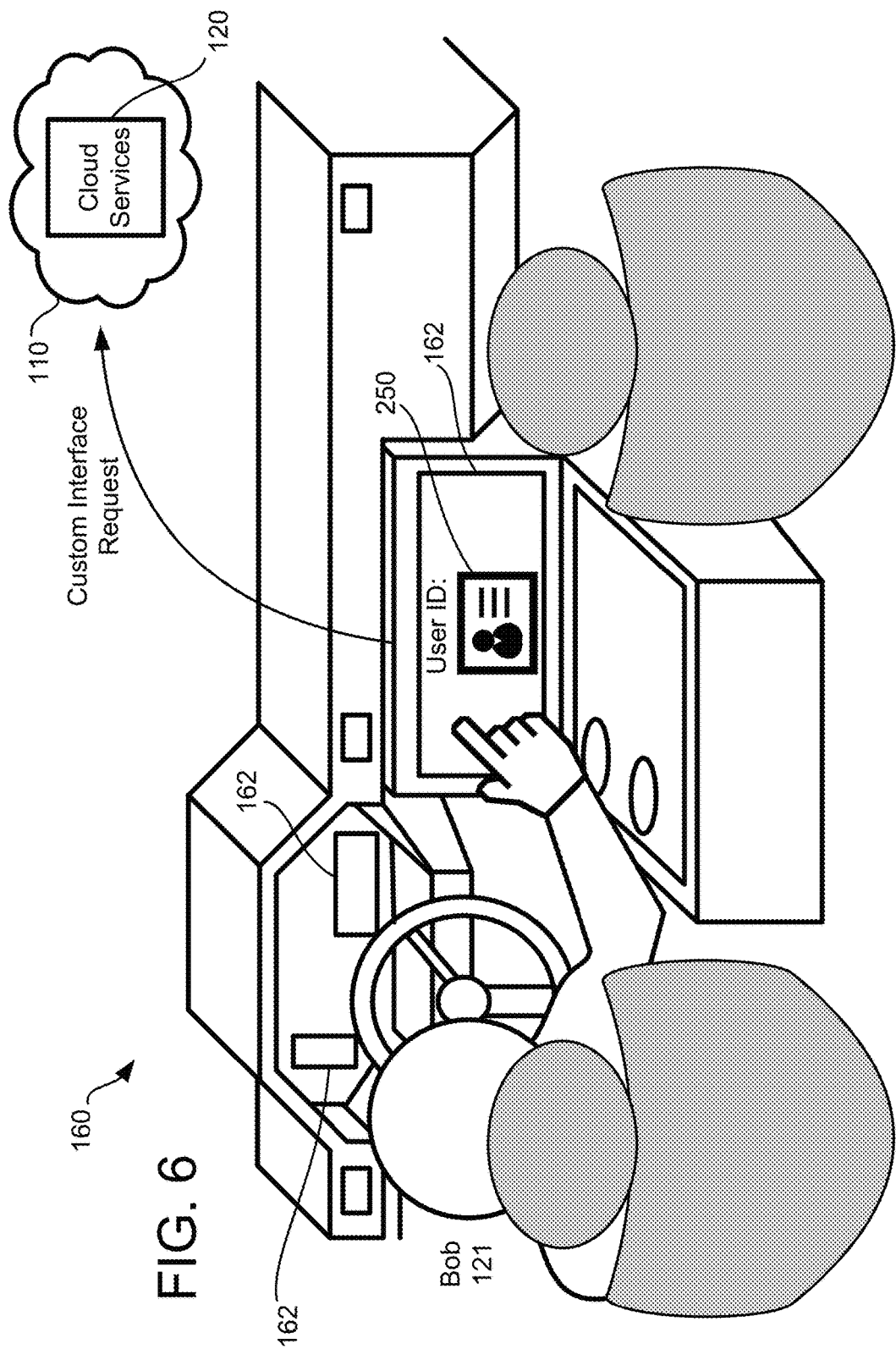
FIG. 6 illustrates an example of user interfacing with a display in the dashboard of vehicle, in one embodiment.

FIG. 6 illustrates an example of user 121 interfacing with a display 162 in the dashboard of vehicle 160. In this example, the display 162 will produce a user interface 250 that requests the user to input a user ID. The user ID can be any credentialing type input. The credentials can include usernames and passwords, keys, alphanumeric entries, biometric inputs, voice inputs, retina scan inputs, fingerprints, face recognition, etc. In FIG. 6, user 121 will enter the user ID which would then send a custom interface request to cloud services 120, over the Internet. As mentioned above, vehicle 160 is connected to the Internet, or is connected to the Internet at particular times. When the vehicle 160 is connected to the Internet, the request can be sent to cloud services 120, to request the custom configuration for the user.

A user having an account with cloud services 120 will have previously defined custom configurations that may be downloaded or accessed without download for the specific vehicle. The vehicle ID would be sent to the cloud services 120 by the vehicle upon sending the request for the custom configuration.

Figure 7:
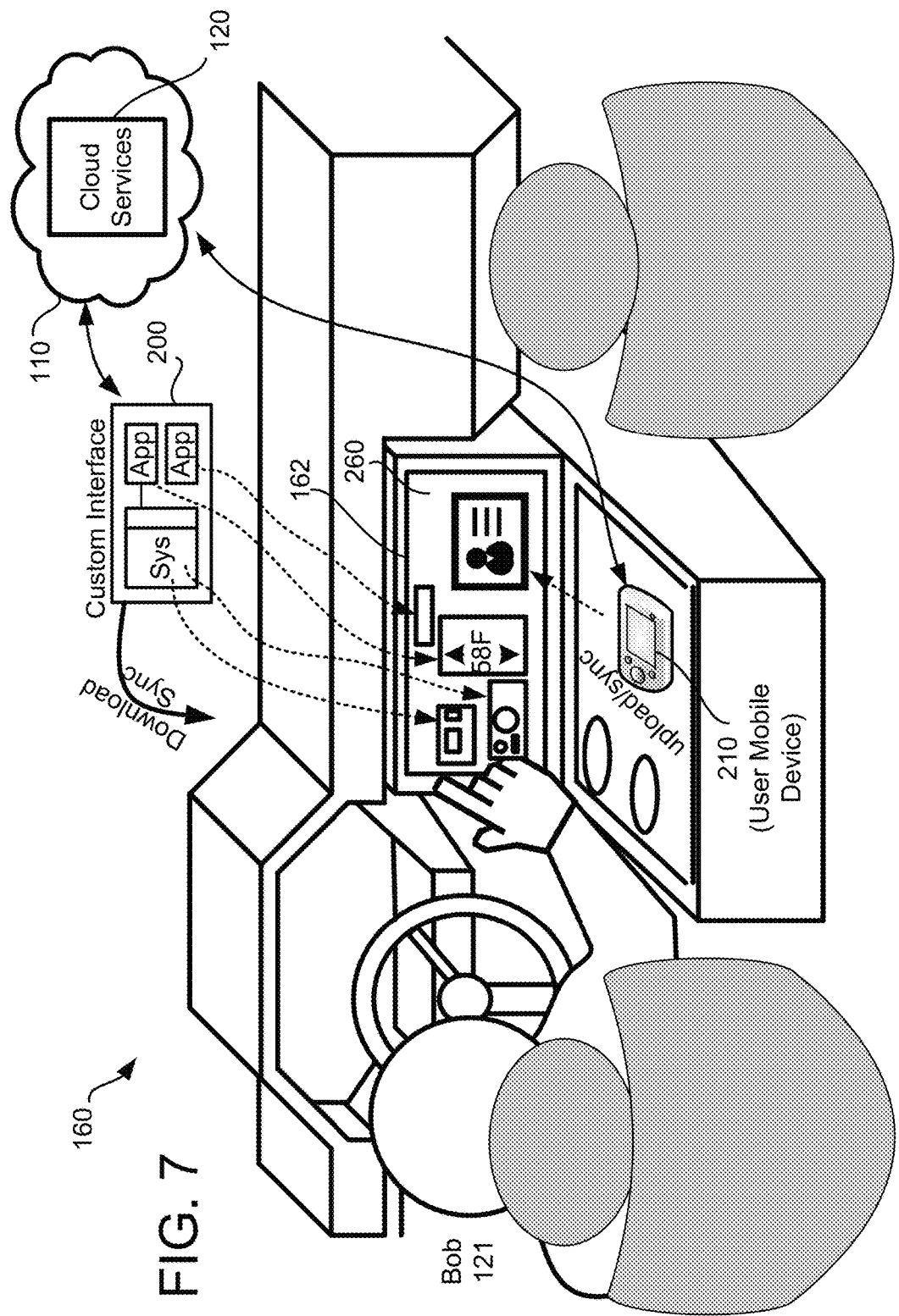
FIG. 7 illustrates how the custom configuration that provides the interface defined by the user is downloaded to the vehicle electronics and the display of the vehicle in one embodiment.

FIG. 7 illustrates how the custom configuration 200 that provides the interface defined by the user is downloaded to the vehicle electronics and the display 162 of the vehicle 160. The display 162, as noted above, is only an example display, and display can be of any size and can include multiple displays. For simplicity, a single display 162 is shown in FIG. 7.

In this example, the display 162 is populated with user interfaces for the system as well as the applications. As shown, app interfaces may be presented in specific locations in the user interface as well as system interfaces that are provided in other specific locations in the user interface. In one embodiment, the definition of where the specific user interfaces for the systems and the apps are to be defined is set by the user during the configuration process.

In other embodiments, the positioning and layout or arrangement of the specific components of the user interface, whether they are system interfaces or app interfaces, may be custom arranged by the system over time based on use patterns. The use patterns of the user can be learned by the system so as to arrange the various system components and app components in various locations of the display 162. In other embodiments, certain interfaces will be surfaced (e.g., shown or presented) on the display at certain times of day, certain times of the week, certain times of the month, certain times of the year, etc. Better placement of the app components and system components, and programming of data into the components can be optimized over time based on learning the input patterns provided by the user to user interface.

For example, if the user always views the weather in the mornings at 8 o'clock or 9 o'clock and a.m., then the weather icon or interface will automatically start to be surfaced (e.g., show or displayed, or illustrated (visually or audibly) on the display during those times. If the user plays rock 'n roll rock music on the weekends and classical music during the weekdays, this preference will also be learned. Learning of these preferences will act to custom define the layouts and placement of the icons and user interfaces on the display over time. In still other embodiments, the specific placement, location, and arrangement of the apps, system components, buttons, controls, etc., will be preset and fixed by the user based on predefined settings.

These predefined or learned settings can be saved to the database in cloud services and associated with the user account. Updates to the settings can then be made at any time by accessing cloud services over the Internet using any device, whether the devices are in the car, of the car, a portable device, a home computer, a work computer, a tablet, a smart phone, a smart watch computer, etc. Also shown in FIG. 7 is an embodiment where a user's smart phone or mobile device is synchronized with the user interface of the vehicle 160. In this embodiment, the user's portable device 210 can synchronize and upload content and UI controls from applications stored and running on the portable device 210. This provides for safer driving, as the controls shown on the vehicle display can be restricted based on driving or operation status.

In one embodiment, the user can custom configure to have content from applications running on the portable device 210 to be displayed in the vehicle displayed 162 in a specific location. This location on the display can then be synchronized or mirrored to that part of the display based on the configuration. In still other embodiments, the custom configuration can determine to synchronize an application running on the portal device to occupy the entire display 162. For example, if the user wishes to use his own telephone calling interface and contacts that are stored on the portable device 210, that information can be populated and mirrored to the display device 162, while still using other system components or other applications of the vehicle in the background or in a separate screen that is not currently active. In this example, the portable device 210 as well as the vehicle electronics can communicate with cloud services 120 at the same time, or when specific functions, data or communication is required.

Figure 8:
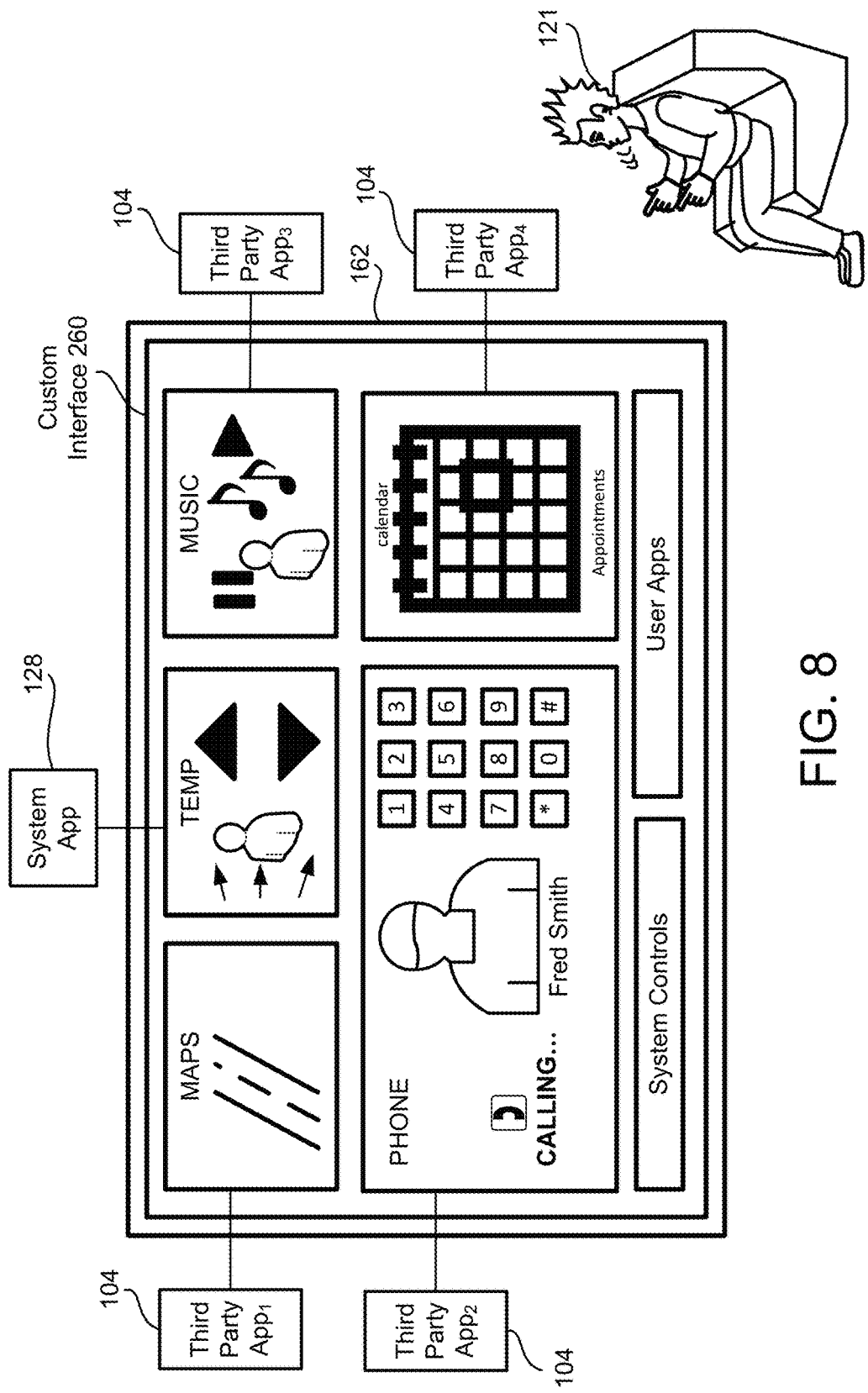
FIG. 8 illustrates an example where a display device of the vehicle will illustrate and render different applications or application components in user-defined locations, in one embodiment.

FIG. 8 illustrates an example where a display device 162 of the vehicle will illustrate and render different applications or application components in user-defined locations. In this example, different parts of the display contain different components or applications, which are custom designed or laid out by the user in the custom configuration. In one embodiment, the applications can be third-party applications, which are custom designed to operate with the system component of the vehicle. In this manner, the user can decide to get third-party apps 104 to replace certain applications provided by the system.

However, the user that defines the custom configuration can decide to maintain certain system component applications 128. The custom interface 260 may therefore include a hybrid of third-party applications and system applications, all designed to be laid out arranged and provide the look and feel/functionality desired by the user. In this illustration, a third-party app 104 is provided for a calendar. The calendar may be synchronized with a user's online calendar, which automatically populates the user's data to the vehicle user interface. The radio app may also be a third-party app, which may have radio stations that are a mix of land-based radio and Internet radio. Scores from time to time, the user can then arrange the location of the specific applications to different portions of the display.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

Figure 9:
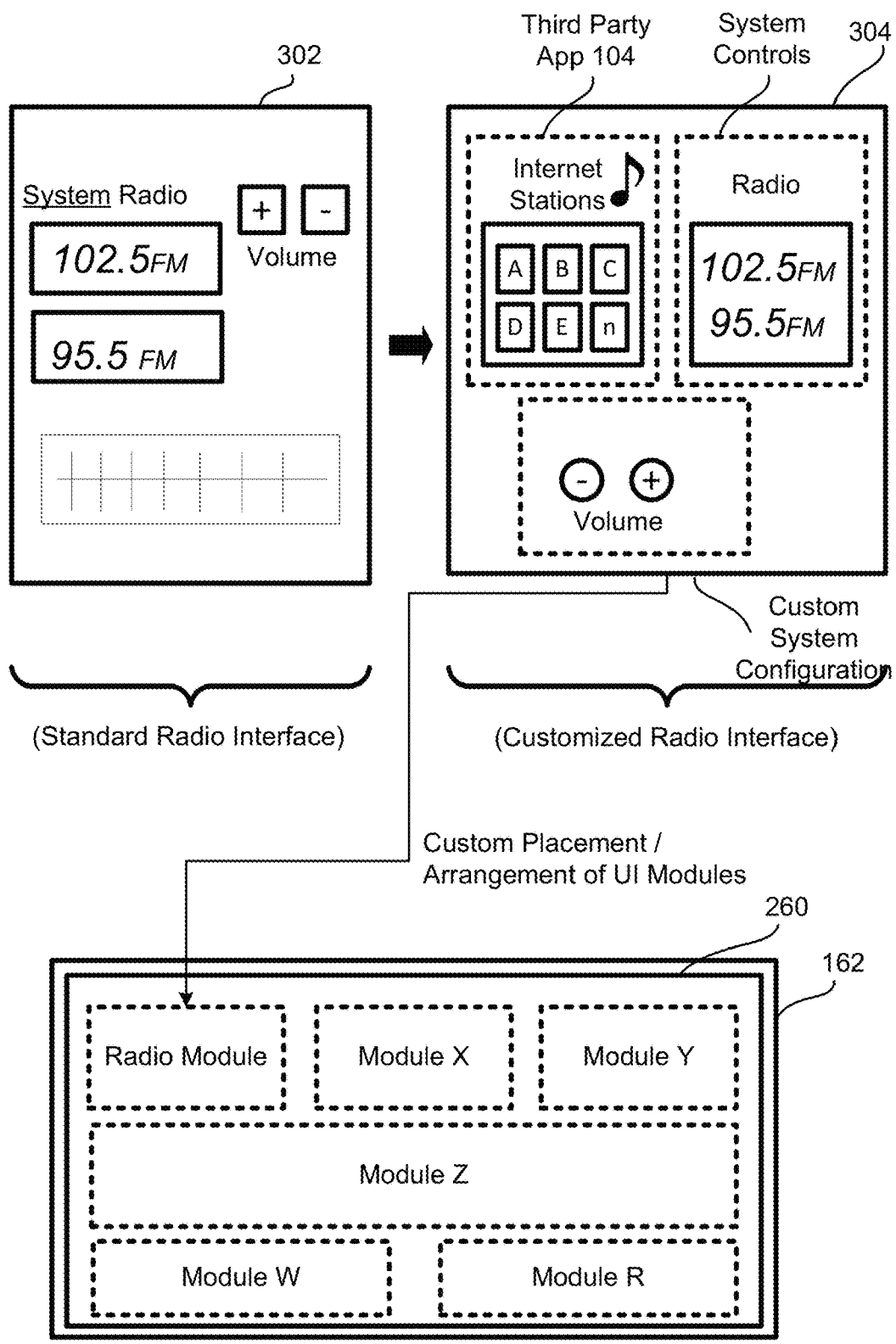
FIG. 9 illustrates an example of customization operations that can be performed, in accordance with one embodiment of the present invention.

FIG. 9 illustrates an example of customization operations that can be performed, in accordance with one embodiment of the present invention. In one example, a standard radio interface 302 is shown having standard radio functions, such as text controls icons and the like. If a user does not like the radio interface 302 provided by the manufacturer of the vehicle, the user may choose to replace the radio system 302 with a third-party application 104 that provides a customized radio interface. In one example, the application 104 can provide an interface 304, which has a number of sections or areas. These areas can be customized in one embodiment, or can be defined by the developer of the third-party application 104.

If the sections are customizable, the user can select certain portions of interface 304 to be provided by another third-party application 104. For example, interfaces can be used to customize the entire system component, such as the entire radio 302 interface, or the customize radio interface 304. The interface can be itself customized by adding sub applications or subcomponents of code that define smaller user interface sections for the custom system configuration of a radio.

Once specific modules have been customized, either by selecting pre-customized third-party applications, or by constructing a custom module, these modules can be arranged to define a custom placement or arrangement of user interface modules to be displayed on a vehicle display 162. The customized display 260 can therefore be defined by a plurality of modules, which may be provided or obtained by adding third-party applications to the custom interface design by the user, or by moving or arranging existing user interface components provided by the manufacturer to specific locations on a screen arrangement. Other customization features can include, adding custom backgrounds such as images, pictures, and other multimedia components to the display.

In one embodiment, the custom interface can include smaller icons/GUIs that identify specific applications that were added to the custom interface, that when selected expand to provide the functionality of the applications. The applications can be minimized or maximized on the screen. In one embodiment, the functions of the specific applications illustrated in the display 162 will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touch-screen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

Figure 10:
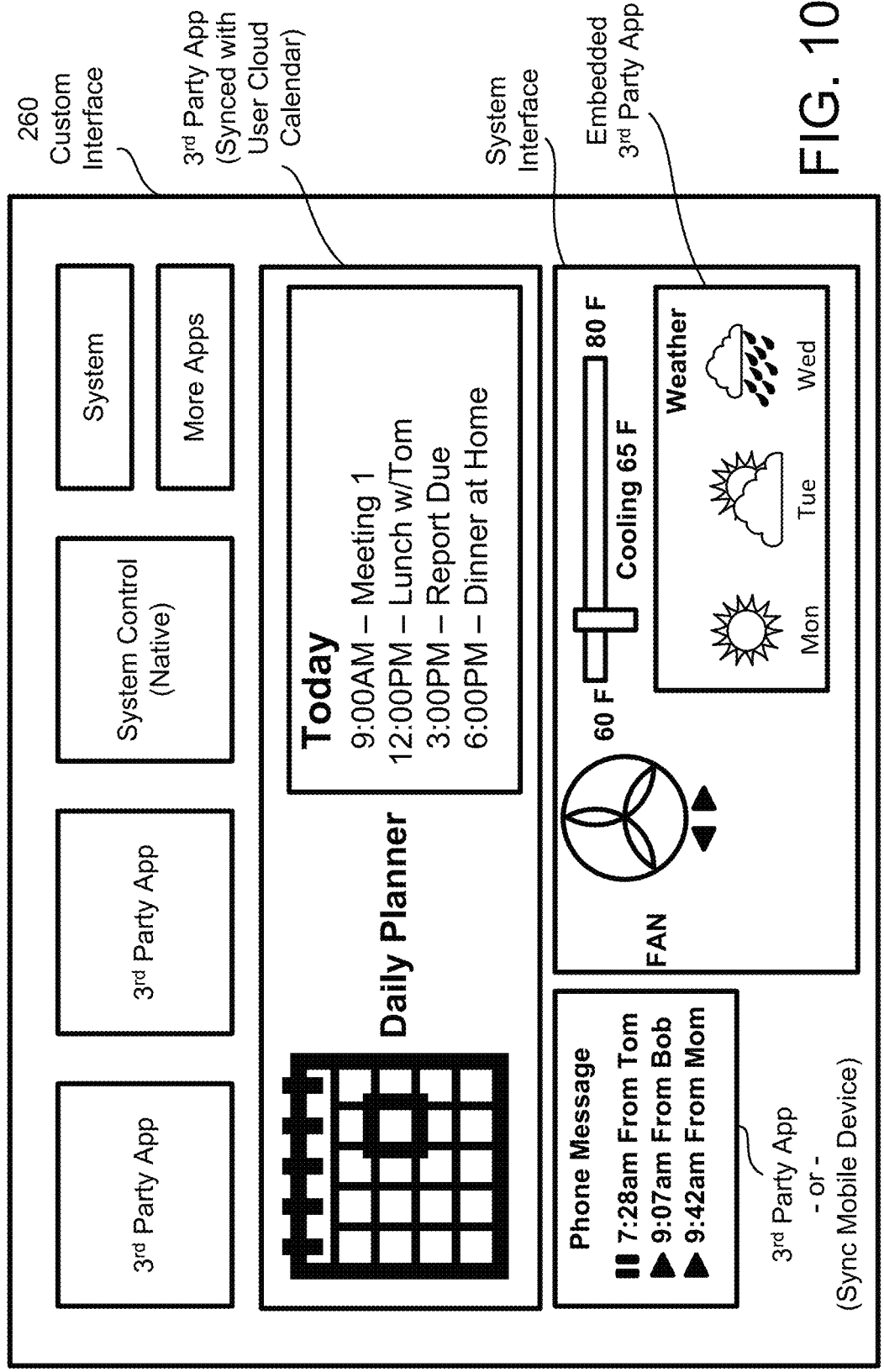
FIG. 10 illustrates an example of a custom interface, in accordance with one embodiment of the present invention.

FIG. 10 illustrates an example of a custom interface 260, in accordance with one embodiment of the present invention. As shown, the custom interface 260 includes various components or modules. The various components and modules can be arranged or defined by suggested arrangements during the customization by the user. As mentioned above, the customization by the user can be facilitated by allowing access to tools and website applications that allow selection, arrangement, dragging, color definition, size definition, positioning definition, and other custom controls. The custom controls can also be used to define settings for the various components. The settings can include programming and custom alarms, settings of when particular types of music should be played, radio station selection, pre-turn on of the vehicle at certain times to provide heat to the vehicle or cool the vehicle in advance, and other remote access, monitoring, image detection, security features, and associated settings.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

Continuing with the example of FIG. 10, it is shown that several of the components of the custom interface 260 can include applications from 3rd parties, or applications and controls provided by the vehicle manufacturer. In one embodiment, an application provided by third-party, such as an online calendar, can be synchronized with the user's calendar managed by a 3rd party or stored by a 3rd party on a website. For example, if the user uses a cloud service to store his or her calendar, the calendar appointments can also be displayed on the vehicle interface, and are synchronized to the user's global calendar settings that are accessible through any computing device. In one embodiment, the daily planner can include data or information for the user, such as reminders to purchase or get certain things. If while the user is driving around those certain things can be purchased or obtained from local merchants, the user can be provided with notifications of availability of those particular things or goods the user desires to purchase.

In still other embodiments, advertisers can provide data to the user that is relevant to the user, such as discounts for the goods or services the user wishes to purchase. In still another embodiment, an application can be provide for the vehicle that provides a user the ability to set and to find certain things, such as goods and services the user needs. As the user drives around, and algorithm determines whether certain goods or services are available in the proximity of the vehicle's driving actions. If the vehicle approaches or is near certain goods and services, and such goods and services are advertised to have a discount or availability, the user can be notified on the user display, or by audio output by the vehicle. This functionality can be enabled or disabled on demand, as programmed by the user in the application that's added to the user interface.

Still in FIG. 10, it is shown that other applications can be embedded into other applications. For example, the standard system interface for the temperature control and fan of the vehicle can be customized to add additional features. For example, in addition to the controls for the standard vehicle settings, the user can also be provided with controls to access or add additional applications. These additional applications can be embedded or overlaid on other applications. In one example, and embedded application can allow user to embed a weather application, which is synchronized to an Internet service. In other embodiments, other applications such as phone messages, notes and the like can be synchronized with an Internet application or with a local device.

The local device might be the user's mobile phone, the user's computer wristwatch, the user tablet computer, the user's laptop computer, or the mobile device of a person inside the vehicle. In one embodiment, data from the local devices can be synchronized locally to the display of the vehicle in selected regions. These selected regions of the display can be defined by the user during customization, or can be defined automatically by the system based on sizing areas on the display, relative to other applications or features displayed on the one or more displays of the vehicle.

Figure 11:
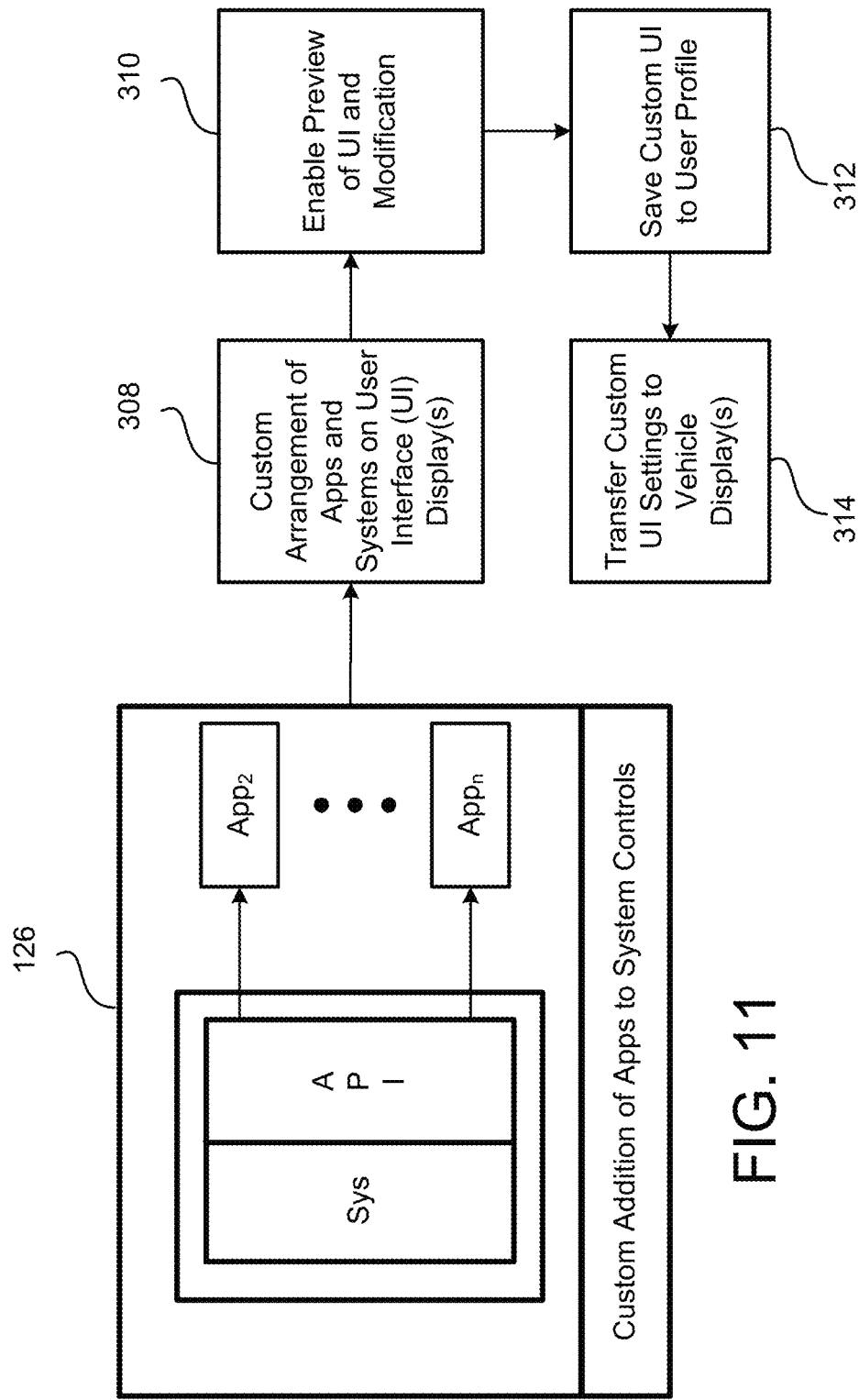
FIG. 11 illustrates an example of a system component with its APIs, and interface with a plurality of applications selected by the user, in accordance with one embodiment.

FIG. 11 illustrates an example of a system component with its APIs, and interface with a plurality of applications 126 selected by the user. The user can select add or delete applications from time to time to define custom addition of apps to the system or to replace system controls. Once the user has selected the certain applications, a custom arrangement of the apps and systems on the user interface display can be enabled. As mentioned above, the customer arrangement, definition, placement 308 of certain components or applications on a display can be customized by the user.

Also noted is that the system can automatically arrange or move certain applications or components on the display depending on size constraints, or other features that are synchronized with system settings. In operation 310, the user can be provided with tools to enable preview of the user interface and allow for modifications from time to time. The customization can then be saved to the user profile or user account in operation 312. In operation 314, the custom configuration can then be transferred to the UI settings of the vehicle to allow for display, in accordance with the arrangement configuration, selection of applications configuration, and rules enforced by the vehicle manufacturer to enable safety and use of the applications and features.

Figure 12:
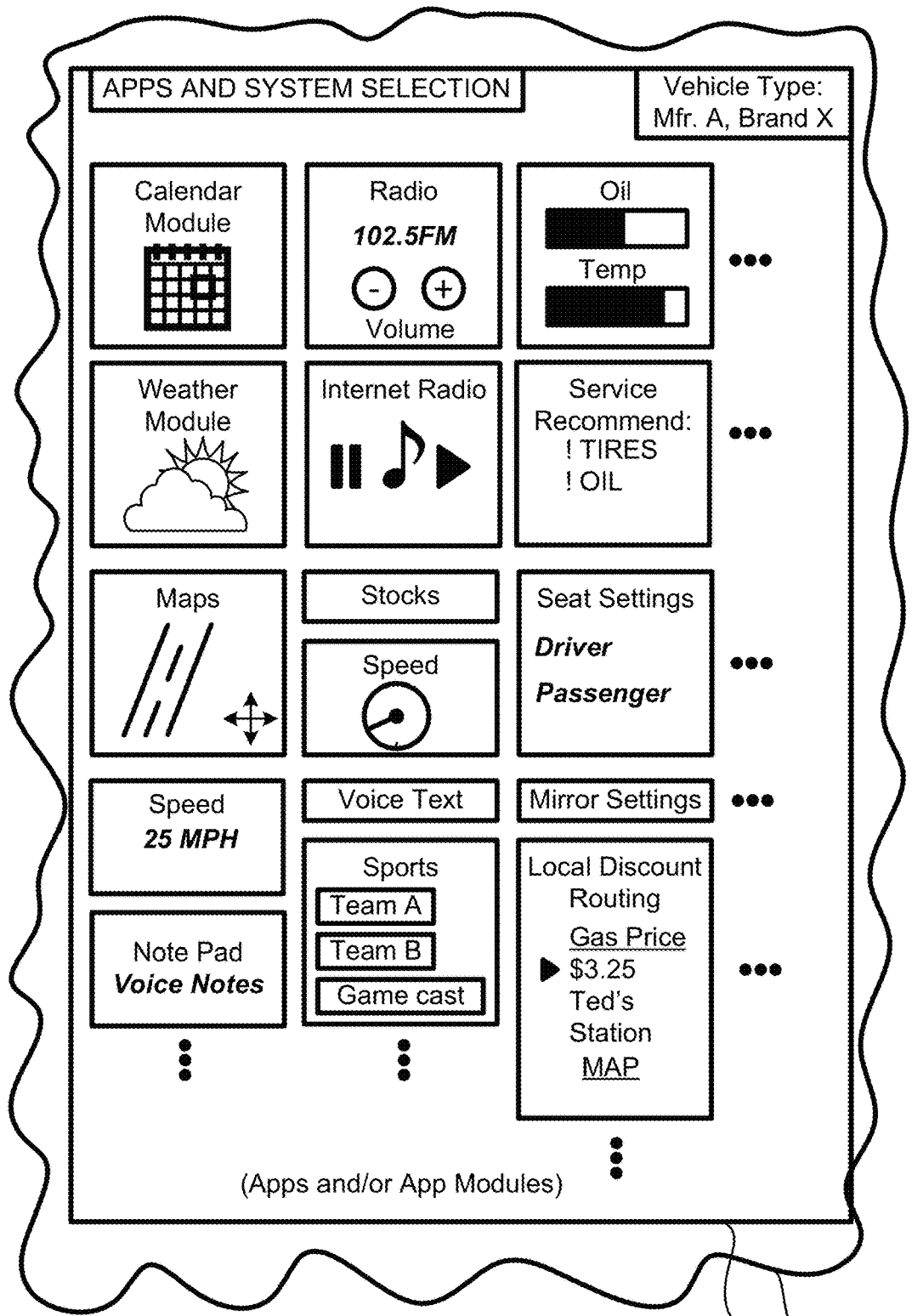
FIG. 12 illustrates an example of apps and system selections features, in accordance with one embodiment of the present invention.
Figure 13A:
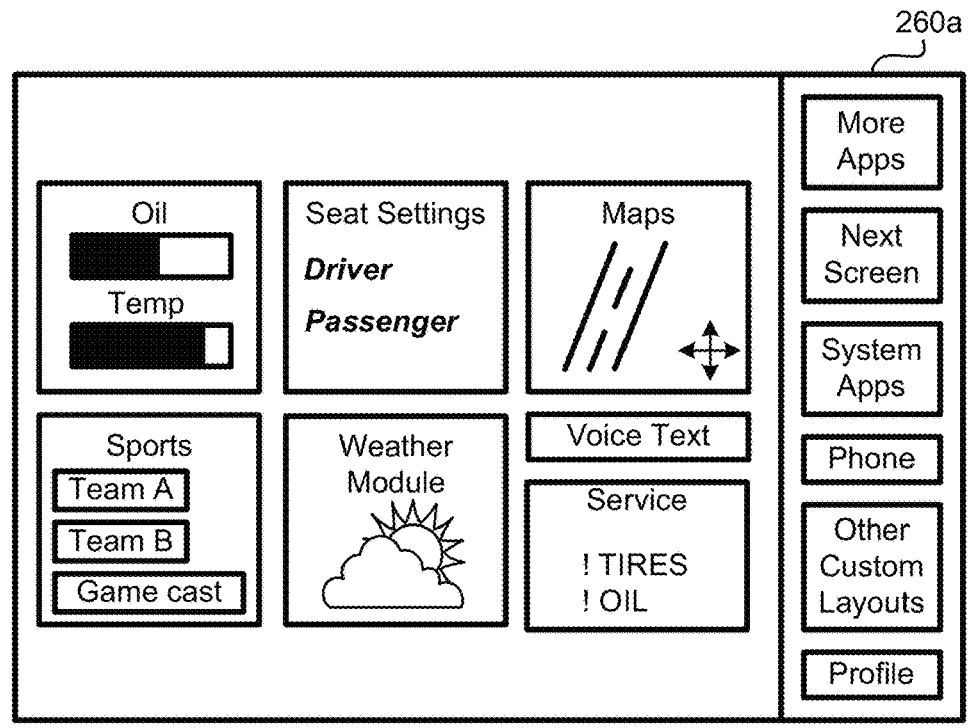
FIGS. 13A-13D illustrate examples of different user interfaces that can be defined by the user, in some embodiments.
Figure 13B:
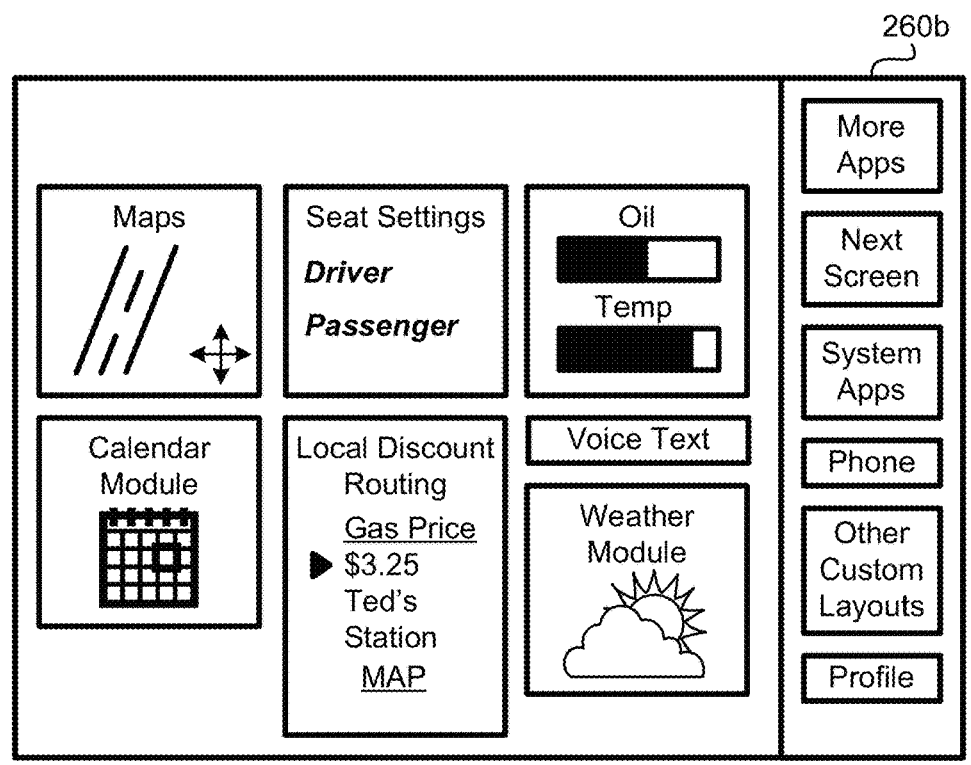
Figure 13C:
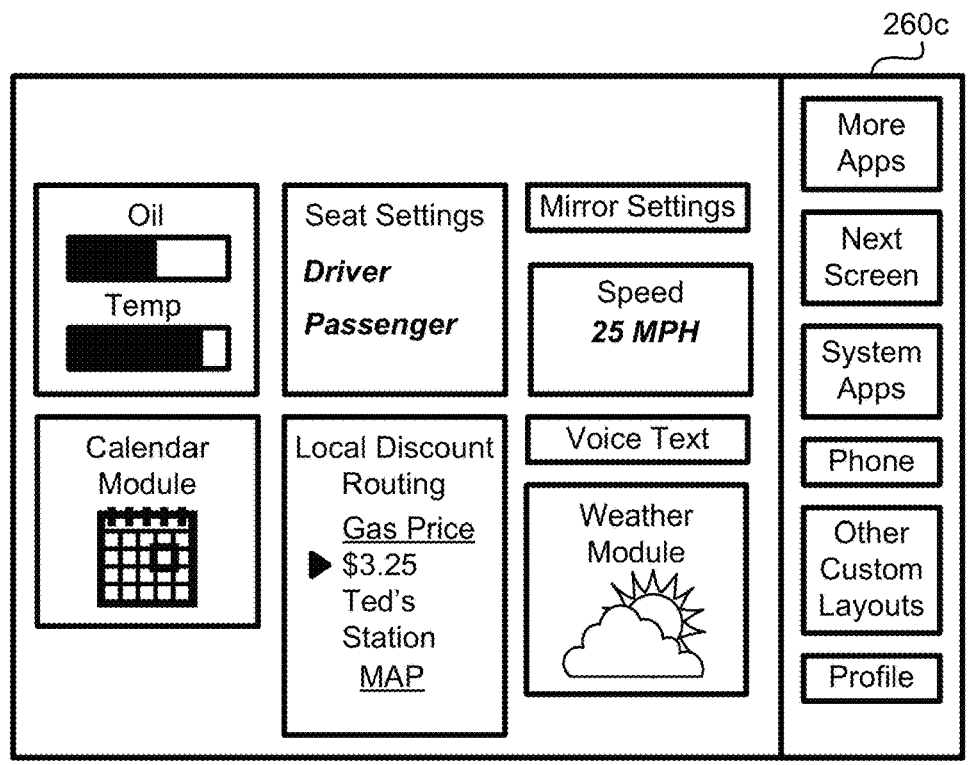
Figure 13D:
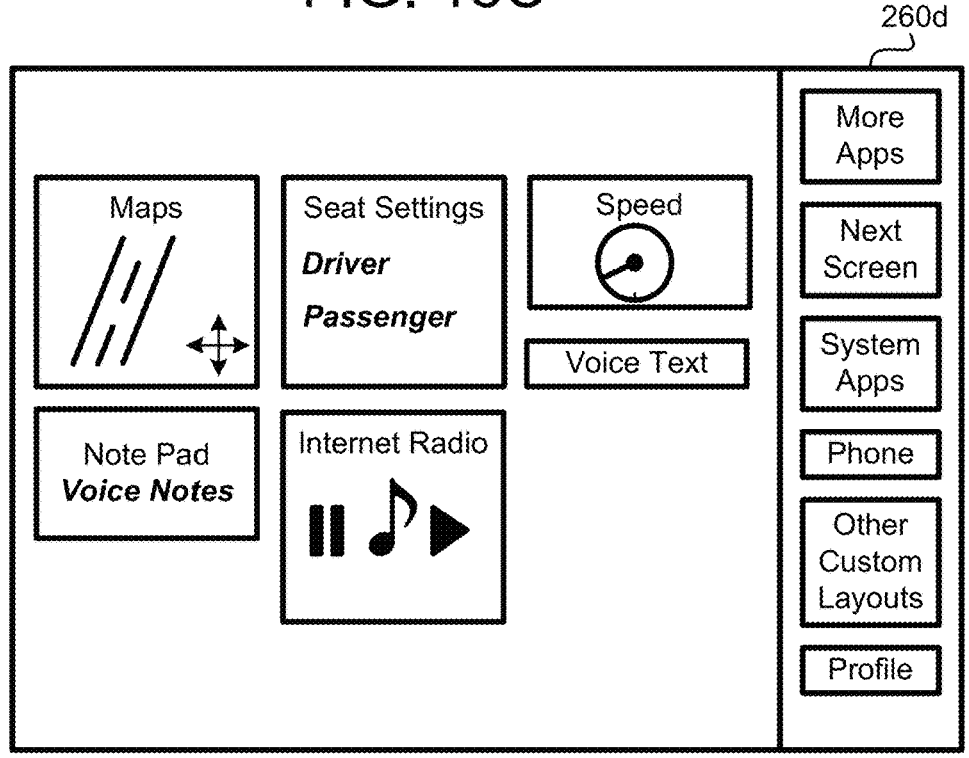

FIG. 12 illustrates an example of apps and system selections features 210, in accordance with one embodiment of the present invention. In one example, the user can be provided with a number of applications to select when accessing cloud services over the Internet 110, for addition to a custom configuration. In one embodiment, once the user has selected the vehicle type, manufacturer and brand of the vehicle, the user is provided with an automatic listing of certain applications that are available for that vehicle for customization. In this illustrative example, which is not exhaustive of all possible types of user interfaces and selection menus and presentation types, the user can be provided with icons that illustrate example user interface that can example apps that may be added to the vehicle or vehicle customization. As noted above, the customization can be provided with apps, as well as widgets, or code that can be added to the display. The apps and code can be provided by 3rd parties or the manufacturer of the vehicle, or both.

FIGS. 13A-13D illustrate examples of different user interfaces that can be defined by the user. Again, these different configurations and arrangements are provided simply as an example. Additionally, although only one display is being shown, the configuration can be made for multiple displays in a single vehicle. Most commonly, the display is one that can be located in the center console of a vehicle. However, often the display can also be incorporated as the main display in the dashboard, which shows and illustrates common dashboard system readings and data. These can include, for example, the speed of the vehicle, the RPMs of the vehicle, the fuel level of the vehicle, the temperature of the vehicle, the battery life of the vehicle, the battery and range of an electric vehicle (EV), and related data. Thus, the customization can be for any display in the vehicle, including displays in passenger areas of vehicle.

As shown in FIGS. 13A-13D, various ones of applications can be located in different locations of a display screen. Although the display and features of the display are described as being applications, the icons can represent access to the applications and the icons can expand to encompass the entire screen or part of the screen at various times of use. In one embodiment, the user can customize the display directly from the display, by selecting more apps, can view different screens by selecting a next screen, can access system applications, can access the phone, can provide for other customizations and layouts, can update the profile. As noted earlier, the custom configuration can be set for a particular user.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

Figure 14:
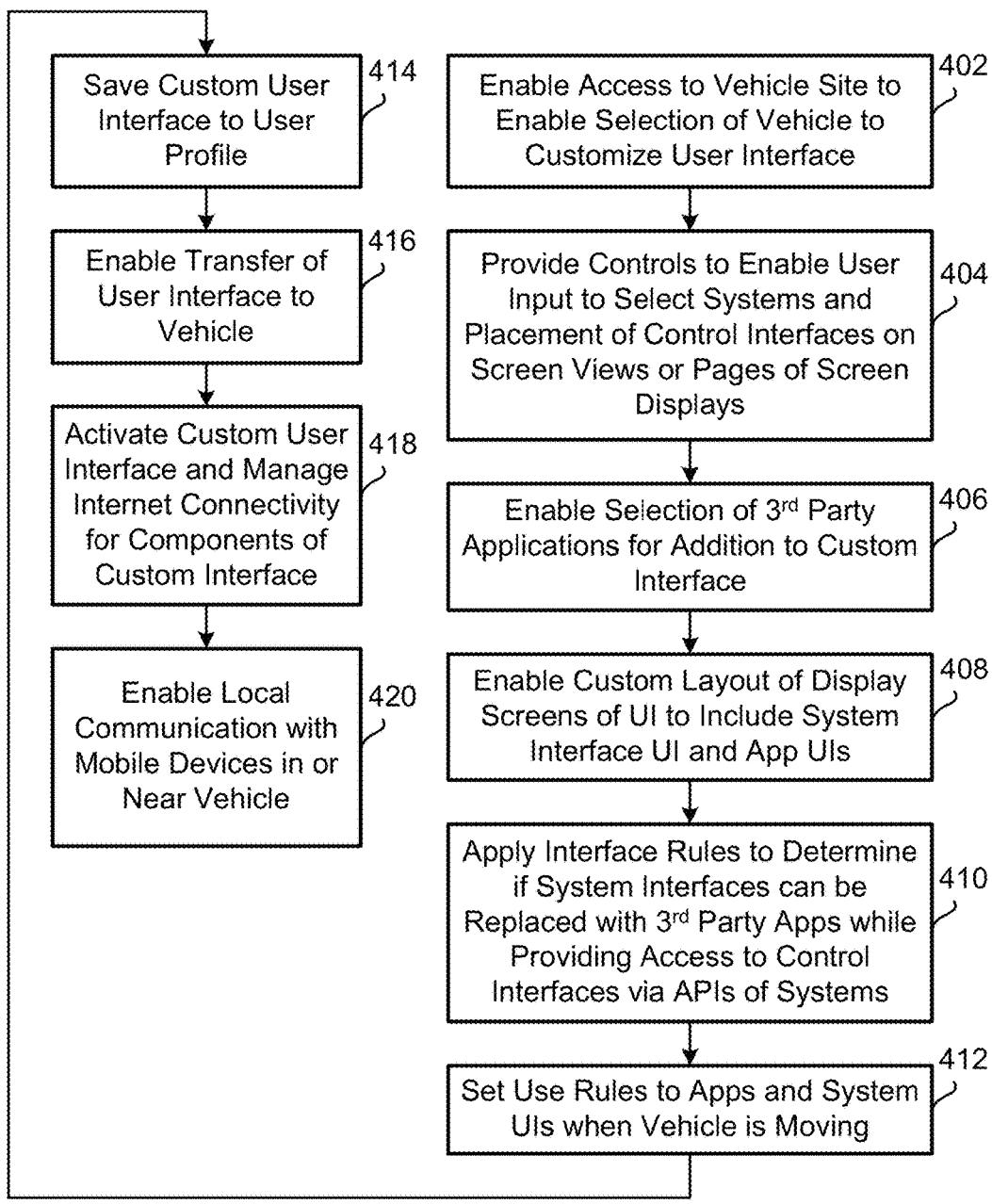
FIG. 14 illustrates example flowchart, of operations performed to generate a customized user interface for vehicle, in accordance with one embodiment of the present invention.

FIG. 14 illustrates example flowchart, of operations performed to generate a customized user interface for vehicle, in accordance with one embodiment of the present invention. In one embodiment, the method begins by enabling access 402 to a vehicle site to enable selection of vehicles to customize for user interface. The access to the vehicle site may be granted by supplying credentials for accessing a user account, or establishing a new user account. The vehicle sites may, in one embodiment, include cloud processing to enable access to features provided by the website including features provided by other services and software accessible over the Internet.

In operation 404, the method provides controls to enable user input to select systems and placement of control interfaces on-screen views or pages of screen displays. The screen displays can have various configurations, placements, sizes, number of pages, tabs, etc., and the user can provide controls for some or all of the interfaces and controls in certain locations. In operation 406, selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

As mentioned in this disclosure, certain third-party applications can be reviewed by the vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled. In some embodiments, when the vehicle has come to a stop or is place to park, certain controls or interfaces can be re-enabled. In operation 408, the tools provided by the vehicle site or third-party site can provide for customization of the layout of the display screens of the user interface.

The customization can include organizing or laying out system interfaces as well as application interfaces, such as those interfaces provided by 3rd parties. In operation 410, interface rules are applied to determine if the system interfaces can be replaced with third-party application interfaces, while providing access to the control interfaces via the APIs of the systems. For example, if the user wants to provide a custom speed indicator, the speed indicator should be compliant (via APIs and/or mapping) with the system interfaces so that the speed readings can be populated to the third-party application. In operation 412, rules can be integrated with or applied to the applications and system user interfaces for when the vehicle is moving. As mentioned above, such rules can limit interactivity with certain user interfaces while the vehicle is moving to prevent unsafe driving. In operation 414, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In operation 416, the custom user interface configuration can then be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage which allows access to the user to program and modify the user interface using any computer or device having access to the Internet, including the vehicle itself or a third-party vehicle. The method then proceeds to operation 418 where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In operation 420, the method can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

Figure 15:
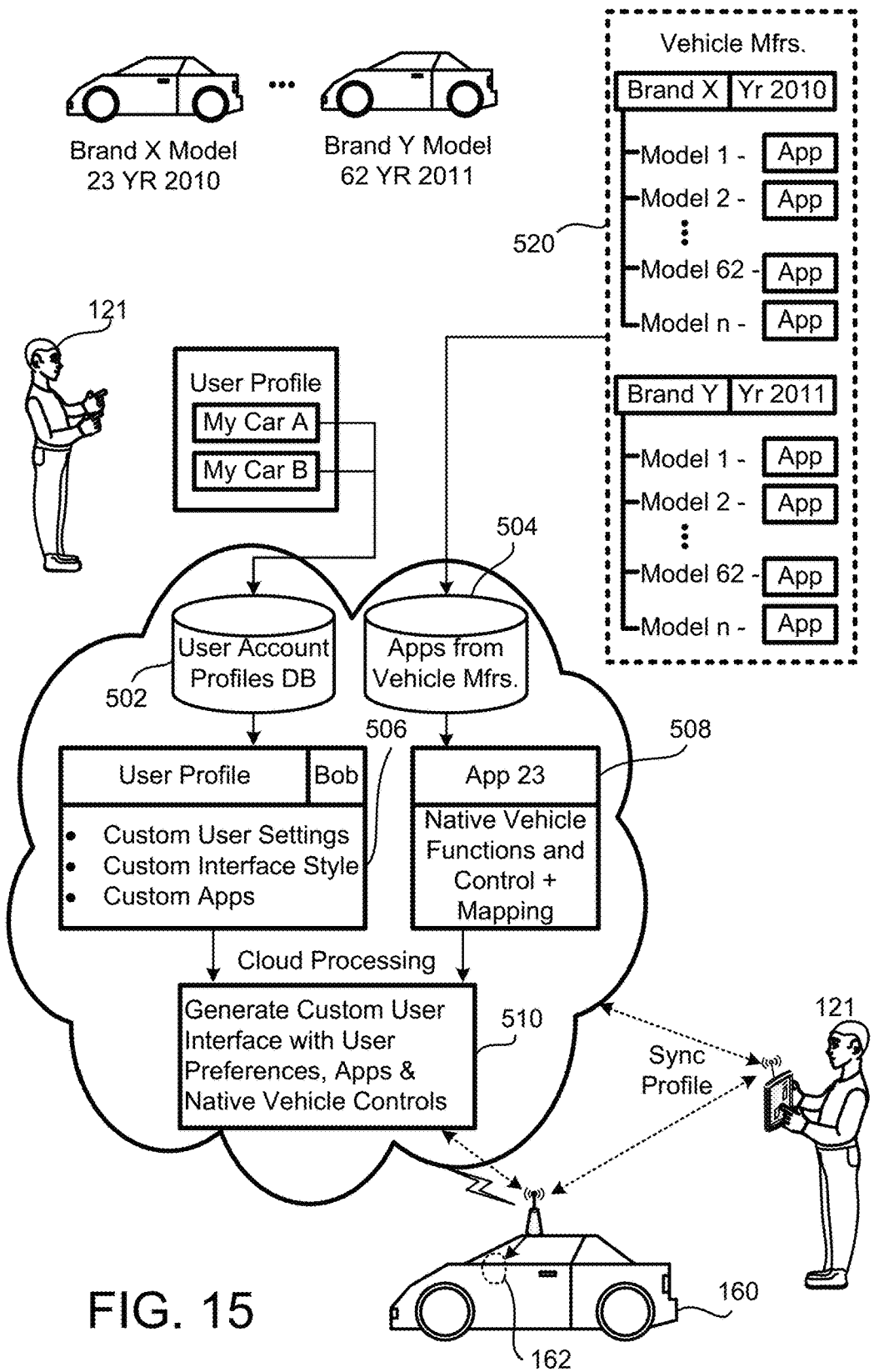
FIG. 15 illustrates another example, where a user uses a portable device to access the user profile, for one embodiment.

FIG. 15 illustrates another example, where a user 121 uses a portable device to access the user profile. The user profile, as mentioned above, can be managed by the cloud processing 120. The cloud processing may include a user profile database 502 (and other databases not shown) that allows the user to synchronize settings for various profiles, such as for "my car A", and "my car B", or the like. In one embodiment, the custom configuration can be transferred from vehicle to vehicle and for a period of time. The period of time can be a driving session. The driving session can be for a trip, a day, a week, a rental period, a lease period, etc. If the new vehicle receiving the profile has different system components, a re-mapping of system components to applications can be made. In some embodiments, alternate applications can be plugged in for the new vehicle which provides functionality similar to the application in the earlier vehicle.

Accordingly, the disclosed methods may allow users to add various vehicles to the user profile, including cars from different brands 520, such as Brand X and brand Y. In the illustrated example, the user profile for the user 121 may include custom user settings, custom interface styles, custom applications, and other custom settings and learned settings as described in this disclosure.

The users also able to select various applications from an application database 504, which may provide a plurality of applications from vehicle manufacturers, and the user can select applications for the vehicle types selected. In one embodiment, certain applications can include native vehicle functions as well as control and mapping protocols to allow the applications to interface with native system controls through appropriate map APIs. In operation 510, the custom user interface can be generated using cloud processing with the preferences set by the user, the applications, the native vehicle controls, and the customer arrangements. The profile that was generated can then be synchronized to the vehicle, such as car A.

The synchronization may include downloading of the customized interface from cloud services to the vehicle. In other embodiments, part or all of the customization created on the portable device or other computer can be transferred to the vehicle directly, without requiring transfer from cloud processing. In other embodiments, the synchronization or transfers can include operations performed by portable devices local to the vehicle, computing devices on the vehicle, computing devices of cloud processing, or combinations thereof.

Figure 16:
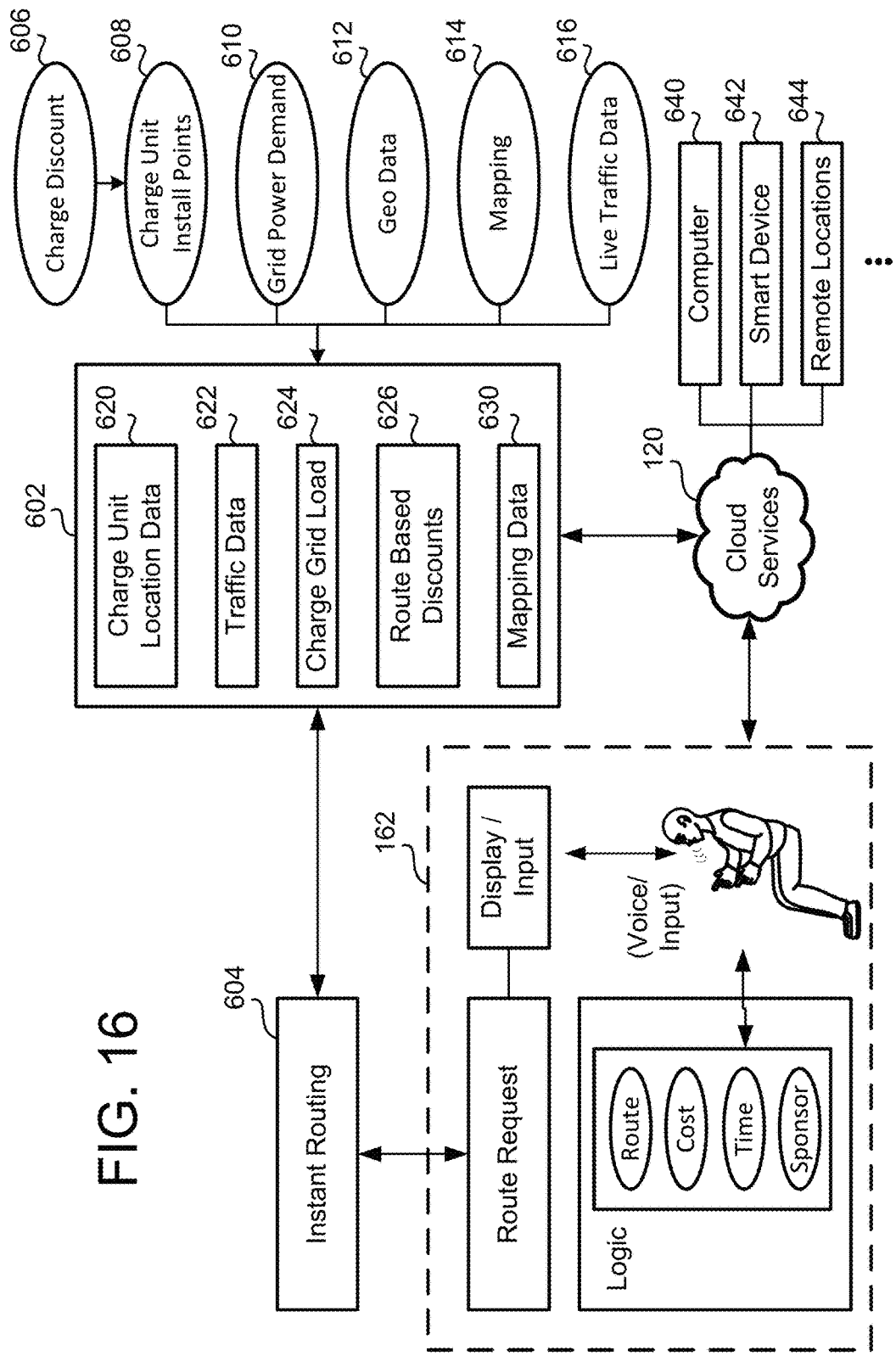
FIG. 16 illustrates an example of synchronizing other applications to a vehicle display, which may be customized by the user, for one embodiment.

FIG. 16 illustrates an example of synchronizing other applications to a vehicle display, which may be customized by the user. As shown, 602 shows a number of data collection and data interface modules, that can interface with third-party applications or applications executed on the Internet by cloud services or third-party cloud services. As shown, in the case of an electric vehicle, data associated with charge unit location data 620 can be collected from charge unit install points 608. The charger unit install points can also be providing charging discounts 606, which can then be transferred to data manager 602. Traffic data 222 can also be collected, whether the vehicle is electric or nonelectric.

Charge grid load 624 data can also be collected, for example for electric vehicle data. Charge grid load 624 can obtain data from a grid power demand source 610, which can include power company's local utilities and the like. Route based discounts 626 can also be provided to the user, by collecting mapping data 614 as well as discounts provided by goods and services providers in the marketplace. Mapping data 630 can also be managed, to monitor the location of the vehicle in relation to goods and services that may be provided when the vehicle is in proximity In some embodiments, discount data, advertisements, sales, goods and services offers, etc., can be provided to the user automatically based on the vehicle's location.

In other embodiments, the user can provide settings in the user interface that identifies which type of offers or discounts or information the user wishes to receive. In some embodiments, alerts regarding offers and discounts can be provided to the user in an audio manner, to avoid driving distractions. Live traffic data 616 can also be provided to the data manager 602, as well as geo-data 612. The data manager 602 is in communication with cloud services 120, to provide these services to computer 640, smart devices 642, remote location 644, and a display of the vehicle 162.

The display the vehicle can be interfaced with logic that runs on vehicle electronics. The vehicle of products can include memory and processors that execute instructions, operating systems, API processing, application management, telecommunications, network accessing, local communication with wireless devices, and general communication with the Internet. Route request can also be provided at the demand of the user via the display 162, and instant routing 604 can provide routes to the user based on data collected and managed by data manager 602.

Figure 17:
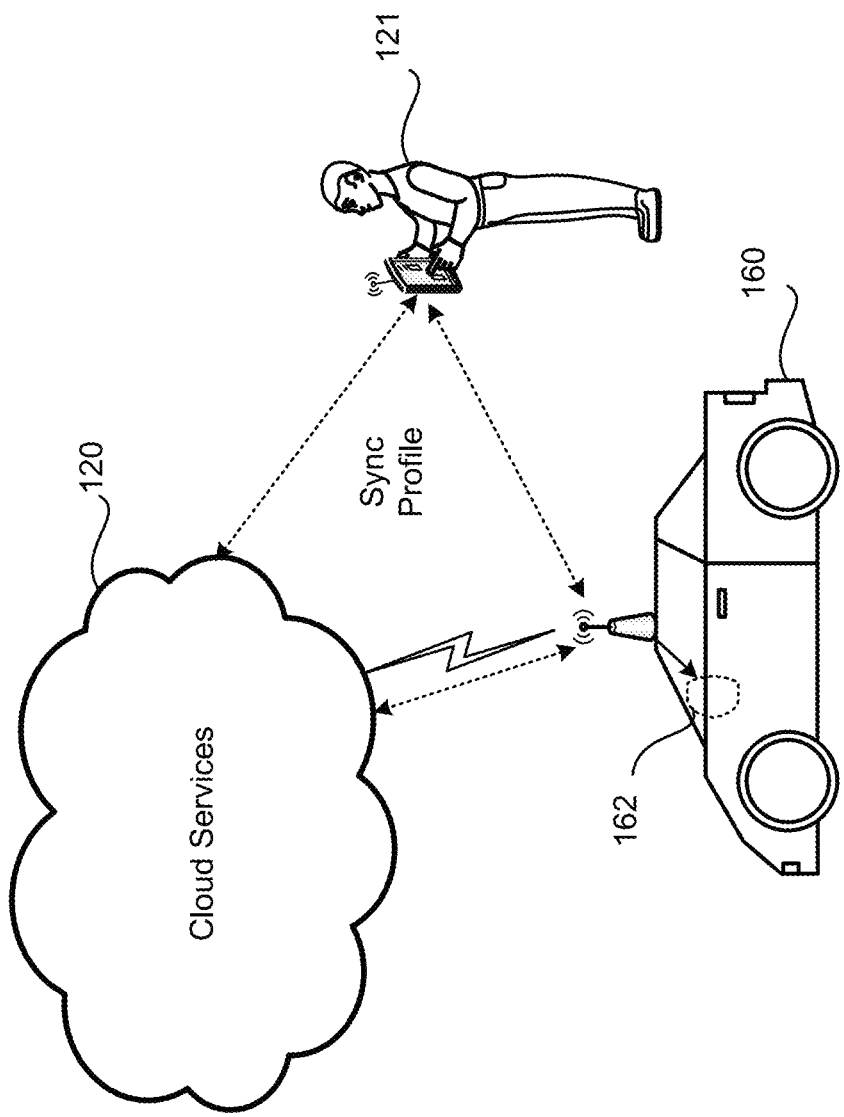
FIG. 17 illustrates example where the user holding a portable device can synchronize data from the portable device directly with the display of the vehicle, in one embodiment.

FIG. 17 illustrates example where the user 121 holding a portable device can synchronize data from the portable device directly with the display 162 of the vehicle. The display the vehicle can be a display on the dash of the vehicle, or any other location as mentioned in this disclosure. As mentioned herein, the vehicle electronics will be provided with communication with cloud services 120 provide access to the customize displays, customize settings, and customized services provided to the user as a vehicle drives.

Figure 18:
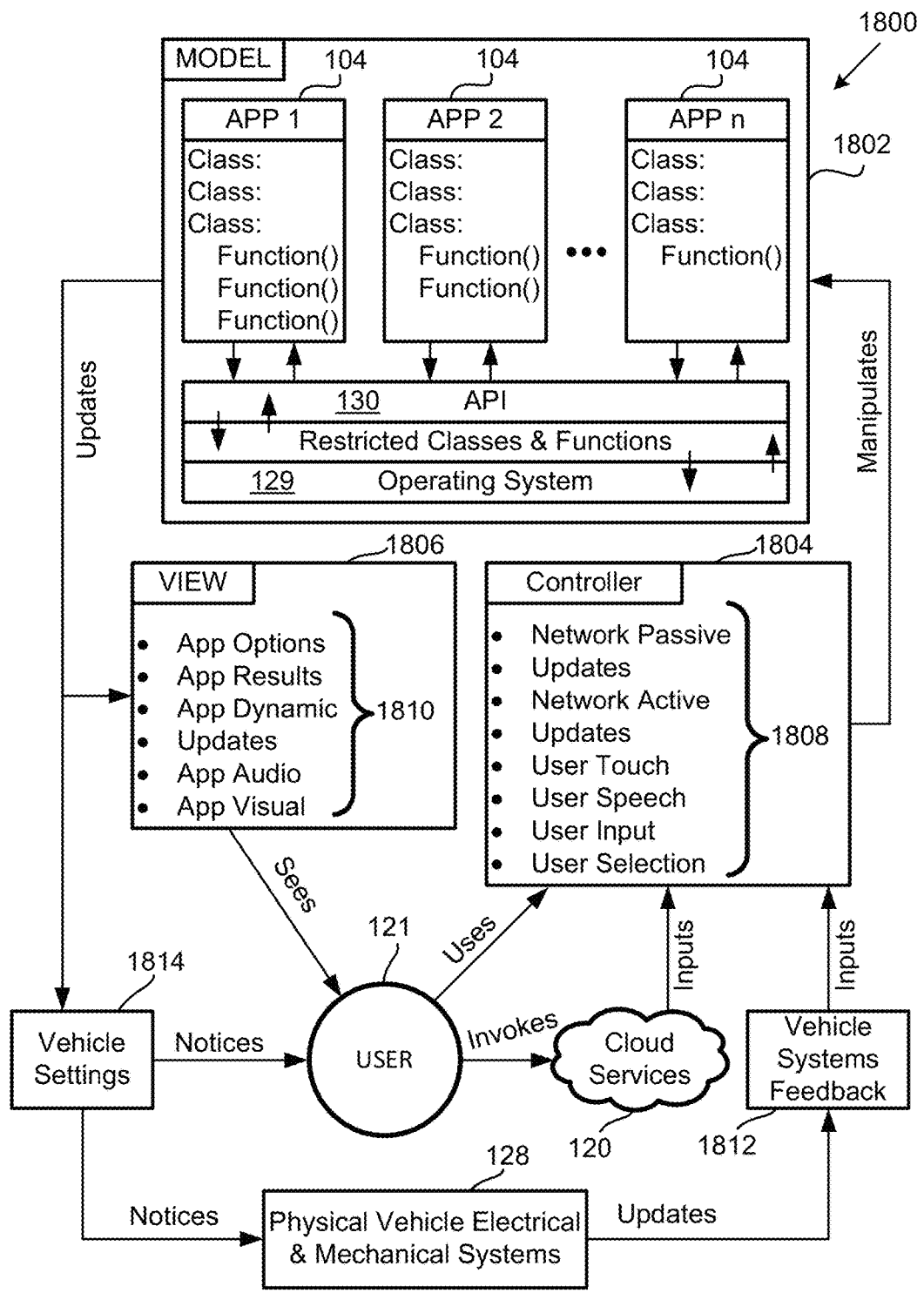
FIG. 18 describes a system in which a user interacts with a model view controller software environment useful for processing APPS using APIs on vehicles with vehicle operating systems capable of processing computer code, in accordance with one embodiment.

FIG. 18 describes a system in which a user interacts with a model view controller software environment 1800 useful for processing APPS using APIs 130 on vehicles with vehicle operating systems 129 capable of processing computer code. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, and audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Then, the system controller 1804 may receive additional updates from the vehicle systems affected or additional user 121; cloud services 120, vehicle systems feedback inputs 1812 to re-engage the user in a cyclical fashion. If no inputs are sensed, the system's controller will continue to poll it's electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 19A:
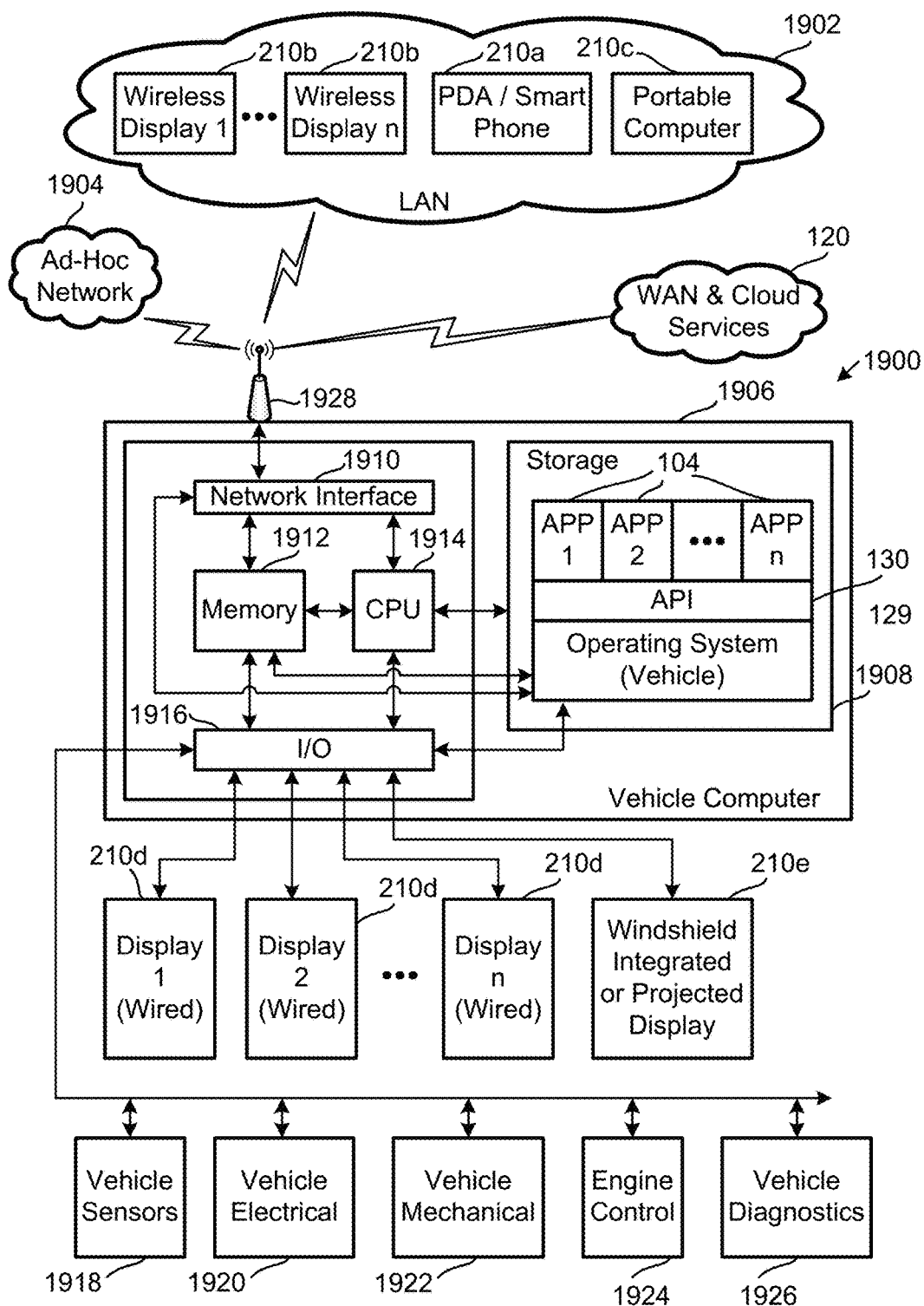
FIG. 19A describes how vehicle on board computer with input output system useful for accepting input, processing input and displaying results in conjunction with stored computer readable programs or functions in the forms of APPs may be structured, in accordance with one embodiment.

FIG. 19A describes how vehicle on board computer with input output system 1900 useful for accepting input, processing input and displaying results in conjunction with stored computer readable programs or functions in the forms of APPs 104 may be structured. Although system 1900 describes one way to provide vehicle on board computing power to run APPs 104, the arrangement of the vehicle computer 1906 may be altered or arranged in differing fashions with differing connection routing in order to achieve the same. In this example, vehicle on board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210*b*, portable smart phones 210*a*, portable computers, 210*c* and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210*b*, 210*a*, 210*c* as well as wired devices such as wired displays 210*d* or vehicle integrated display devices such as windshield heads up projected display or integrated glass displays 210*e*. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 19B describes one example of how stored data and function declarations may be compiled to provide intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of this memory location may be modified by stored procedures 1956 or functions.

This HVAC API 130 has the ability to store data relating to the vehicle's temperature, status, target temperature, split zone temperate, data from electrical and mechanical sensors, calendar dates, error information among others. Invocable functions 1956 are the methods by which a third party APP 104 may manipulate data 1954 on board a computer. Free access is not given to the restricted data on a vehicle's computer, thus a structured method or methods are described for user by third party APP developers. These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 19C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees. The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 20:
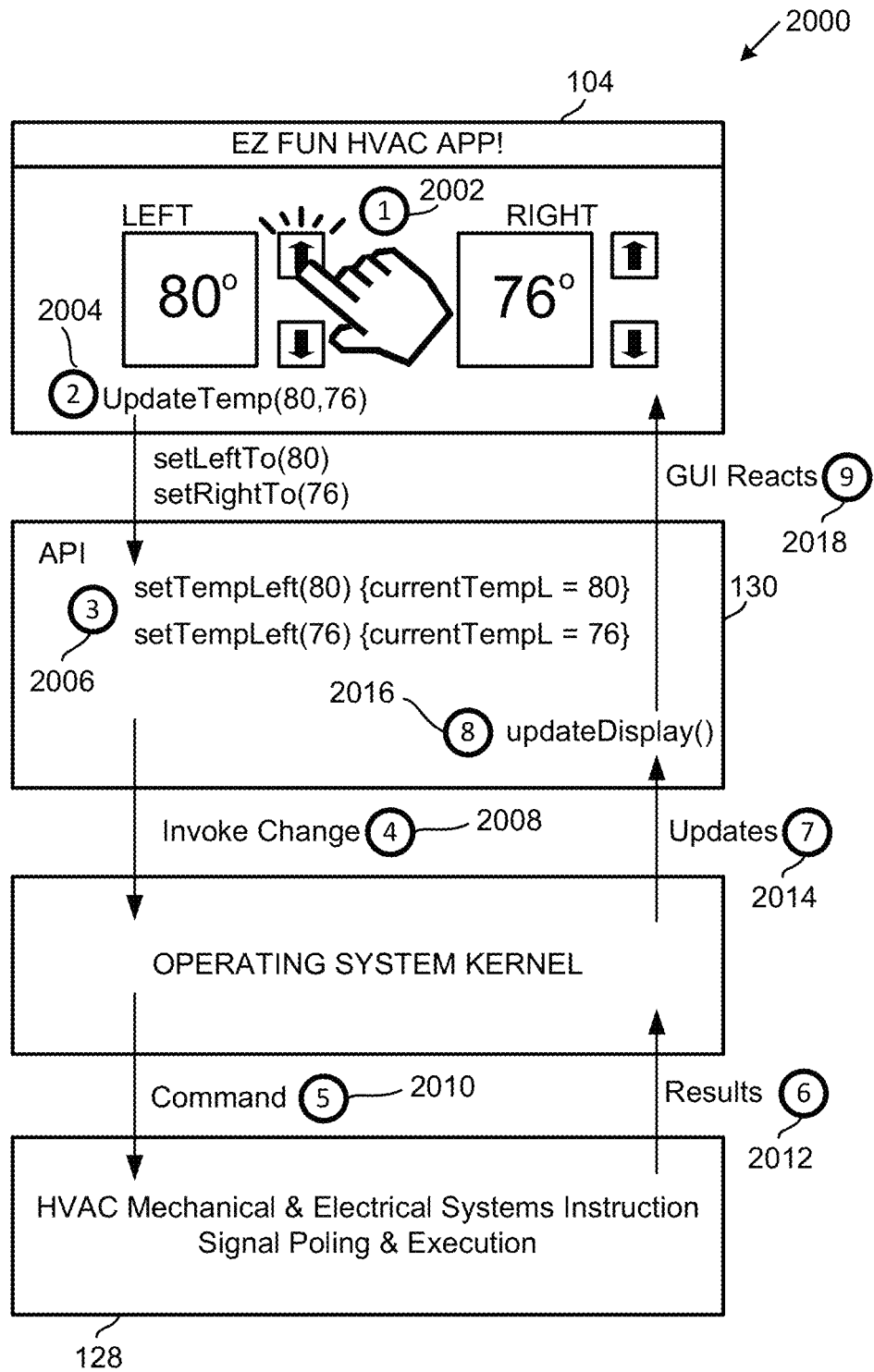
FIG. 20 describes the stepped flow of events as a user interacts with an APP, in this case, an HVAC APP, in accordance with one embodiment.

FIG. 20 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments.

The stored function may invoke other helper or associate functions within the API 130 in step 2006, which all in tern invokes restricted computer readable code at the operating system and or kernel level in step 2008. These invocations will then in turn command mechanical and or electrical systems in step 2005 in order to achieve the requested response in step 2002. The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 21:
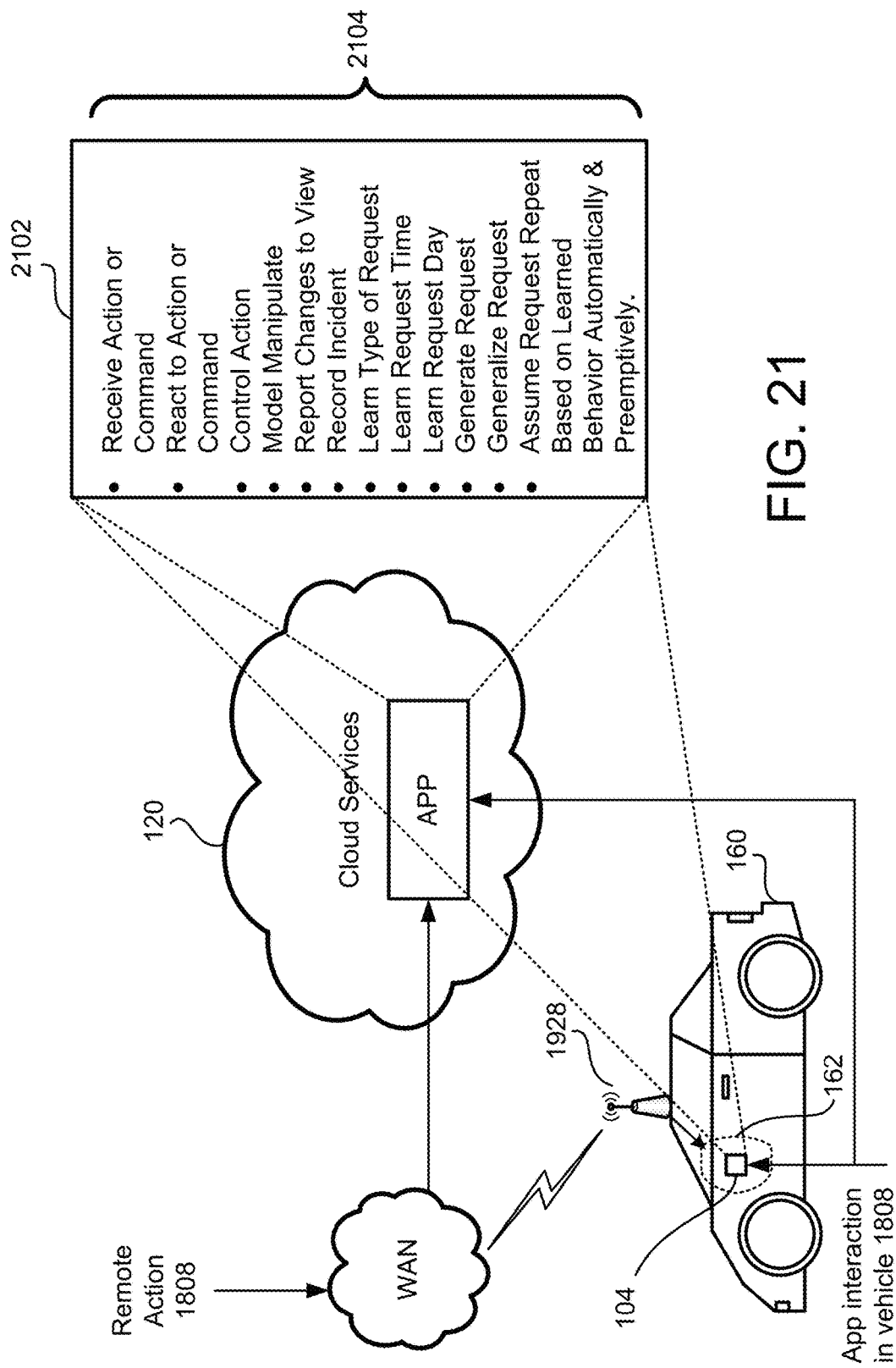
FIG. 21 Describes further ways an APP may take, process and produce results, in accordance with one embodiment.

FIG. 21 describes further example ways an APP 104 may take process and produce results 2100. FIG. 20 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly.

Some of the inputs and results 2102 that an APP can take and produce locally or remotely include but are not limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings. The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some cases, the settings can be manually adjusted by the user way from the auto settings. In such cases, the manual setting can be learned and can be provided more weighting since the user took the time to correct an auto setting. Thus, various levels of weighting or importance can be given to learn settings.

Figure 22A:
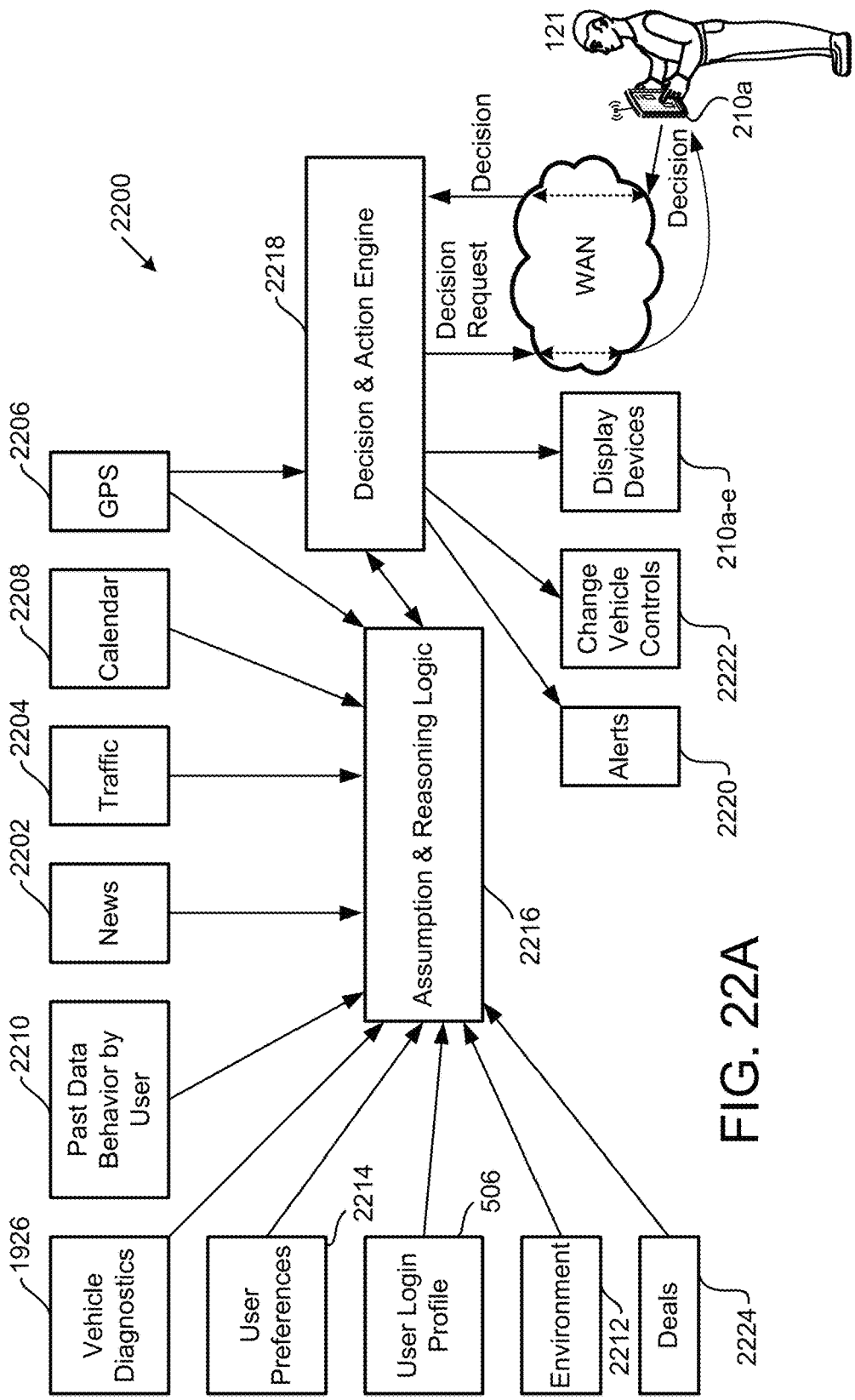
FIG. 22A describes an ecosystem where an APP in conjunction with a vehicle API may work together to make assumptions, make decisions and take actions, in accordance with one embodiment.

FIG. 22A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210a-e using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides a decision remotely on their remote device 210a, the decision engine 2218 updates the assumption module 2216 so that it can augment its assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 22B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future. These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 22C describes one example of what an assumption and reasoning logic module 2216 may produce using the data points collected on an ongoing basis in FIG. 22B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid-70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 22D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

Figure 23:
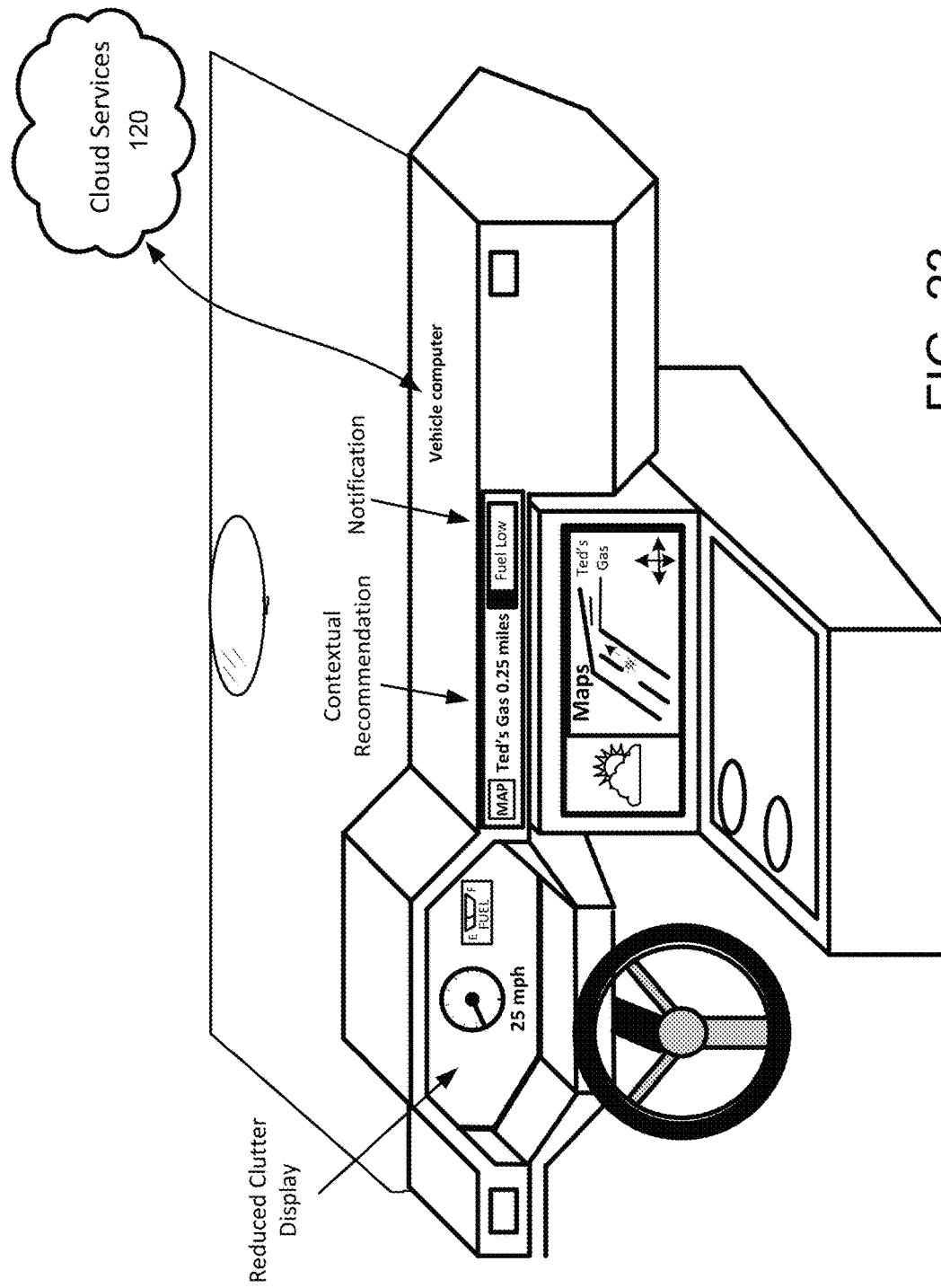
FIG. 23 illustrates an example of a vehicle dashboard having a reduced clutter display, contextual recommendations and notifications provided to the vehicle computer from cloud services, in accordance with one embodiment.

FIG. 23 illustrates an example of user interfaces and interaction modes provided on or for various displays of a vehicle, in accordance with one embodiment of the present invention. In this example, the vehicle is shown communicating with cloud services 120, utilizing the vehicle computer. As described above, the vehicle computer can include communication circuitry to enable wireless communication with the Internet and servers that can provide cloud services 120. In this illustration, the user interfaces or displays of the vehicle are shown with graphically rendered gauges, information, and data that may be relevant to the user of the vehicle.

In one embodiment, the user the vehicle may log into the vehicle or be paired to the vehicle automatically so that a user account of the user provides the preferences of the user for displaying select information and communicating with cloud services 120. Cloud services 120 can communicate with other Internet data sources, and cloud applications of the user, such as calendars, appointment books, reservations, websites, merchants, mapping applications, discount providing applications, charge location services, payment services, parking services, vehicle avoidance services, etc.

Continuing with the example of FIG. 23, the user interface provided in the main dashboard in front of the steering wheel has been rendered for the user account of the user in accordance with the user's interaction mode selection. As will be described below, the interaction mode selection will allow the user to either custom configure or select from custom configurations the type of information that would be rendered on the displays of the vehicle or provided via audio output of the vehicle. In this example, the interaction mode for the user account is one that has been selected to reduce the amount of clutter provided in the main dashboard interface.

As used herein, dashboard clutter or display clutter refers to when too many gauges, icons, information, GUIs, meters, text, pop-ups, colors, designs, animations, etc., are rendered on the displays, and which may cause distraction while the user is driving. Reducing the amount of clutter is a feature for vehicles that provide interactive displays that can populate so much information that a driver may become distracted. In one implementation, the level of information that may cause distraction will vary, as this is a subjective metric that is personal to each user/driver. In some embodiments, the amount of information provided to the displays can be dynamically changed based on the condition of the driving or non-driving of the vehicle. For instance, if the vehicle is not being driven, more information can be rendered on the displays for the user.

If the vehicle is parked or at a stop sign or stop light, more information may be rendered on the displays. When the vehicle is operationally moving, less information would be rendered on the displays so that clutter can be reduced. In one embodiment, more or less information or icons or gauges may be displayed or shown on the displays in a fade in and fade out fashion, so that the instant appearance of gauges will not be distracting sight for the driver. In one embodiment, when reduce clutter displays are provided, basic gauges for operating the vehicle or required by law will be required to stay viewable in the displays while the vehicle is being driven or is in operation. For example, a speedometer gauge is required or is vital to the driving of the vehicle, and therefore such gauges would not be removed or not shown when reduce clutter displays are selected. It should be understood that reduced clutter is subjective, and the interaction modes provide for different types of modes and modes that can be customized or customized over time, such that the level of information is not distracting to the particular user, from a personal and subjective view point.

In one embodiment, the information that is provided on the displays can be dynamically set based on the context of the vehicle's state, the user's calendars, the weather, and other factors. In one example, the fuel gauge shown in the main dashboard display of the vehicle in FIG. 23 is shown to include a fuel gauge. The fuel gauge in this example is shown to have appeared on the dashboard display because the vehicle's state is that the fuel is low and requires refueling. In one embodiment, the vehicle computer can be communicating with cloud services 120, which will automatically identify information regarding available fueling stations nearby.

For example, one of the displays of the vehicle shown in FIG. 23 illustrates that contextual information can be provided as a recommendation, which identifies that a gas station is within 0.25 miles of the current location of the vehicle. In addition, a mapping service or map program of the vehicle can be automatically displayed on one of the displays of the vehicle showing the location of the gas station (e.g., Ted's Gas). Accordingly, the information being displayed on the vehicle is contextually related to the state of the vehicle, the location of the vehicle, and applications are automatically loaded and provided for generating information relevant to the vehicle and its state.

Figures 24A, 24B:
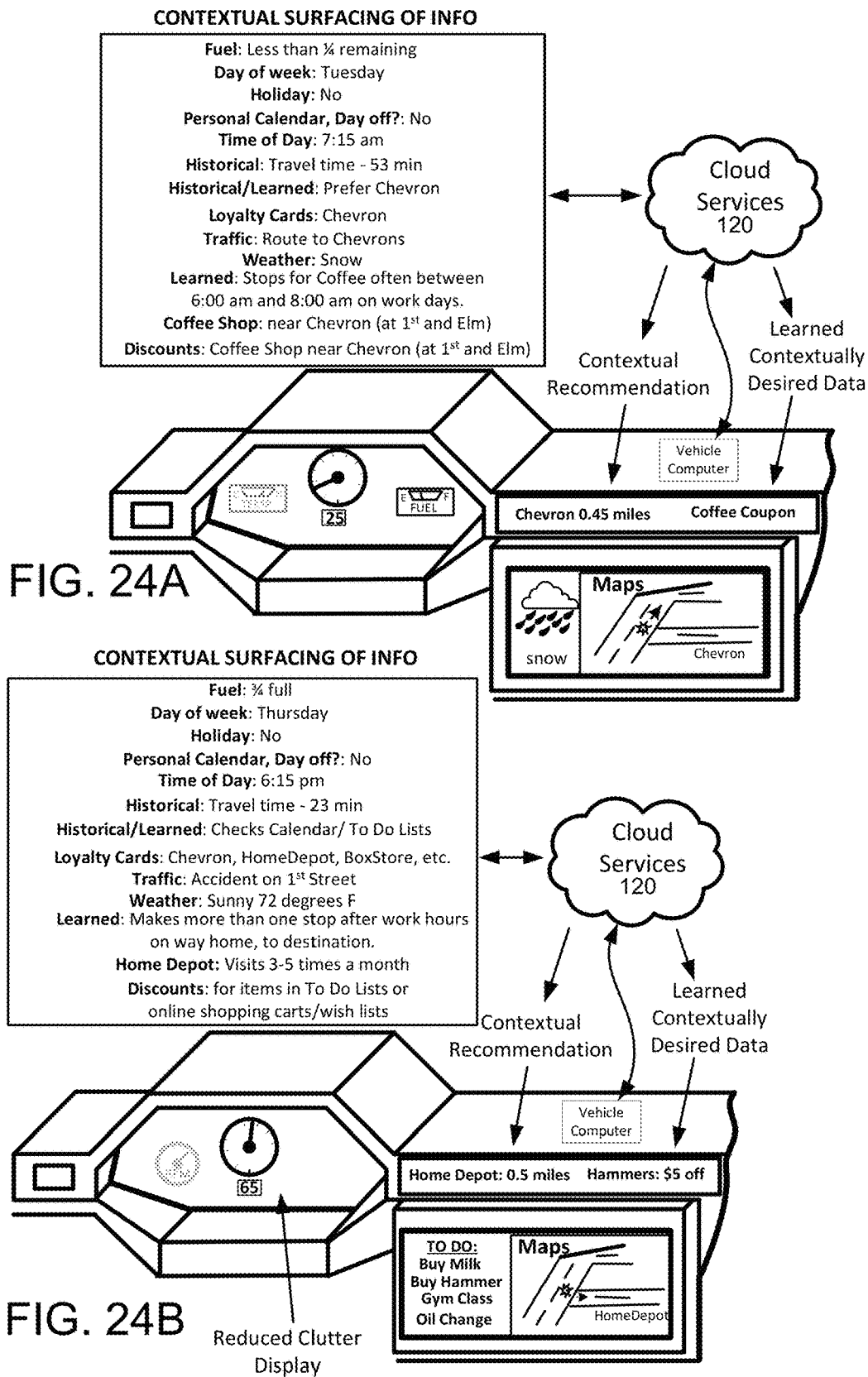
FIGS. 24A, 24B, and 25 illustrate examples of contextual information analysis for information that concerns operational states of the vehicle, personal information associated with the user, learned patterns or behaviors of the user, the time of day, geo-location, and other dynamically changing parameters that are synthesized to identify contextual recommendations that are displayed to the user's interfaces and automatic launching of applications and content in applications based on information that is believed to be needed at the time and at the location and for the user and based on other factors, in accordance with one embodiment.

FIG. 24A of displays of a vehicle, which are cost to interactively show display items based on the context of the vehicle and the context of the user and preferences of the user. In one embodiment, the preferences of the user can be learned over time by examining use patterns of the user, which are signals indicating actual preferences by the user. In other embodiments, the patterns of use, interaction, preferences, inputs, memberships in loyalty programs, shopping history, prior use of discounts, and other information can be used to identify what type of contextually related information should be displayed to the user aced on the current state of the vehicle and the current state of the user and the geo-location of the vehicle.

In this example, the type of information that is surfaced to displays of the vehicle can depend on the context of information associated with the user, who is logged into the vehicle by way of a user account that is connectable to cloud services 120. In this example, certain information can be examined to determine what type of contextual recommendation can be provided to the user, and what type of contextual information can be provided based on learned behavior of the user, which provides a prediction or likelihood of the type of information that may be most relevant to the user in the particular context. In one embodiment, a server may determine what data to send to the vehicle, and when sent, the data can be presented on a screen or audio output of the vehicle.

In one implementation, the data sent can include a time threshold that identifies (e.g., identifier or tag or data) when the data can be presented or when the data may no longer be presented. The time threshold can be in the form of data, a tag, a marker, an identifier, flag, or the like, which identifies when the data should no longer be presented (e.g., data may become of context and thus no longer contextually relevant). For example, the data may be relevant for a particular time, window of time, or period of time. If the period of time has passed, the data can be considered stale, such that the data is no longer allowed to be shown, even if the vehicle received the data. For example, the data may be sent to the vehicle when the user is actively using some display or input, and the use of the display or input may prevent the sent data from being presented. In this example, the data is held (in memory) until the user has completed the input (or use of the vehicle, or personal device that may be active (e.g., phone, tablet, directions device, etc.)) to avoid interruption.

Once the interaction has been completed, vehicle software and/or electronics can determine that the data received is no longer valid, stale or no longer relevant to the current geo-location, personal preferences, vehicle condition, or some other factor. In one implementation, therefore, data that is sent to the vehicle for presentation or surfacing may not be presented, if other local conditions, user conditions, and/or geographical conditions determine that the data is stale or no longer useful. Thus, gating the data from presentation, even after receipt by the vehicle, enables for presentation of possibly un-needed data to the user, thus reducing distractions.

In another example, contextual information that may be viewed may include them on a fuel that remains in the vehicle at the particular time (which is a state of the vehicle, among many different types of states of the vehicle), the day of the week, whether the day of the week of the holiday, information from the personal calendar, historical travel times during the time of day, the time of day, loyalty cards that the user may hold or like, traffic information associated to the current geo-location of the vehicle, the current weather, learned past behavior (when the user likes to stop for coffee), nearby coffee shops (coffee shops being a learned type of good liked by the user), discounts located nearby, discounts located nearby other services that are needed at a particular point in time, and other factors.

These contextual types of information associated with the user, the vehicle, the number of passengers in the vehicle at the time, the user's calendar, the users likes, the users past interactions, the predictions of what the user wishes to see or may want, etc. are only but a few examples, and are shown without limitation.

Continuing with the example of FIG. 24A, based on the contextual information obtained by the vehicle computer from cloud services 120 and from information stored in the vehicle computer or obtained from a computing device of the user, determinations can be made as to the type of contextual recommendation that may be surfaced to a display screen of the vehicle.

It should be understood that surfacing too much information can cause distraction while driving, so therefore contextually relevant information that is predicted to be needed or wanted at a particular point in time should be displayed as a contextual recommendation. It is believed that the information that is automatically being contextually provided to the user on the displays is information that would have been searched for by the driver.

Thus, by providing the intelligence surfacing of contextual information to displays and or audio outputs of the vehicle, less distraction will occur because the driver will not need to interact with user interfaces, but instead the information will be provided to the driver just as the driver will need the information. For example, the drivers being provided with information to the closest Chevron station which is 0.45 miles away from the current location, a map to the Chevron station is shown, and a coffee coupon is also shown on the display.

The coffee coupon is provided to the user because the coffee shop is located near the Chevron and the user typically purchases coffee during this particular point in time and the coffee shop is next to the Chevron where the user will likely wish to purchase gas based on his ownership of loyalty cards for Chevron. As such, this information has been provided to the user at time when the user would want or need the information, which cuts down in screen clutter and also reduces distracted driving.

FIG. 24B illustrates yet another embodiment of contextual surfacing of information to one or more display screens of a vehicle or surfacing of audio to the vehicle. In one embodiment, the user prefers to have a low clutter screen, wherein the display panel in the dash has few items, such as vital gauges needed for driving the vehicle. In one example, at a minimum, a speed gauge is provided. As the driver drives around, from time to time, depending on the context or state of the vehicle, certain gauges may be surfaced to a display.

As shown, an RPM (revolutions per minute) gauge may surface gradually on the main dashboard display when it is determined that the vehicle's RPMs are too high. The gradual surfacing, in one embodiment, allows for reduced distraction of the driver. This is because fast surfacing of gauges or icons on the display screen may distract the driver to look down and away from the road. However, when the gauges are surfaced in a fade in from light gray to full color or contrast, the driver will notice the newly surfaced information gauge when the driver next looks down at the gauge.

In the example of FIG. 24B, it is also shown that the contextual information regarding the user, the vehicle, the geo-location of the vehicle, the time of day, the day of the week, and information found in the user's online calendars and to-do lists can be mined to provide contextual recommendations. As shown, as the vehicle is communicating with cloud services 120, contextual information can be provided to the vehicle display(s). The contextual information, at the particular time of day and when the user is driving or activating the vehicle, is provided when the user is likely going to need the information.

For instance, the current to-do list shows that the user needs a hammer (and other things), and because the user is near a store that sells hammers, that information can be provided to the user. The information is provided or surfaced to the user by presenting it on a display, after cloud processing determines that other contextual parameters suggest that the user would be interested in a particular good or service, e.g., in this example a hammer, at that particular time of day and day and particular geo-location. In addition, learning systems also can determine that the user usually likes discounts, so special discounts can be automatically searched for from various online and off-line retailers, and the discount or coupon can be surfaced to the vehicle display at the time the contextual information is provided to the user.

As shown, in addition to presenting the distance to the user, providing a map to the store location, the discount is presented on the display. The discount can be provided for use by the user in various ways. In some examples, the discount can be automatically sent to user's device (e.g., smartphone, tablet, watch, etc.). The discount can be in the form of a digital coupon, a code, a link, or some other identifiable form. In still another example, the coupon can be provided to the user when the user selects it on one of the displays of the vehicle. The coupon can then be transferred to the user's device, or can be sent to the retailer (with the user's account info), so when the user arrives at the store the coupon is automatically credited, or can be sent from the server directly to the user's device.

Figure 25:
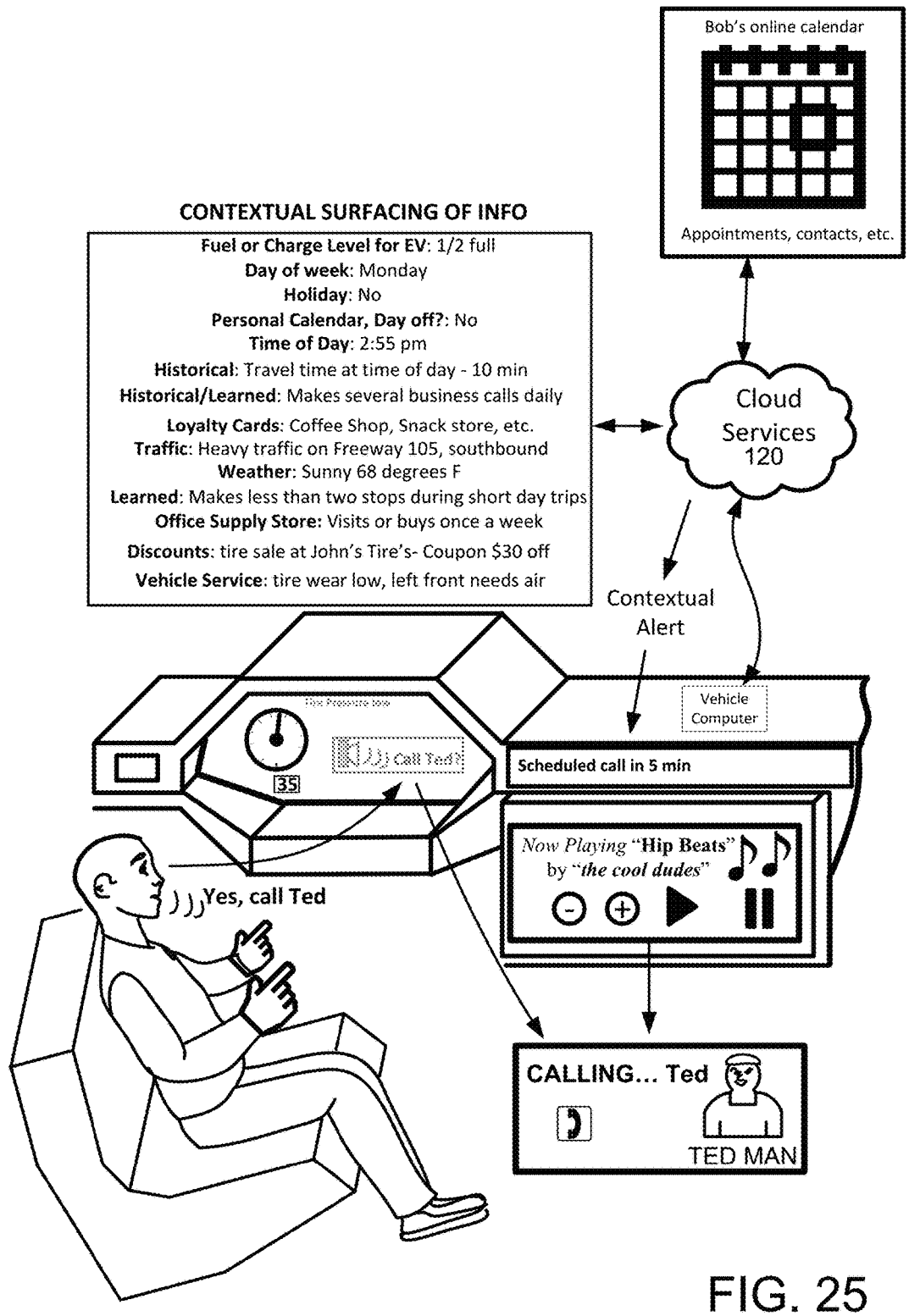

FIG. 25 shows another example of intelligent gathering of contextual information for the user and surfacing just the information that is determined to be useful to the user, in accordance with one embodiment. In this example, the vehicle is an electric vehicle (EV) that requires charging from time to time. The system is also configured to connect with the user's accounts (e.g., for a user that is registered, has a user account and is actively using his or her account when occupying or driving the vehicle). As in other examples, the main dash of the vehicle has a screen that is configured to render icons, gauges, displays, data, and other vehicle information. In one interface mode, low clutter is selected.

The low clutter selection (e.g., selectable as an interaction mode) is configured to present very few icons or gauges, such as those that may be required for vehicle operation. In the illustrated drawing, the main gauge that is shown is the speed gauge and an optional digital read out of the speed. As the user drives around or uses the vehicle, it turns out that the user's calendar determines that an appointment call needs to be made. This determination can be made by reference to the user's online calendar or calendar on a device that is shared with the vehicle. The appointment to call is, for example, "Call Ted."

At the time the appointment time arrived, the user was listening to music, but if the vehicle computer/server determines that the call should be suggested, the vehicle display can change to show "Calling . . . Ted." Also or alternatively, the main dash of the vehicle can show an icon that is surfaced gradually to the display, which may be an indicator of an audio-interface. The audio interface can, for example, as the user if he wishes to call Ted, and the user can simply answer by voice input. The voice input can then trigger the activation of the call for the user. Still further, other parameters, in addition to the calendar can be analyzed to determine that the context is appropriate for surfacing the question to the user.

The analysis can include, for instance, processing the information associated with the current context of the user, the vehicle, the current time of day/week, historical data, weather, discounts, service data, etc. Over time, based on the selections, choices of interfacing, what was selected and when, what was selected when the vehicle was particular geo-locations, what was selected and how many people were in the vehicle with the user, selections or preferences made by passengers of the vehicle, and other data. This data is mined to find overlapping intersections in data and to apply rules and assumptions that form learned data and patterns. This learned data and patterns are used to build a learning database that can grow to include richer data over time, and can assist in providing intelligent contextual data for display on the displays of the vehicle or for audio output to the vehicle.

It is believed that by providing users with information they need, they will spend less time making raw user interface selections (e.g., requiring one or more inputs, taps, touches, swipes, navigations, launching of apps, selection menus, inputs, etc.), which may increase distraction. In one specific example, data from a user's online data sources can be mined to provide information the user needs and contextually when needed.

For instance, if the user's email shows that the user has booked airline tickets and the time of departure is within 2 hours, the user may be provided with a map to the airport, may be provided with online checking interfaces for voice entry may provide rental car check-in or return information, etc. Thus, based on the context of what the user is doing, what the user has planned, when the user has done in the past (e.g., learning), certain information can be surfaced for consumption by the user. The result is less distracted driving, and efficient usage of the user's time.

In one embodiment, information/data that is sent to the vehicle, from a server, has a higher likelihood of being consumed or used when it is examined for context. As used herein, the information is likely to be accessed, consumed, viewed, read, listened to, and otherwise used, when the information is sent upon confirming context of one or more dimensions (e.g., geo-location, vehicle state, user history, learned preferences, current interaction, etc.). In one embodiment, data that is sent, but not yet presented, may lose context, and that data may be come stale. In such cases, data may not be presented by the vehicle, even after safe receipt by the vehicle electronics. Thus, context can be checked at the vehicle as well, and/or the data can be received with identifier data that identifies or tags when such data sent is or may no longer be valid. Thus, in one embodiment, the vehicle may simply filter or cull out information (e.g., supplemental content) that may no longer be valid, based on the received identifier or tag, e.g., such as the time frame of when the data was valid has passed, or the vehicle is no longer close to a particular merchant, or the like.

Figure 26A:
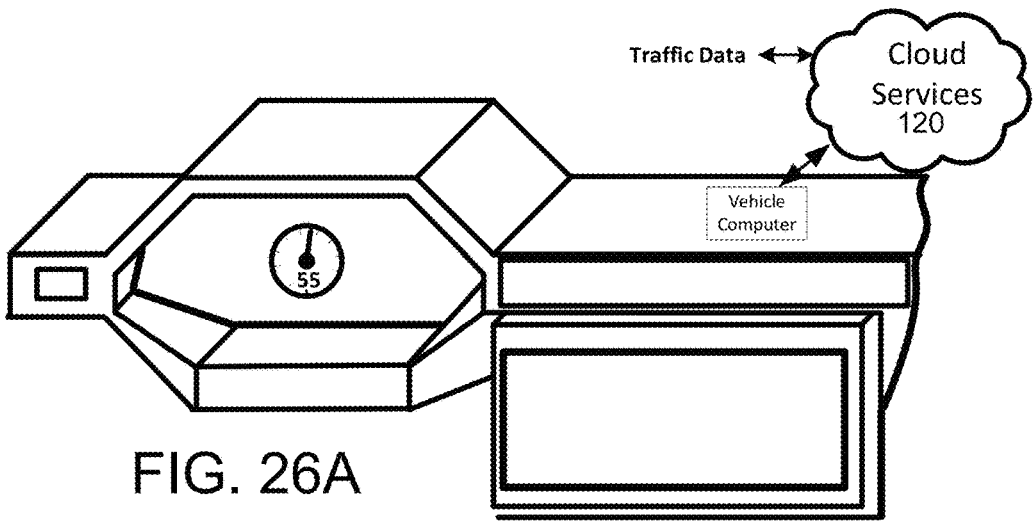
FIGS. 26A-26C illustrate examples of interaction modes selected for the vehicle, and the manner in which content items are displayed on the one or more displays, the manner in which information is surfaced or provided to the driver or occupants, and the dynamic automatic presentation of content on the displays which are contextually related to factors that include the geo-location, content in a user's calendar, learned preferences or behaviors, the time of day, and other parameters in accordance with one embodiment.
Figure 26B:
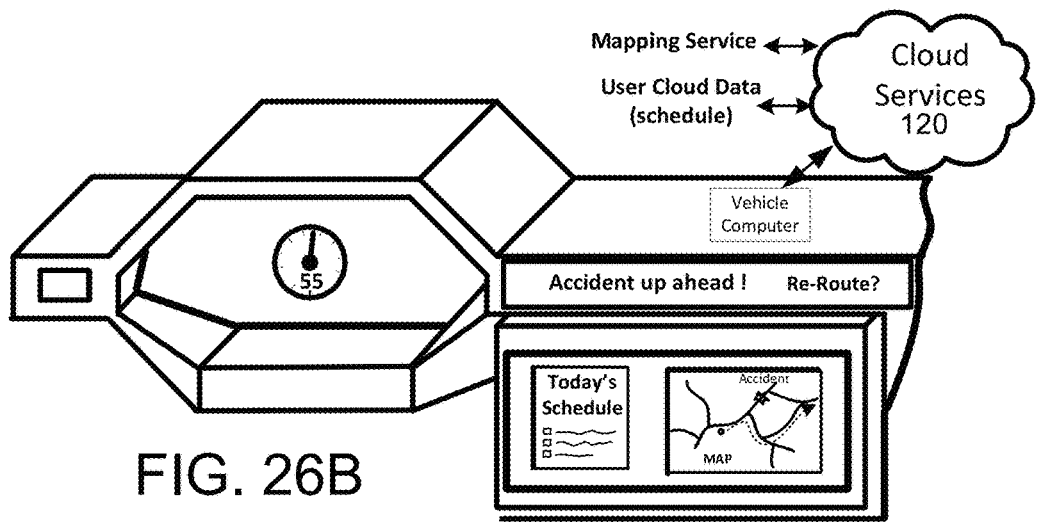
Figure 26C:
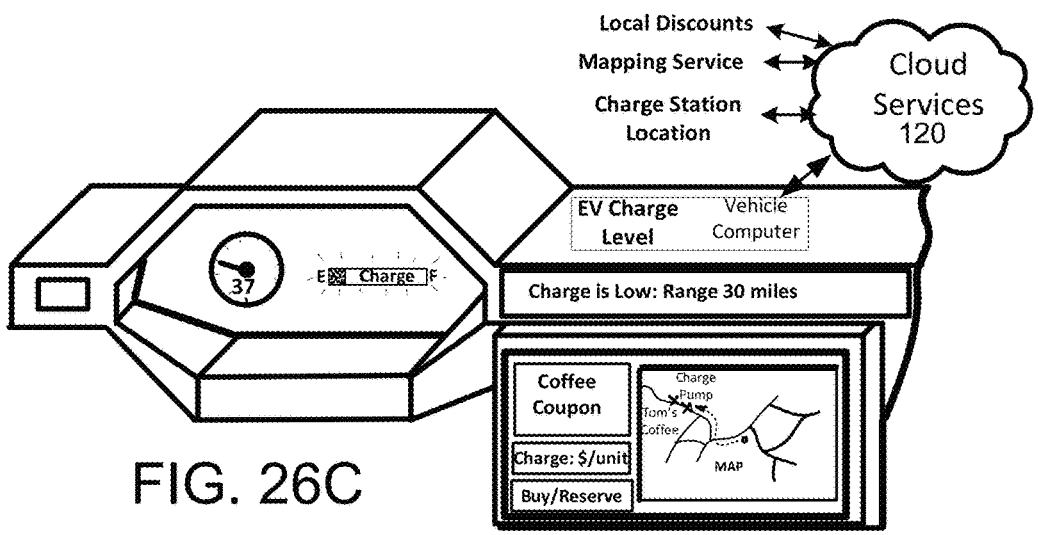

FIG. 26A-26C illustrate several embodiments, where a user has selected an interaction mode that reduces clutter. The reduced clutter display is shown in FIG. 26A, where nearly all display items are clean or not shown. The display can be provided with wallpaper or skins that reduce distraction or can be turned black or a different color that allows for the screens to blend-in to the look and feel of the dashboard. For example, if the surround parts of the screen appear to be leather or steel, the image on the screen can simulate an extension of the physical nature of the dash or vehicle parts. In this case, the cloud services 120 may still be monitoring information to determine what to surface to the display screens.

In one embodiment, traffic data is obtained when the system determines that the user would likely be checking traffic information. This may be triggered when, for example, the user appears to be taking longer to drive home after work than normal, or the driver is driving slower than a current speed limit of a road, or a traffic accident is identified ahead, or based on learned use (e.g., the user typically checks traffic at 5 pm on a workday, etc.).

In FIG. 26B, the displays are shown to be populated with information obtained by cloud services (or obtained by the vehicle, or obtained by a device of the user in the vehicle, or combinations of two or more thereof). The system may alert the user that an accident is up ahead. The user, based on account information (e.g., history of user, propensity, or likelihood), may usually select to re-route, so the system automatically provides a re-route in the map on the display. In one embodiment, data for information associated with the geo-location is sent to the vehicle when the profile of the user identifies likelihood for consumption of the information associated with the geo-location. An example may be, without limitation, a user drives by a Chevron gas station, but the user prefers Teds Gas, so the user will not stop, even though the vehicle needs gas and the user is proximate to Chevron. The user would be viewed to not have a likelihood to consume information regarding the nearby Chevron.

If the user's shows that the user does not have appointments or does not urgently need to arrive at the destination, the system may not provide a re-route option if the extra distance is more than the user likes to drive. Other contextual information can be mined, including a learned profile of the user, which shows what the user likes, does, prefers, has done over time as a pattern, etc.

FIG. 26C illustrates example where the user's EV is running low on charge. The system may surface this information the main dash display (e.g., either gradually, instantly or in a gray-tone or some special identifying color. The speedometer may also be slowly shifted (or slide) to the left, as the more relevant information that is surfaced is placed near the center of the main dash display. In one embodiment, the center dash is considered one of the least distracting locations for driver to view.

Alternatively, the information can be displayed in a heads-up display on the windshield of the vehicle (e.g., as overlaid or non-overlaid text or icons or graphics, videos, or combinations), which reduce distraction of the driver. Continuing with FIG. 26C, other displays also show contextually relevant information, such as the range remaining for the EV, coupons for coffee near the charge locations, the price of charge, the option to buy ahead of arriving, buying to reserve the EV charging spot, etc. As noted above, the contextual information is processed by parsing data obtained over the internet, data obtained from the user's history profile, data obtained from learned preferences or habits. In some embodiments, the history profile can itself include learned preferences of the user, by way of the user's account.

Figure 27:
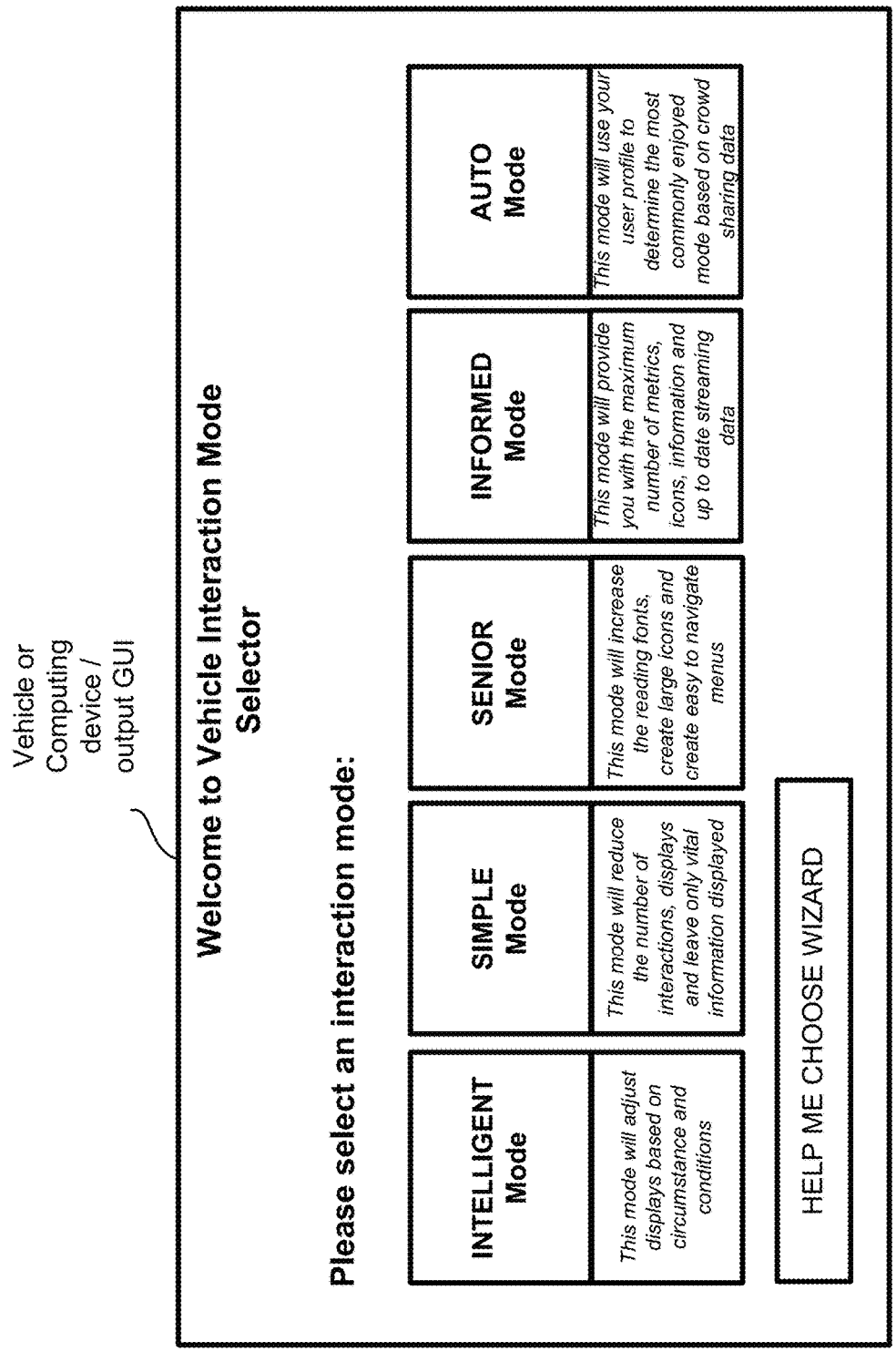
FIG. 27 illustrates an example of various interaction modes, and a method for selecting the interaction modes on a display of a device, the vehicle, a mobile device, or any other Internet connected device, in accordance with one embodiment.

FIG. 27 illustrates an example of a screen that may be presented in the vehicle or a computing device or on some graphical user interface (GUI), in accordance with one embodiment of the present invention. In this example, the type of information presented may be to allow a user to select an interaction mode to be used for the vehicle. The interaction mode is used to identify the type of interactivity, complexity of data presented on the displays of the vehicle, types of data that can be or desire to be sent to the vehicle for consumption by a user and preferences that would be liked by particular types of people.

Because people vary in preferences widely, the example of providing different types of interaction modes for particular vehicle will simplify selection by users so that the interaction mode best fits their desired use or intended use of the vehicle. Some people are more technology savvy while others wish to avoid technology altogether or at a reduced consumption rate. In the example shown, various modes can be provided. Although five modes are provided as an example, more or less modes can be provided depending on the design or implementation.

The example modes include an intelligent mode, a simple mode, a senior mode, and informed modes, an auto mode, etc. These modes identify the type of interactivity or the weighted the user wishes to identify interaction with his or her vehicle. As noted herein, the modes can be assigned to the vehicle for when the user is present in the vehicle, and need not be tied to the specific vehicle. For example, if a user account has identified the type of mode they wish that operate one or more vehicles, that mode can be transferred to a specific vehicle for a period of time. For instance, a user may wish to operate a shared vehicle and the mode in the users account can be transferred to the shared vehicle.

The user may wish to transfer the interaction mode to a rental car. The user may wish to transfer the interaction mode or activate the interaction mode on a personal vehicle when that particular user is the driver. In other embodiments, a vehicle can transfer between one interaction mode or another interaction mode based on user input. In some embodiments, the user may choose to utilize a wizard, which will allow the user to his or her type of descriptive behaviors liked or disliked when operating a vehicle.

These behaviors are descriptive, and need not be specific to an actual setting. Once the descriptive behaviors are selected by a user, the wizard can identify a specific type of interaction mode which will then apply a plurality of settings for the interaction mode.

Figure 28A:
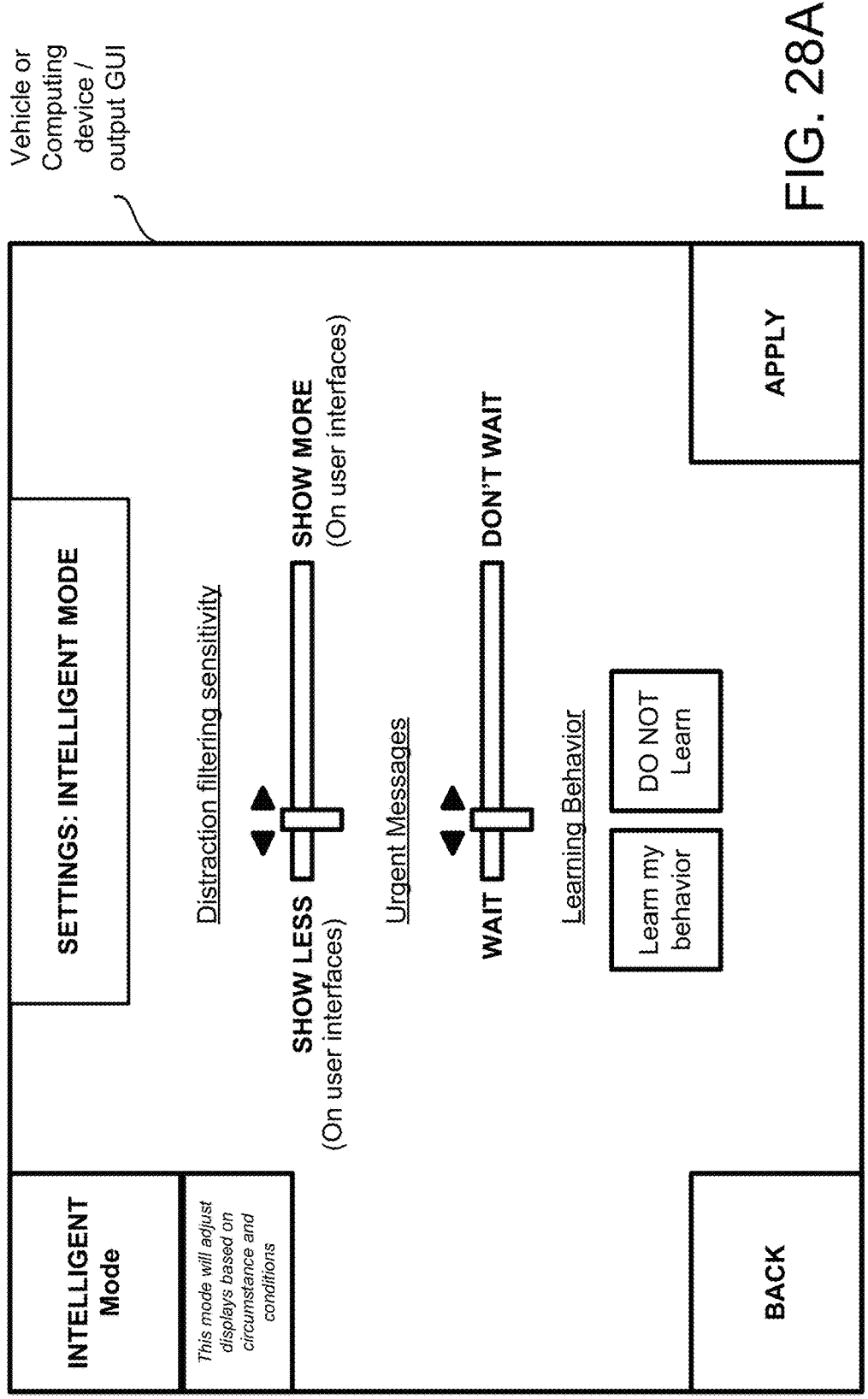
FIGS. 28A-28E illustrates examples of interaction modes of a vehicle, for user account and a profile, and methods for selecting various modes or adjusting settings within the modes, or defining when learning should take place for specific settings or modes, in accordance with several embodiments.

FIG. 28A illustrates one example of settings for an intelligent mode. In this illustration, the mode can allow user to dynamically adjust certain features of the mode. Certain features can include distraction filtering sensitivities and when urgent messages should be delivered to a vehicle display or output by a speaker. Even though the user has selected intelligent mode, the user may wish to show less icons on the displays to reduce the distraction, and reduce clutter.

In other embodiments, the user may wish to receive messages less frequently, so that less distraction is occurring yet the user is receiving messages using intelligent mode. Furthermore, the user can select to learn the user's behavior over time as an express setting. The user can also select to expressly limit learning by the system of the user's behavior, and relied on the settings provided by the mode.

Figure 28B:
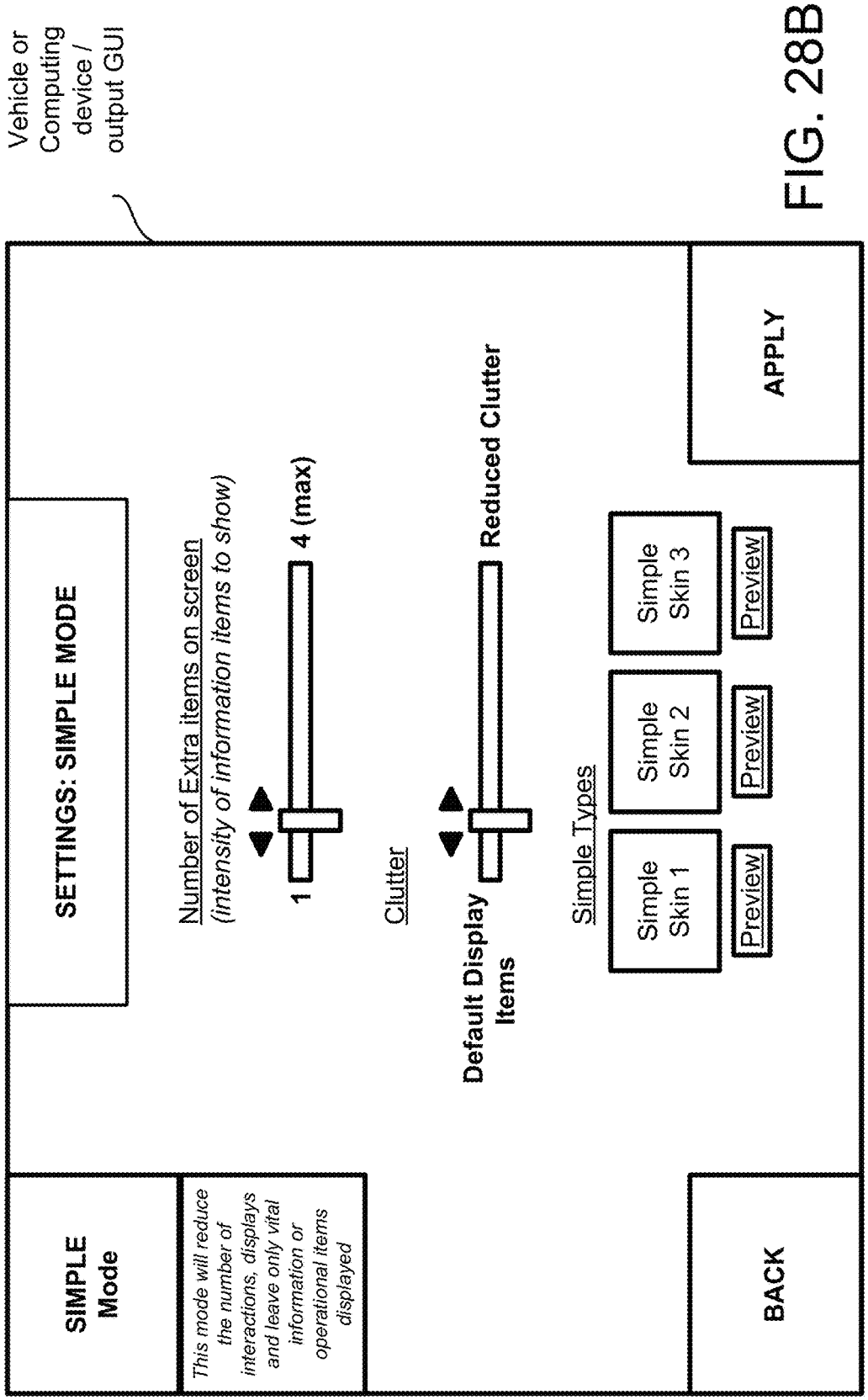

FIG. 28B illustrates an example of a simple mode, which may be selected by the user. In this example, simple mode may allow user to further fine tune the number of items to be shown on the screen, which may reduce the intensity of information items to show. The user may select the drag or move the slider on the screen or other selection input methods, which are included herein without limitation to the example shown in the drawings. The setting may also allow the user to select a clutter setting.

The clutter setting may allow the user to reduce the clutter provided to the displays of the vehicle. For instance, the display may be made more simple, the display may include fewer graphic, the display may include a simple background, the displays may include image/icons to simulate analog dials as opposed to digital readouts, or the like. Further, the simple mode can also allow user to customize the types of skins provided to the displays and provide previews of the skins. The skins are essentially graphics that are provided to the display screen, which can include a theme, colors, text, text format, GUI formats, gauge formats, etc.

Figure 28C:
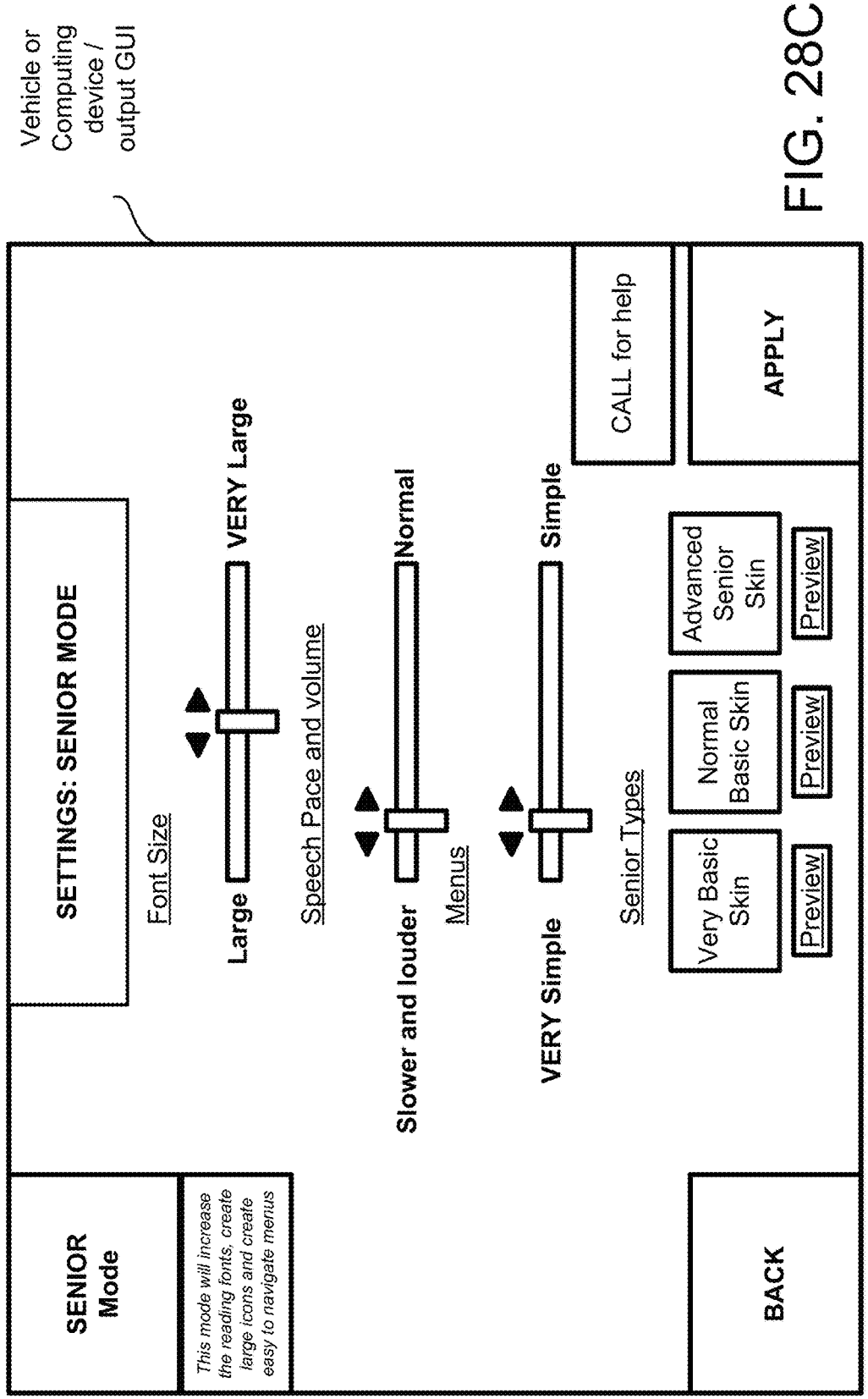

FIG. 28C illustrates an example of a senior mode setting. In this example, the senior mode may allow for the font size of different icons or text to be increased, so that vision impaired or vision reduced drivers can more quickly identify the gauges, the content provided by the gauges, the text readouts, the graphics, and the like on the displays of the vehicle. In addition, the senior mode can also be configured to simplify the gauge views and user interfaces of the vehicle to resemble a simplified vehicle interface panel or dashboard.

Continuing with the example, the settings can also allow for audio output, audio instructions, and voice communication to be adjusted so that the pace of speech and volume can be amplified. For example, a setting can be provided to make the vehicle speech, commands, and interface voice input to be slower and louder. The menus can also be simplified to be very simple or simply simple. Thus, menus that do not require output for user to operate a vehicle may not be displayed in the senior mode, yet basic operational displays of the vehicle can be displayed or provided under this senior mode. Still further, other selections can include provide very basic skins, normal skins, advanced senior skins, etc. Previews of the selected skins can also be provided, before implementation.

Figure 28D:
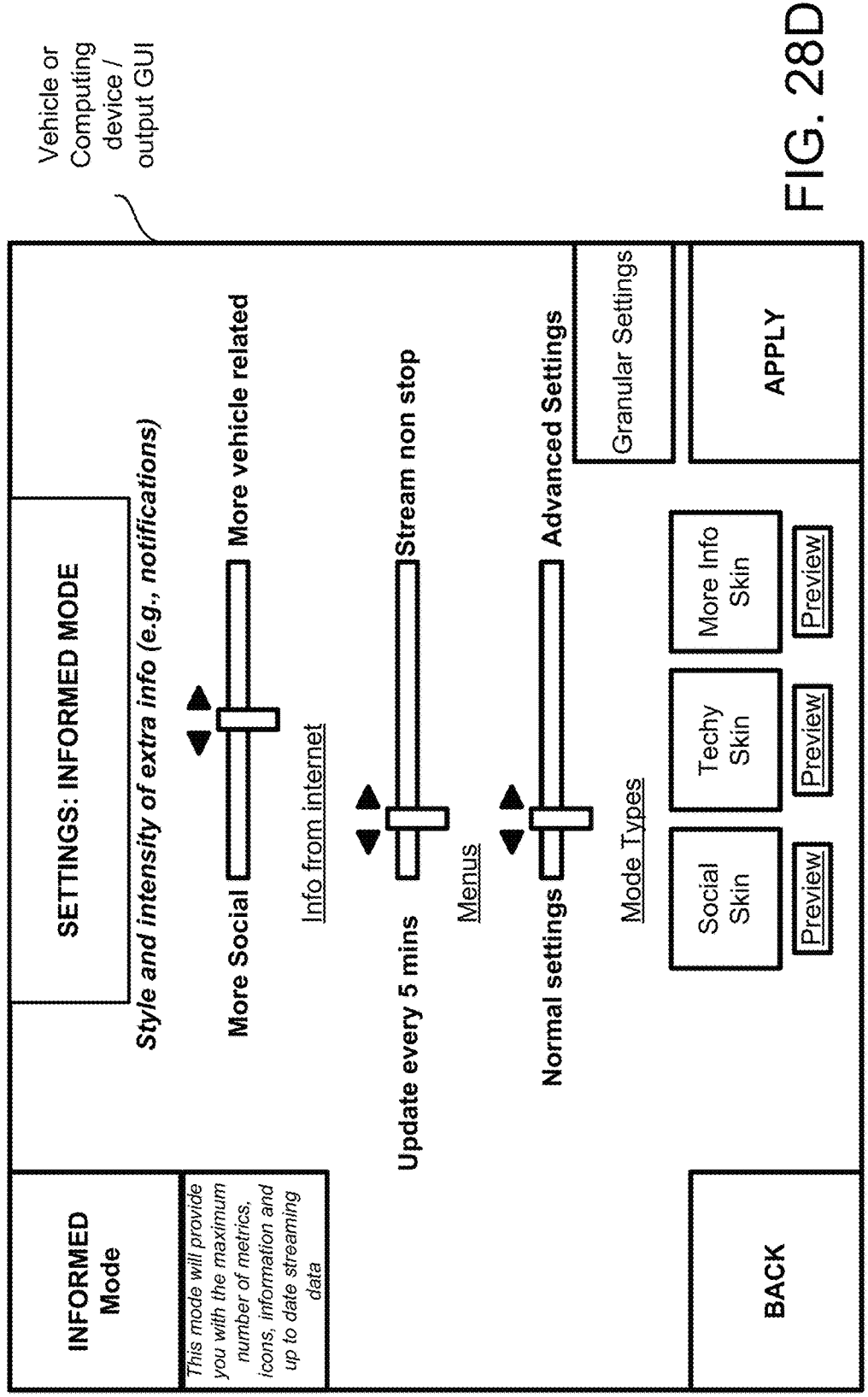

FIG. 28D illustrates an example of informed mode. In this example, the style and intensity can be customized to provide extra information, such as notifications to the various displays, recommendations, suggestions, etc. Once the informality selected, the user can also adjust the settings to provide a more social or less social interactivity or suggestions provided to the various screens. In some embodiments, some of the settings provided in informed mode can be reduced, or held until the vehicle is no longer moving or is in park to prevent distraction.

In informed mode, the user can also identify the type of information received from the Internet and the timing associated with getting streamed data. The stream data can also include mapping data, suggestions data, parking data, navigation data, traffic data, weather data, etc. Settings can also be set to adjust the menus so as to provide more than settings, more digital displays, more icons, or gauges, etc. In this setting, the different skins can also be selected such as a social skin, a techie skin, or more customized skins. In further embodiments, learning can be used to adjust the various settings over time once the particular mode has been selected.

Figure 28E:
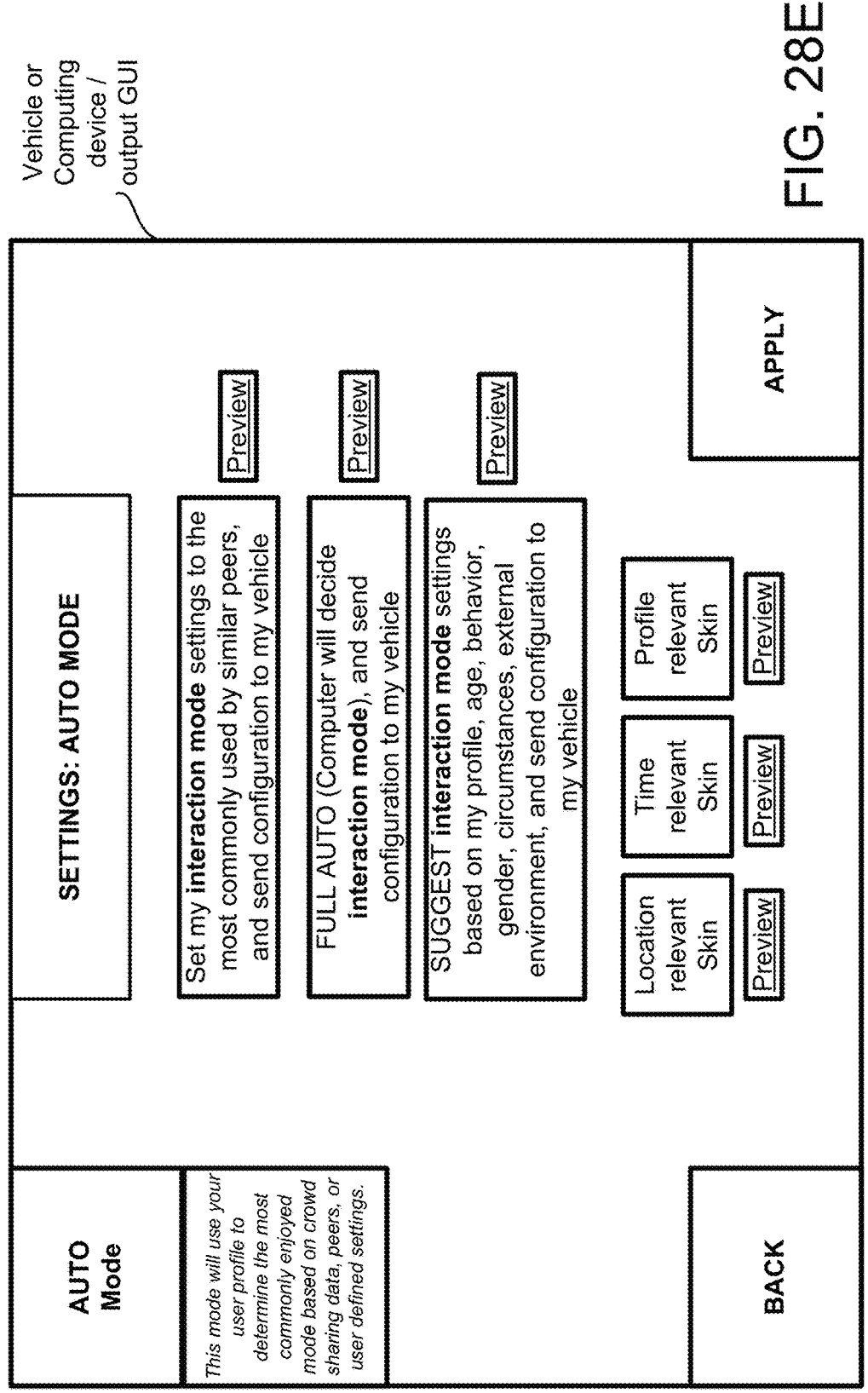

FIG. 28E illustrates an example of an automatic mode (auto mode). In this example, the user may select to identify the interaction mode automatically based on one or more settings. In one embodiment, the user may select to set the interaction modes to the most commonly used mode selected by one of the user's peers (demographic or social network friends and peers). In another embodiment, the user may select a full auto mode, which would allow the computer to decide the interaction mode based on the user's interactive use of the vehicle. In still another embodiment, the user may select to allow the interaction mode to be suggested based on the profile, the age, the behavior, the gender, the circumstances, the external environment, and then send the configuration to the vehicle.

These settings can also be previewed so that the user can see what the settings look like. In one embodiment, the settings will change over time based on the interaction and the learning. Still further, certain skins can be provided that are location relevant, time relevant, profile relevant, etc. Again, the skins can define the user interface look and feel, the gauges, the displays, the text, the colors, the theme, etc.

FIG. 29A a vehicle interaction mode wizard. In this example, the user may be provided with a plurality of descriptive phrases or descriptions of preferences, likes, behaviors, tendencies, or choices. These preferences, in one embodiment, are not express settings of vehicle features, but instead descriptions of the type of behavior the user wishes to have when operating the vehicle. As such, the user can select, and this example, all of the preferences that apply to the user. In this illustration, once the user has selected several example descriptive phrases, which may describe the user's interaction likes or dislikes, the system will identify or determine an interaction mode.

In this particular example, the computer has determined that based on the descriptive entries provided by the user, senior mode is the best mode to apply. The user can then choose to apply or go back and retry to identify a specific interaction mode or elect to modify specific mode features of a mode, enable learning for mode for automatic changes, etc.

FIG. 29B illustrates an example of inputs made to preferences of the vehicle interaction mode wizard. This example is similar to the example in FIG. 29A, except that different preferences were selected by a user. These preferences have now been determined by the computer to be most relevant or a best fit or most likely related to an informed mode. The user is provided with this determination and asked whether he or she wishes to apply that mode.

Figure 30:
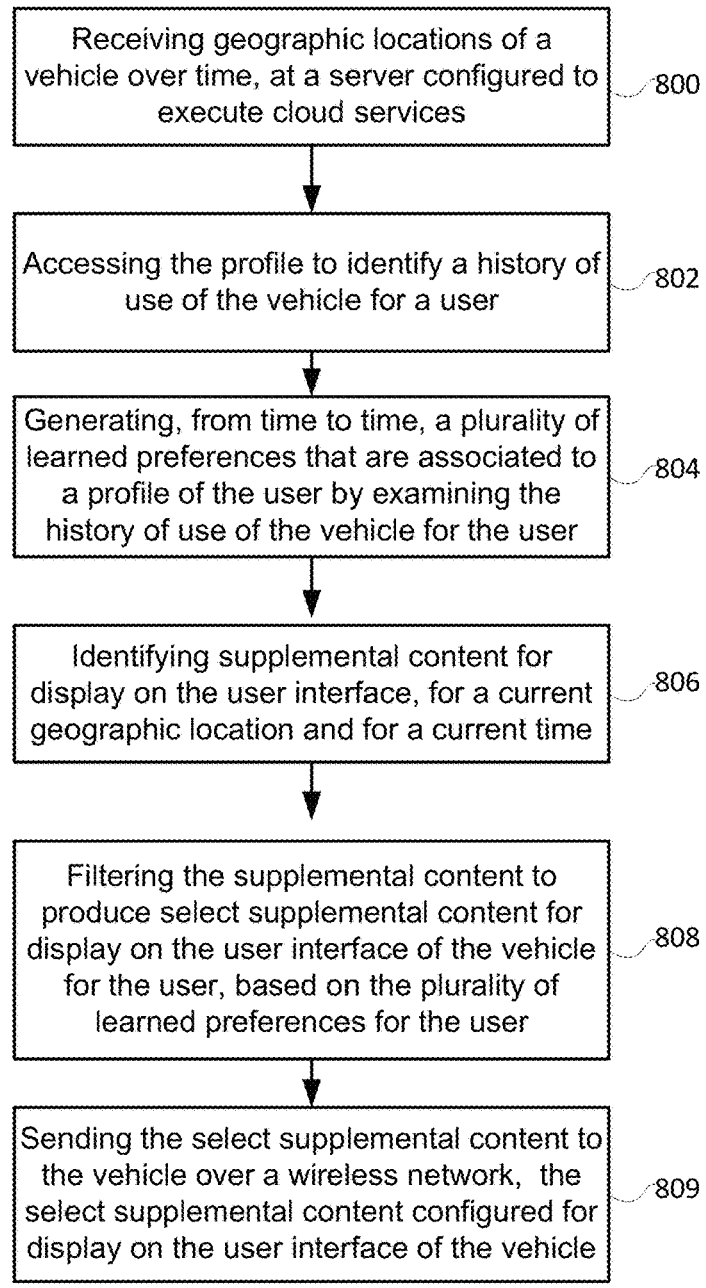
FIGS. 30-33 illustrate example flow diagrams for various embodiments, which allow for communication of intelligently selected recommendations, information, surfacing of content, and selection of interaction modes or settings for interaction modes, in accordance with several embodiments.

FIG. 30 illustrates one example flow of operations used to provide contextually relevant information to the displays of the vehicle, for one embodiment. In this example, the information is considered supplemental content. The content is considered to supplement the user's driving experience and reduce distraction, as the supplemental content is selected based on the circumstances of the vehicle location, the user's preferences, the user's learned behavior, the user's calendar, the context of driving, the user's travel plans, and other factors as described throughout this document and those documents incorporated herein by reference.

In one embodiment, supplemental content can include data that is unformatted and is later formatted at presentation, data that is comes with format data, data that is parsed out of formatted data for presentation in different forms, data that is obtained from internet services, such as mapping programs, calendars, news, social, appointments, cloud storage, advertising, and the like. In some cases, the supplemental content can be data that that triggers opening of a website or application on the vehicle display. In such cases, most of the data will be formatted based on the source formatting provided by the internet service. In other embodiments, some of the data obtained from the internet service can be re-formatted for display in a native display format. In some implementations, text data can be extracted from internet services, such as text search results to for display in a custom or native format for the vehicle displays. In still other embodiments, the display of the day on vehicle displays can take on a hybrid approach, which may depend on the type of content, application, app, interface, program, license, form factor, content type, and the like.

In one embodiment, the supplemental information is filtered to provide even more custom tailored select supplemental content. For instance, even though the user may need gasoline, the user may prefer another type of gas than that immediately available. Further, even though the user prefers coffee and purchases coffee often at 8 am on a weekday, that particular weekday the user may be heading to a client meeting and the driver appears to be late. Consequently, a coffee coupon or location information may not be provided, as this supplemental content is not useful to the driver and may only serve as a distraction. In the illustrated example flow of FIG. 30, operation 800 includes receiving geo-locations of a vehicle over time, at a server configured to execute cloud services.

The cloud services may be operated by one or more entities, public entities, private entities, entities such as vehicle makers, entities such as vehicle service provider entities. These entities may operation with one or more servers. The servers can be individual servers, groups of servers, services distributed geo-graphically for load balance or improved quality of service (QoS), servers operated by cloud services, virtualized servers and storage, and combinations thereof. Other examples can include processing performed by the servers and some processing by the vehicle computer or devices of the user. In still other examples, apps of the vehicle can communicate with cloud services using user accounts, which provide access to the user's history and profile.

In operation 802, the system will access the profile of the user to identify various data, including to identify a history of use of the vehicle of the user (e.g., the vehicle that is registered to the user's profile). In some embodiments, no vehicle is pre-associated to the user account or profile, which allows for dynamic transfer of the user's account to any vehicle the user steps into and syncs with. Thus, when the user access the profile from any vehicle having access to or providing access to cloud services, the custom services of the user can be used on the currently driven or used vehicle.

In this manner, the vehicle is not actually associated to a user but instead, the user's profile or account is associated to the vehicle for a period of time the vehicle is driven by the user. In one embodiment, the profile can also be used on rental cars or other vehicles that are used for short periods of time or on cars that are loaned out by others for use.

In operation 804, from time to time, the system generates a plurality of learned preferences that are associated to the profile of the user. This association can occur by, for example, by examining the history of use of the vehicle (or use by the user on other vehicles). The learned preferences can change over time as the user's preferences change or user input selections made change over time, and based on the particular contextually related circumstances of when the changes or inputs were made. Thus, the learned preferences can, in some examples, change periodically when enough data is collected to create and define a preference with a threshold level of certainty.

In operation 806, the system identifies supplemental content for display on the user interface of the vehicle, for a current geographic location and for a current time. As noted above, the supplemental content can include information that can be displayed on a screen of the vehicle. The information can also be output by voice and the user may interface via voice input or combinations of voice input and physical input (e.g., touch a screen icon, turn a button, toggle a button, press a button, slide rolling item, shift a lever, rotate a knob, etc.).

In operation 808, the system (e.g., server) can filter the supplemental content to produce or leave select supplemental content for display on the user interface of the vehicle for the user. The filtering can be done, for example, based on the plurality of learned preferences for the user. As noted above, the filtering is done to cull-out information that the user is known not to need or want, or cull out information that is not appropriate for the time of day or week, or cull out information that is conflicting with the user's schedules, or cull out information that would conflict with the user's more preferred likes or dislikes.

Further, the culling of supplemental content can also changes over time as the driver moves around and the geo-location changes. For example, if the user's favorite fueling station is nearby, at 8:15 am, and the vehicle needs fuel (but still has enough to driver another 90 miles), but the user needs to take a conference call from 8:15-8:30 am, the system will not surface (e.g., cull so this supplemental content is no provided to a display or audio output) information regarding the nearby fueling station. Instead, the vehicle will surface and notify the user of the conference call and/or show the option for another fueling station that is along the path or near the destination.

In another embodiment, the identification of supplemental content in operation 806 and the filtering operation of 808 may be processed together in one processing operation. That is, the selection of the supplemental content can itself include the culling for the user and the user's profile, so as to avoid additional or secondary processing. In still other embodiments, some users may wish to explore outside of their profile, and the user may select to receive 10% of the supplemental content outside of his or her profile. This provides a controllable amount of supplemental content that can be surfaced to the user over time. If the user likes the supplemental content, the user's profile can be adjusted by the learning of preferences, selections and/or inputs over time.

In operation 809, the server sends the select supplemental content to the vehicle over a wireless network. The select supplemental content is configured for display on the user interface of the vehicle. The user interface, as described above, can be any screen of a vehicle, including screens interfaces on buttons, toggles, dials, sliders, etc. The different screens on buttons can show different or customized information depending on the mode selected.

Thus, the same knob, for instance, can provide different functions when it is turned or touched, depending on the mode. As noted above, the user's profile can also be augmented or controlled for display of information in various formats, such as intelligent mode, simple mode (easy), senior mode, informed mode, and custom modes selected by the user, learned over time, or recommended by the computer (let the computer decide option).

Figure 31:
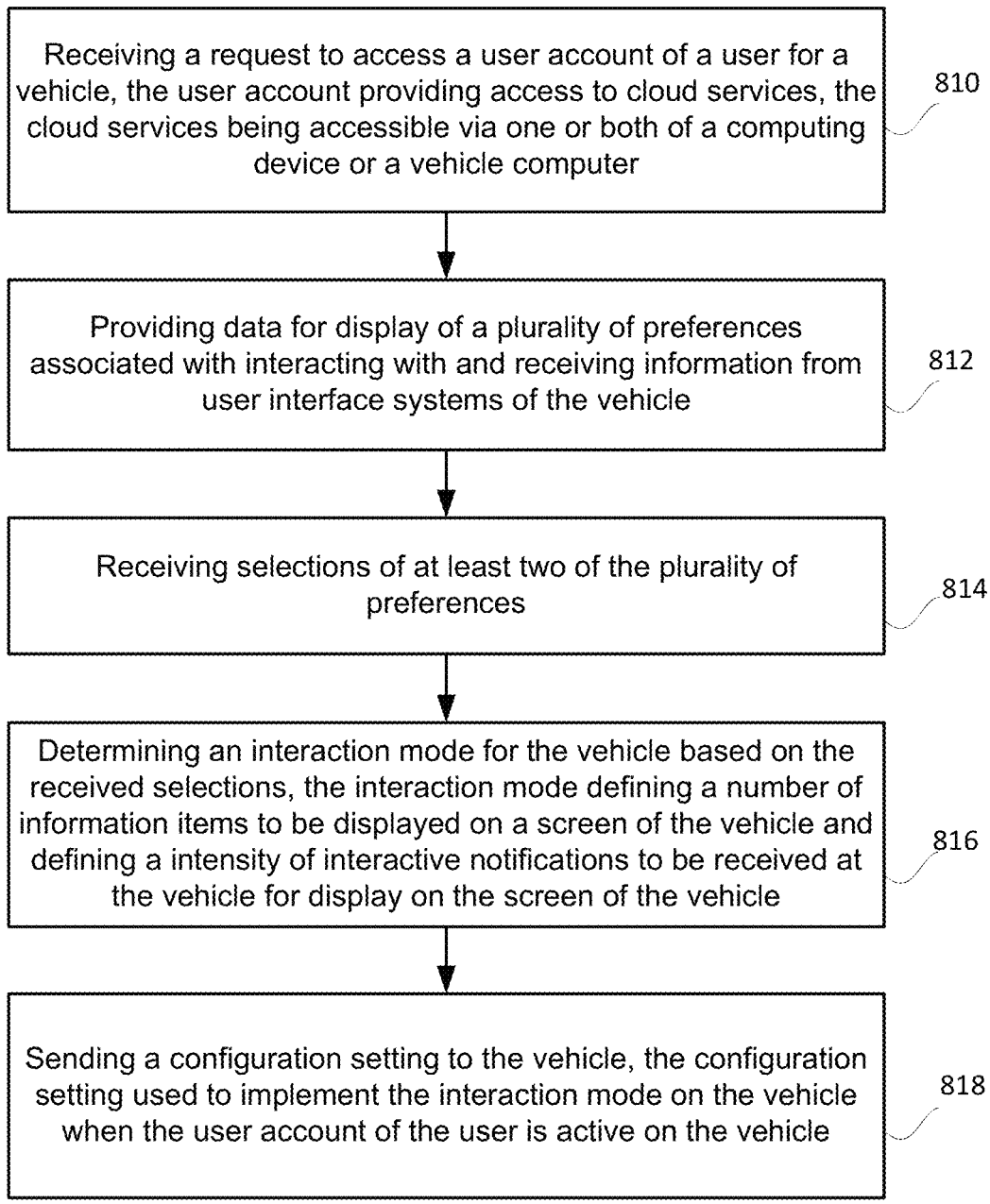

FIG. 31 shows a flow of one example embodiment, wherein an interaction mode is selected. In this example, operation 810 includes receiving a request to access a user account of a user for a vehicle. The user account provides access to cloud services. The cloud services are accessible via one or both of a computing device or a vehicle computer.

In operation 812, data for display of the plurality of preferences associated with interacting with and receiving information from user interface systems of the vehicle is provided. In this embodiment, preferences associated with the types of display items and types of information the user wishes to see or rendered on the displays/screens can be provided. This information can be provided in the form of user interface inputs, table selections, typed in selections, radio button selections, selection lists, grid data input, voice input, or any type of input method that can be captured by a computer, or combinations of two or more thereof.

At this point, selections of at least two of the plurality of preferences can be received at the user interface in operation 814. At least two selections are useful to receive, so that proper determinations of the type of interaction modes that are available to the user can be selected. Alternatively, if the user already knows the interaction mode he or she desires, the selection can simply be one selection of an interaction mode, instead of selecting two or more preferences, which are used to identify an interaction mode.

In operation 816, and interaction mode is determined for the vehicle (user account) based on the received selections. The interaction mode may define a number of information items to be displayed on a screen of the vehicle. Additionally, the interaction mode can identify the intensity of interactive notifications to be received at the vehicle for display on the screen of the vehicle. For example, more intensity can eat equate to more information being displayed or notifications provided to the vehicle. Less intensity can be fewer notifications, or information provided to the one or more displays of the vehicle.

The interaction mode, in one embodiment, will define the number of interactions that would be provided to the user. If over time the user wishes additional notifications sent to the vehicle, the user may customize the interaction mode. In another embodiment, the user can simply choose a different interaction mode which may globally change the interaction mode and types of information items displayed and number of information items displayed, as well as the intensity of interactive notifications.

In operation 818, the configuration setting is sent to the vehicle. The configuration setting used to implement the interaction mode on the vehicle is data that is sent when the user account of the user is active on the vehicle. For example, if the user accessing a particular vehicle wishes to implement his or her interaction mode on that vehicle, the user account of that user will identify and interaction mode, which can then be transferred to that specific vehicle. As noted above, the interaction mode may be customized to the user account so that the interaction mode can be used in any number of vehicles the user wishes to operate. In other embodiments, the interaction mode is programmed to a specific vehicle, such that that vehicle holds the interaction mode programmed for continuous use.

In still other embodiments, the interaction mode can be used in a specific vehicle for a period of time. The period of time can be for or uses of the vehicle, for a week, for a month, for a day, or any number of identifiable fractions of time. Still further, the interaction mode can be automatically applied to a vehicle when a particular user is identified/detected to be in or proximate to the vehicle.

Identification of the user in a vehicle can be by way of having the user input his or her password or user ID into the vehicle electronics or user interfaces or screens. In still other embodiments, identification of the user in a vehicle can be by way of biometric identification. The biometric identification can be by way of voice input, voice ID, retina scan, finger print ID, gesture ID, or a combination of multiple biometric identification methods.

Figure 32:
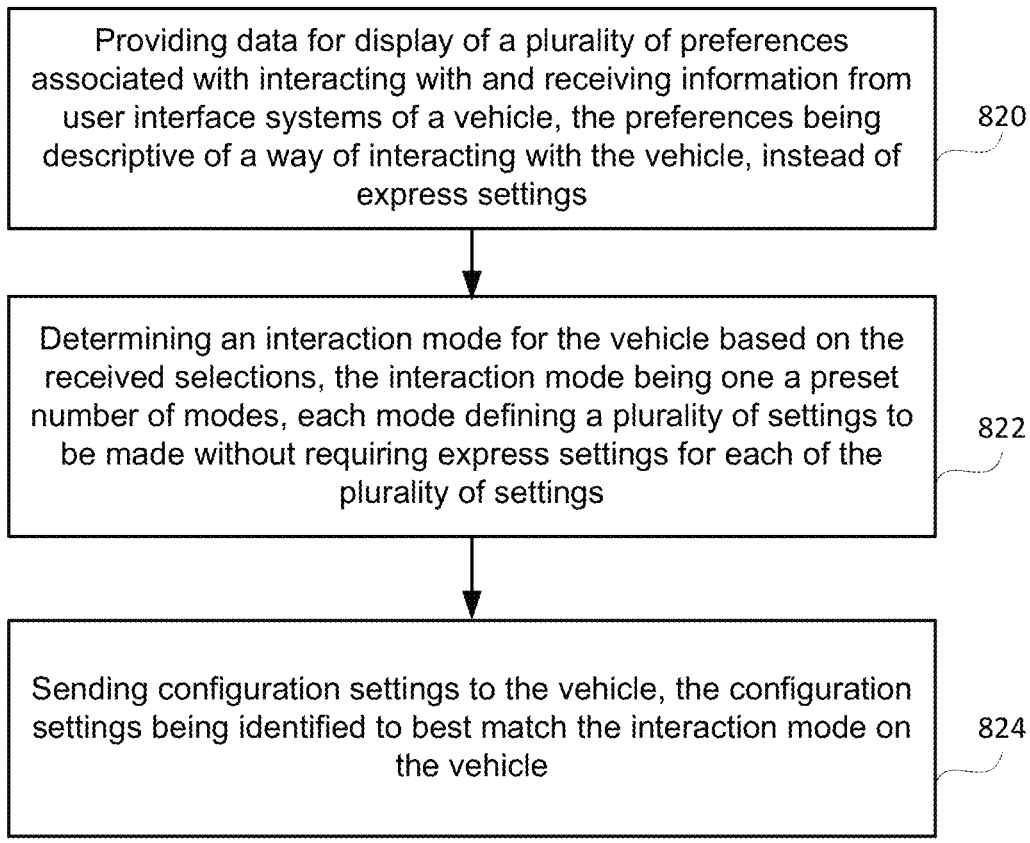

FIG. 32 illustrates another flow diagram, in accordance with one embodiment of the present invention. In this example, method operation 820 includes providing data for display of a plurality of preferences associated with interacting with and receiving information from user interface systems of a vehicle. The preferences being descriptive of oh way of interacting with the vehicle, instead of express settings.

The descriptive ways of interacting with the vehicle can be by reference to that type of information the user wishes to receive, the mood the user is in, the familiarity that a user has with technology, the degree of simplicity desired by a user, easy user interfaces which may be useful to senior citizens operating a vehicle, etc. Thus, instead of providing a plurality of input settings, a number of questions, statements, interactive preferences, can be displayed or asked of the user verbally so that the user can answer a sequence of questions that can be used to then identify an interactive mode for the vehicle.

Thus, this provides an easy way of interacting with the vehicle using natural language that does not require the user to expressly enter settings, navigate user interfaces, and the like, which may be too technologically complex or uninteresting to certain users. In operation 822, and interaction mode for the vehicle is determined based on the received selections. The interaction mode can be one of a preset number of modes. Each mode may define a plurality of settings to be made without requiring the express settings of the individual settings. In operation 824, the configuration settings are sent to the vehicle.

As mentioned above, sending configurations to the vehicle can be by wireless communication. The scent configurations can be set from a server that has access to the Internet for transmitting the data to the specific communication electronics of the vehicle, which in turn allow for implementing the settings on the vehicle automatically or after the user has approved the input of the settings. In one embodiment, the configuration settings are identified to be a best match of the interaction mode for the vehicle, for the user, and based on the preferences that are descriptive of the way the user wishes to interact with the vehicle.

Figure 33:
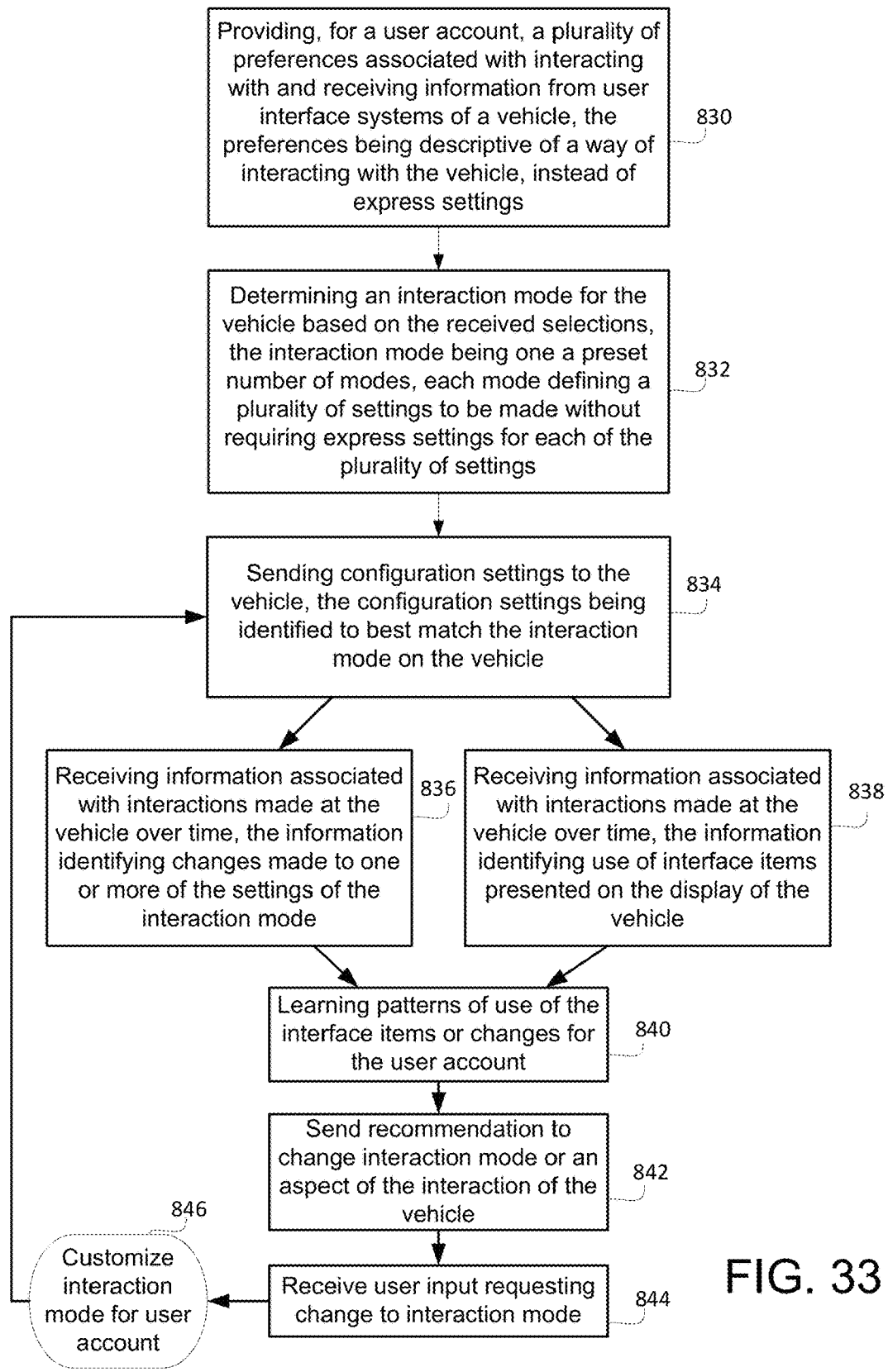

FIG. 33 illustrates one example of a flow diagram where in interaction mode can be selected and customized for a particular user, in accordance with one embodiment of the present invention. In one example, the particular user is a user having an account and an associated profile. In operation 830, for a user account, a plurality of preferences associated with interacting with and receive information from user interface systems of the vehicle are provided.

The preferences are descriptive of a way of interacting with the vehicle, instead of express individual settings. In operation 832, the method includes determining and interaction mode for the vehicle based on the received selections. The interaction mode is one of a preset number of modes, and each mode defines a plurality of settings to be made without requiring express settings for each of the plurality of settings. In operation 834, the configuration settings are sent to the vehicle. The configuration settings are identified to be a best match for the interactive mode of the vehicle, for the user account. In operation 836 and 838, over time the user will provide input settings or selections or interactions utilizing the initial or interaction mode identified or determined in operation 832.

In operation 836, information associated with interactions made at the vehicle over time is received. The information identifies changes made to one or more the settings of the vehicle. In operation 838, information associated with interactions made at the vehicle over time is received. The information identifies use of interactive items presented on the display of the vehicle. In operation 840, the received input from operations 836 and 838, over time, are provided for learning patterns of use of the interface items or changes for the user account. In operation 842, recommendations to change the interaction mode or an aspect of the interaction mode of the vehicle is sent to the vehicle.

Information sent to the vehicle can be provided by way of one of the user interfaces, or audio output, text messages to a user's device, e-mail messages, messages to the user's online account, or the like. In one embodiment, operation 844 may include receiving user input requesting changes to the interaction mode. The changes requested can be based on the recommendations provided to the user. For example, the recommendation can be provided to the user suggesting that the user change the interaction mode from a simple mode to a complex mode or an intelligent mode, or some other customized mode. In another embodiment, the change to the interaction mode can simply be an adjustment to the selected or determine interaction mode.

For instance, the initial interaction mode can remain selected, yet one or more aspects of the interaction mode can be adjusted or changed to define a customized interaction mode for the user account in operation 846. In one embodiment, once the customization has been defined, the customization settings are sent to the vehicle for implementation. In one embodiment, the changes in customization can occur on the vehicle itself and over time the customizations can be communicated to a server, which then implement the changes for the user account. In this way, the server and the vehicle can maintain a synchronized the interaction mode and changes made over time to either the vehicle or the modes in the user account.

Figure 34:
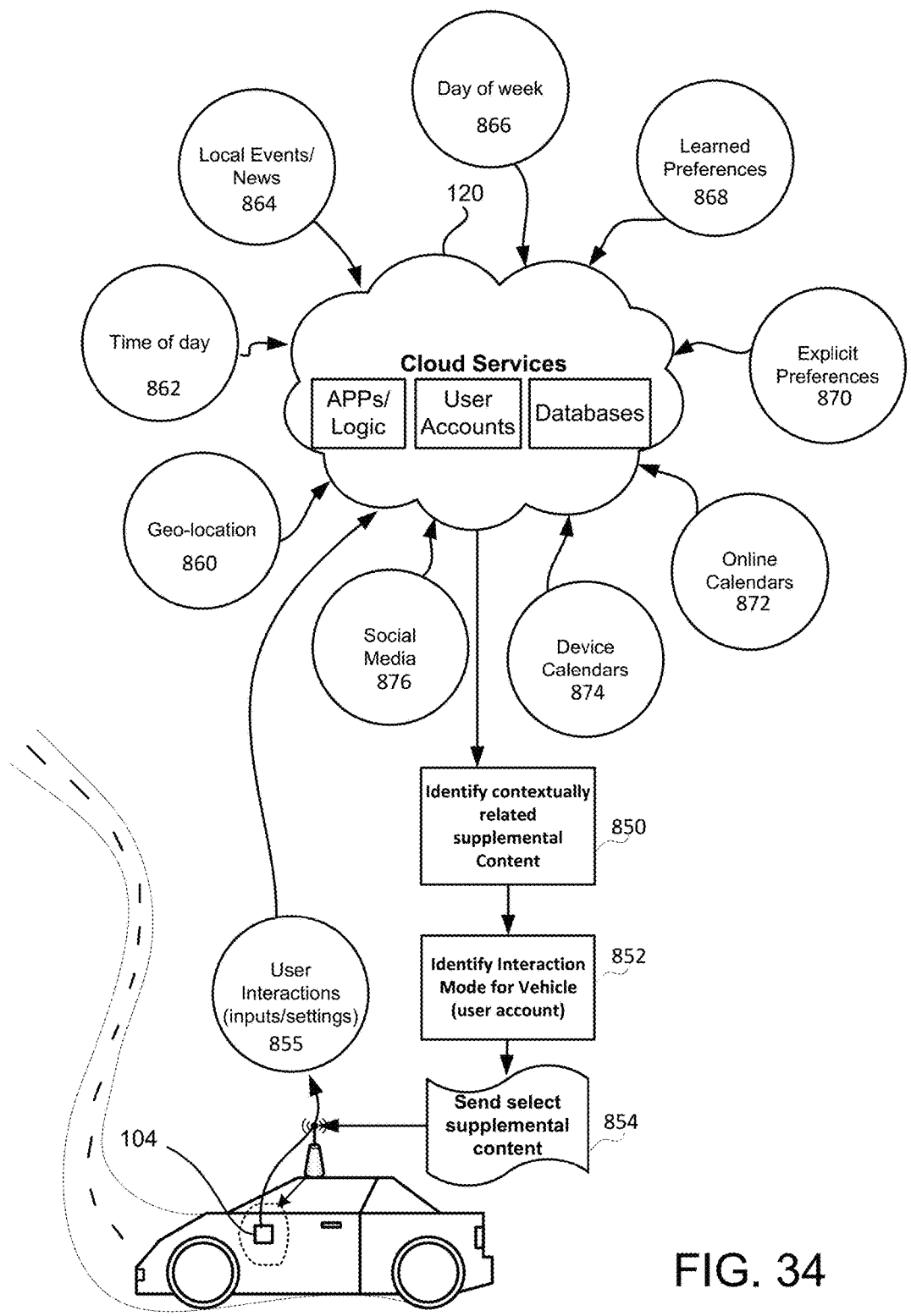
FIG. 34 illustrates an example of cloud services being able to interact with multiple Internet services, cloud data structures, cloud databases, third-party websites, information services, user vehicles, and other information and data that can be accessed for intelligently communicating supplemental content to the user account for display on one or more displays of a vehicle, and for the dynamic receipt of user interactions over time from the connected vehicle, in accordance with several embodiments.

FIG. 34 illustrates one example of cloud services 120, which may be collecting or interfacing with a plurality of data providers, data sources, data processors, third-party applications, third-party services, other applications, Internet data, or combinations thereof. In one embodiment, the vehicle is a connected vehicle which has access to cloud services 120. Over time, the vehicle will traverse different geo-locations, which will then be communicated to cloud services 120 periodically, continuously, or on some schedule.

In addition, user interactions and input settings 855 can also be communicated to cloud services 120. This information is communicated regarding user interactions, such as inputs or settings is also tied to the geo-location of the vehicle, the time at which the settings were made, the circumstances of when the changes were made, the contextual relationship of circumstances to when settings are made or inputs are made, and the like. As shown, cloud services can include applications and logic and other components which are described above.

Additionally, cloud service can include user accounts and databases. In some implementations, cloud services can be operated by specific service provider, or multiple service providers, a vehicle cloud service, an internet company, vehicle manufacturers, vehicle service providers, third party service providers, or combinations thereof. Example communications by cloud services 120 are shown, without limitation. The example communications can be to geo-location 860, time of day data 862, local events and news

864, day of the week calendar data 866, learn the preferences 868, explicit preferences 870, online calendars 872, device calendars 874, social media data 876, etc.

In one implementation, at least one aspect of one of the preferences is data obtained from an internet service. The internet service can be a private cloud, a public cloud, website data available via open APIs, or combinations thereof. The internet service may also be one of a website, or a calendar, or social network website, or a news site, or a dictionary site, or mapping service, or a to-do list, or a phone list, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet, or combinations thereof.

This list of exemplary data and services should not be viewed as limited to the set of data but simply as an example of data can be accessed and process to identify contextual related supplemental content 850. In operation 852, the interaction mode for the vehicle can be identified. The interaction mode can be the mode that's already selected for the vehicle, and therefore the data that that vehicle is expecting will be in accordance with the interaction mode and it settings.

In operation 854, select supplemental content can be sent to the displays of the vehicle or output via the audio system. As noted above, the type of information, such as the select supplemental content is tailored for the interaction mode selected for the vehicle, as well as based on user interactions 855 and the contextual relationship of those inputs to the time, the geo-location, learned preferences, and the like.

Figure 35:
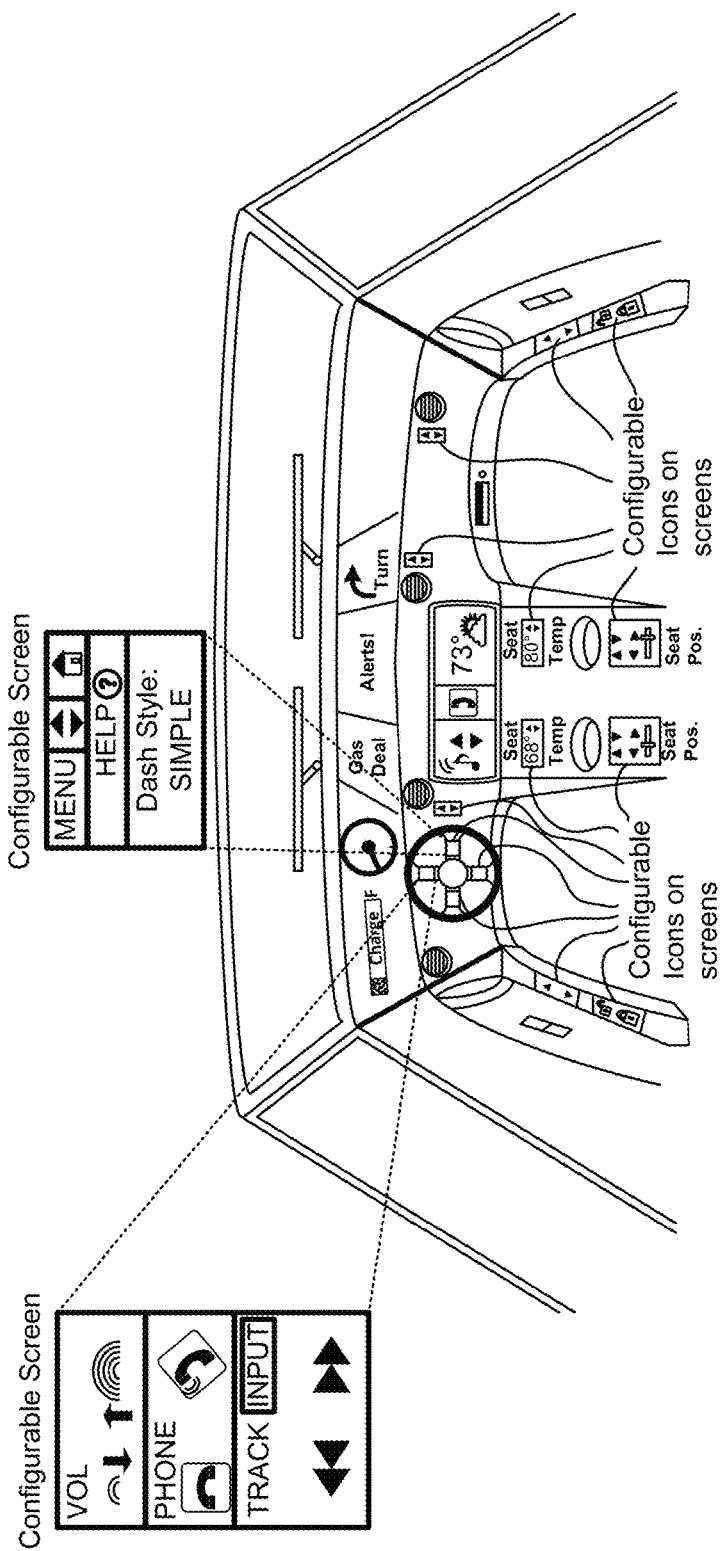
FIG. 35 illustrates one example of a vehicle driving compartment and the passenger seat, wherein a plurality of physical controls can be customized by the use of dynamically changeable screens, which allow physical controls the change functionality, display complexity, or information types, for blending the physical controls with an interaction mode of a vehicle, in accordance with several embodiments.

FIG. 35 illustrates one example of a vehicle driving compartment and the passenger seat. In this example, the vehicle will typically include a number of switches, dials, controls, buttons, scrollbars, pushbuttons, levers, which are commonly considered to be physical input devices to control settings or features of the vehicle. Commonly, these physical inputs will include fixed icons which are typically painted or permanently engraved on the buttons. For example, the up and down arrows on window opening controls are typically fixed. Other fixed controls may include the buttons for turning up or turning down the air conditioning, buttons for opening a door or locking a door, volume controls for audio, door locks, audio control buttons, seat positioning buttons, and the like.

In accordance with one embodiment, these physical inputs are configured to include one or more graphical screens which can change depending on the interaction mode selected for vehicle. For example, the dial button use for air-conditioning can be changed to a dial button use for the radio. In one further example, a graphical screen can be defined over the button or physical input or beside or around the button or physical inputs.

Thus, the user can identify what each button or control is capable of doing in the vehicle. In some examples, some of the screens associated with physical inputs can be replaced with different icons or control identifiers. If the interaction mode is a senior mode, the icons, text, controls, can be magnified in size, type, or can be simplified. In some embodiments, the buttons, icons, text, and associated screens or displays for certain ones of the physical inputs can be set in accordance with the theme associated with the interaction mode, or can be individually adjusted or changed without regard to interaction mode.

In the illustrated example of FIG. 35, screens can be positioned in different locations to avoid the need to add additional buttons throughout the cockpit of a vehicle. In some examples, the steering will can have screen displays that are easily touched or interfaced with to avoid distraction. Certain screens on the steering wheel may change, for example to provide access to inputs that would normally be associated with physical inputs. In one embodiment, fewer physical inputs are provided throughout the vehicle and are replaced with configurable screens that provide the functionality that would otherwise be required via the physical inputs. The example locations on which the inputs can be provided are simply that, just examples, as they can be provided anywhere in, on or around the vehicle.

This type of interactive display and control provided in vehicles can assist vehicle makers to provide fewer buttons that are physical and reduce the cost and weight of a vehicle. In one example, the steering will may have configurable screen to allow the user to adjust the volume, lock or unlock the phone, change the music, access menu items, access the user's home, ask for help, change the dashboard style, set the configuration mode, and the like. As further shown, one of the inputs can be to simply toggle between one or more interaction modes.

The interaction mode selected in the example of FIG. 35 is simple. In one embodiment, the interaction mode can be dynamically switched based on the user of the vehicle. In one embodiment, the interaction mode can be associated to a profile that is maintained for a user, and the profile can be used in different vehicles such that interaction modes can be automatically applied to different vehicles, whether owned or used or shared or rented. In another embodiment, features of the vehicle can be provided with sensors, such as cup holder sensors.

In one embodiment, a learning algorithm can be provided to determine if the user likes to cool or warm a beverage that may be positioned in the cup holder. For example, if the time of day is morning and the cup in the cup holder is detected to have warm liquid or a warm temperature, the cup holder can automatically turned on to maintain a substantially warm or hot temperature of the contents in the cup (if heating features are provided). In another embodiment, an analogous process can be performed to cool or maintain the cool temperature of liquid in a cup holder, based upon the context of the learning. For example, if it is determined to be a hot day, and based on previous patterns of use the user has selected to keep cops cool in the cup holder's (if cooling features are provided), the system can automatically set the cup holder to maintain the cool temperature of the cup or its contents.

Still further, other sensors in the vehicle, such as presence sensors can identify whether more passengers or fewer passengers are inside a vehicle. Depending on temperature conditions outside, and based on learning of previous patterns of the user who may have had passengers in the past, it is possible that the temperature inside the vehicle is lowered 3 to 5° cooler than normal. This may be true because more vehicle passengers can raise the temperature of the cockpit, which may require additional cooling. Still further, the context of additional passengers can also detect whether additional passengers have their own devices in the vehicle, and certain settings for those devices can be shared to those devices.

For example, passengers may be able to connect to a Wi-Fi or Internet connection provided by the vehicle. This connection can identify the other devices are contained or located within the vehicle. This information can be used to provide those specific devices access to certain controls of the vehicle. The controls provided can be based on learning associated with previous privileges granted by the primary user account in the vehicle, which is typically the driver. For more information on sharing vehicle controls to user devices, reference may be made to U.S. application Ser. No. 14/222,670, entitled "Methods and Systems for Providing Access to Specific Vehicle Controls, Functions, Environment and Applications to Guests/Passengers via Personal Mobile Devices," which is incorporated herein by reference.

Figure 36:
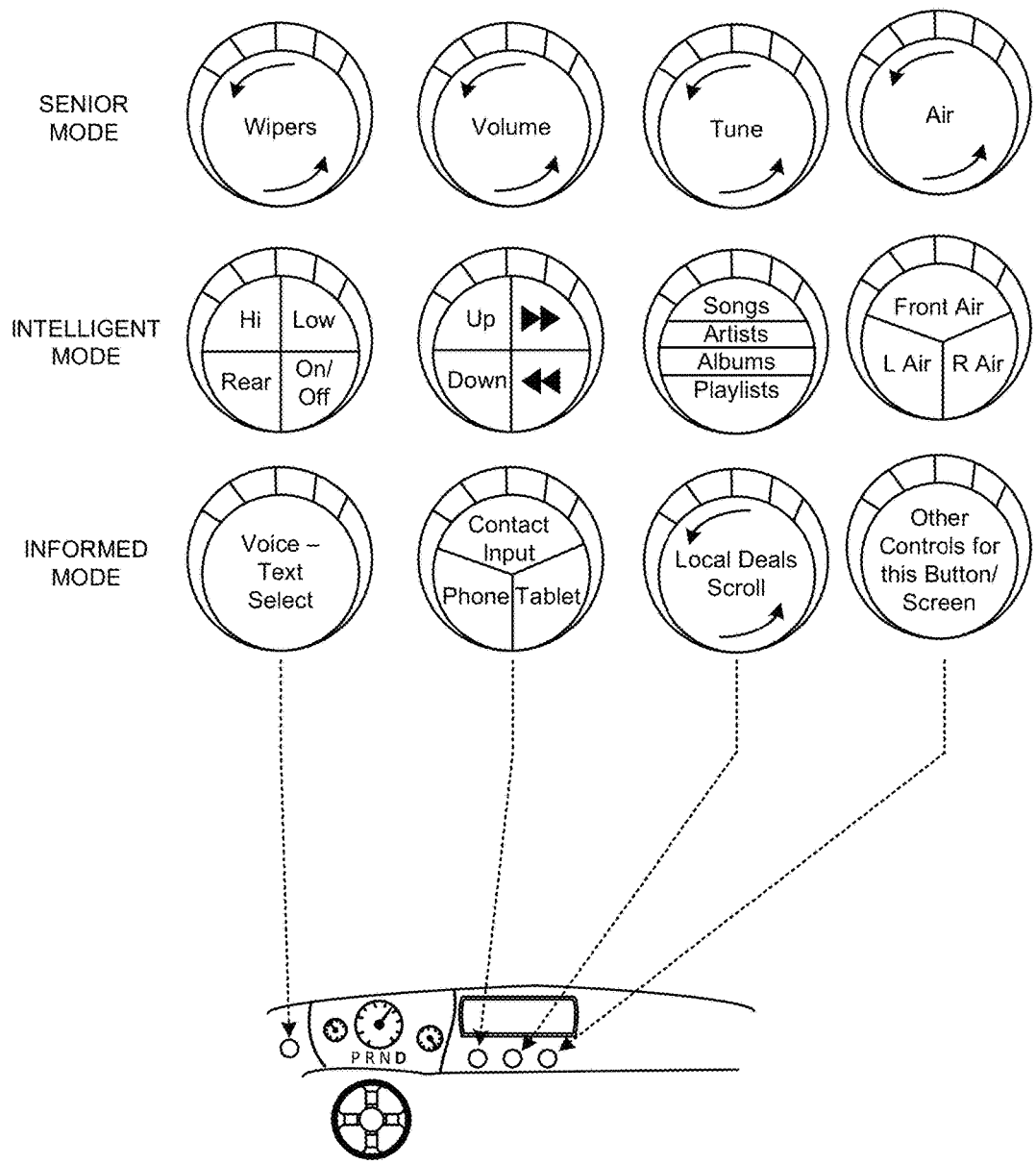
FIG. 36 illustrates a hybrid physical/display controls with an associated interaction mode customization.

FIG. 36 illustrates a hybrid physical/display controls with an associated interaction mode customization. In this example, a simplified dashboard of a vehicle is provided. The simplified dashboard can include certain gauges that are necessary for driving, yet the clutter provided in the vehicle displays is reduced as described above. In this example, there is one physical input to the left of the steering wheel and 3 physical inputs to the right of the steering wheel. For simplicity, the physical inputs are shown as dials.

It should be understood that the physical inputs can take on various forms such as pushbuttons, toggles, sliders, press in controls press out controls pull out controls twist controls shift controls etc. Continuing with the example, for purposes of understanding, the four physical input dials may be allowed to twist turn be pressed be pulled or selected. In accordance with one embodiment, the physical inputs may also include a screen that provides the readout of the text shown in the examples. This text can be configured to change based on the interaction mode selected for the vehicle. In one embodiment, a senior mode can be selected for the vehicle, which may indicate that the dials should be maintained as simplified as possible and any text should be amplified or enlarged so that control and access is easier for older adults.

For example, one button may simply indicate wipers, the next button volume, the next button tuning (audio), air conditioning, and the like. As noted above, more than four physical buttons provided with a hybrid display can be provided, and this is only one example to convey the simplicity of configuring displays associated with physical inputs. In another example, an intelligent mode may be selected for the vehicle, which may dynamically change what is displayed on the physical inputs. The display the physical inputs can be a small LCD screen, a touchscreen, proximity non-touch screen, gesture input screens, icons, text, combos of text and icons, colors, a screen typically used on a smart phone, or the like.

Thus, users can provide touch input to the buttons similar to the way touch input is provided on screens of a smart phone or a tablet. In addition, the buttons can also be manipulated as physical inputs to provide an additional level of change, input or interaction. In another example, the interaction mode can be changed to provide for an informed mode. The informed mode can also again change was displayed on the faces or surfaces of the physical inputs.

Thus, the physical control devices may be pressed, tuned, dialed, touched on the display screen parts etc. In still another embodiment, the display screens can be provided beside the physical inputs so that the screens are not on the buttons themselves. For example, the surface beside underneath or above or below the physical inputs can include small screen that dynamically changes to identify what the physical inputs are provided to do. Thus, based on the configuration provided to the physical inputs, the content displayed on the physical inputs or beside or around the physical inputs can define what functionality those particular inputs can render for the vehicle. As such, the dynamic adjustments and changes to the physical inputs of a vehicle can further assist in customizing the users feel and interaction with a particular vehicle.

This functionality provides a further dimension in customization for vehicles, at certain drivers prefer less technology while others prefer more technology, and others prefer simplified interfaces common in older vehicles. These customizations provide for less distraction to drivers and should improve safety, as the interfaces are provided in a way that is most comfortable to the specific user.

FIG. 37 illustrates an example of a car dashboard having interaction styles and screens and settings therefore, in accordance with one embodiment. In this example, the text and icons and language can also change for specific vehicle based on the configuration settings, interaction modes, and customize settings by particular users. In these examples, one interaction style can be a factory setting. The factory setting can provide definitions for adjustments that can be made to climate events, seat controls, windows, latches, and the like.

Furthermore, a senior mode can be provided with icons, text, language familiar to a specific user or demographic. Another example mode may be a fun mode, which allows more customization to certain features. This customization can be very complex and can also be descriptive instead of in the form of express settings. The descriptive inputs can be translated to specific inputs by the computer. It should be understood that these particular settings can be predefined by the user either in the vehicle, via a user device, at a website, or some other way that can be associate to a user account and a given profile of that account.

Learning can therefore take place over time for that specific profile. The user account may also be transferred from vehicle to vehicle if the vehicle supports application of interaction modes, or application of certain settings saved in a profile of the user account. It should be understood that some vehicles may not have interaction mode capability, but may allow customization of certain features automatically based on the user account.

This customization may allow for at least one or more features to be automatically transferred from one vehicle to another. In other more advanced vehicles, more configuration modes are settings can be transferred or used in specific vehicles. Accordingly, the amount of customization and dashboard transferability from vehicle to vehicle will vary from few to more features being configured or transferable, depending on the manufacturer, the software, the systems integrated therein, and the functionalities of the vehicle.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on board. The information collected and maintained by every vehicle may be mutually exclusive, meaning that each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most relevant information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In one embodiment, a method for customizing a user interface is provided. The method includes receiving a request to customize a user interface of a vehicle and providing selection options to identify a vehicle type among a plurality of vehicle types. Each vehicle type is associated with system components native to the vehicle type and one or more of the control interfaces that can be mapped to an application programming interface (API). The method includes identifying a plurality of applications available for the vehicle type, where each of the applications has a link to at least one of the control interfaces via the API of the system components. The method includes receiving selection of the vehicle type at cloud services, which interfaces with a website over the Internet or a backend of a website over the Internet.

The method includes receiving selection of an application selected from the plurality of applications; the selection of the application is made so as to add an app interface for the application to the user interface of the vehicle. The method, at cloud services, generates a custom configuration of the user interface for the vehicle type that includes system interfaces for some of the system components native to the vehicle type and the app interface for the application. The custom configuration is saved to a user account, at a database in cloud storage associated with cloud services. In one embodiment, code for the custom configuration is transferred to a vehicle that is to be associated with the user account. The code of the custom configuration is defined to set a display of the vehicle to provide the user interface having the system interfaces along with the app interface, the method is executed by one or more processors.

In some embodiments, the method includes receiving a request to modify the custom configuration; enabling changes to the selection of the application, the changes including adding additional applications or removing the application; regenerating the custom configuration with the changes; saving the custom configuration to the user account, and transferring the custom configuration having the changes to the vehicle.

In some embodiments, the method includes enabling identification of a second vehicle for the user account, the second vehicle having a second vehicle type.

In some embodiments, the method includes processing a request to transfer the custom configuration to the second vehicle. The processing of the request includes, automatically updating the system components for the second vehicle type, the system components of the second vehicle including more or less features based on the second vehicle type as defined by a manufacturer of the second vehicle; and determining if the application functions for the second vehicle type, and providing options to select an update for the application in response to processing the request to transfer the custom configuration when the application does not fully function for the second vehicle type.

In some embodiments, the manufacturer of the vehicle and the second vehicle is either the same or different.

In some embodiments, the method includes processing a request to use the custom configuration on a second vehicle. The processing of the request includes, receiving login credentials for the user account to enable the use of the custom configuration from the second vehicle, automatically updating the system components for the second vehicle type, the system components of the second vehicle including more or less features based on the second vehicle type as defined by a manufacturer of the second vehicle; and determining if the application functions for the second vehicle type, and if the application does not function for the second vehicle type, either omitting the application from the custom configuration or providing a replacement application for the application.

In some embodiments, the method includes maintaining a database of user accounts, each user account having one or more custom configurations of the user interface; processing a request to use a second custom configuration on the vehicle, the request being received from the vehicle upon entering credentials to access a second user account; transferring the second custom configuration to the vehicle for use while the credentials of the second user account are active on the vehicle, wherein the request to use the second custom configuration terminates use of the custom configuration in favor of the second custom configuration.

In some embodiments, the method includes terminating a session of use of the custom configuration on the vehicle, termination of the session acts to, reset the display of the vehicle to provide the user interface with system interfaces that are default set by the manufacturer of the vehicle; or set a second custom configuration for a second user account.

In some embodiments, the display of the vehicle includes any one or more of a main dashboard display, or a center console display, or a headrest display, or a movable display, or a wireless display, or a wire-connected display.

In some embodiments, the method includes receiving a request to make changes to add or remove applications from the custom configuration.

In some embodiments, the method includes enabling a user interface tool to arrange some of the system components and app components of the application on a display; the arranging includes defining positional locations for graphical user interface (GUI) items of the custom configuration.

In some embodiments, the method includes enabling linking of one or more applications executed on a mobile device to be presented on the display of the vehicle in accordance with the custom configuration, the linking enabled upon pairing the mobile device with electronics of the vehicle.

In some embodiments, the method includes receiving user input via the custom configuration, learning patterns of user input over time, and automatically programming one or more components of the custom configuration based on the learned patterns of user input.

In some embodiments, the method includes automatically adjusting positional locations for graphical user interface (GUI) items of the custom configuration based on the learned patterns; and saving the adjustments to the user account, the user account being saved in a database that is interfaced over the Internet with cloud services that execute code using one or more processors.

In some embodiments, the one programming of one or more components of the custom configuration includes automatically setting input based on times of day or days of week, or dates of month, or combinations thereof.

In some embodiments, the custom configuration of the vehicle is transferrable to a second vehicle.

In some embodiments, the custom configuration is saved to the user account in cloud storage, and cloud processing provides communication with the vehicle over the Internet.

In some embodiments, the cloud processing provides a website interface to enable selection of the vehicle type and the application to define the custom configuration and also enables updates to the custom configuration to add, delete or update applications to be associated with the custom configuration.

In some embodiments, the code for the custom configuration is transferred to the vehicle upon receiving credentials to access the user account from the vehicle so as to associate the vehicle to the custom configuration, the association of the custom configuration to the vehicle being for a period of time.

In some embodiments, the period of time is for a session that remains until logged out of the user account, or a second user account logs in to define a new session with a second custom configuration of the second user account.

In some embodiments, the vehicle electronics are programmed with a master account, the master account being in communication with cloud services over the Internet, the master account enabling use of the custom configuration with one or more restrictions.

In some embodiments, the restrictions include enabling, disabling or regulating system components of the vehicle, enabling or disabling certain applications of the custom configuration, wherein the restrictions being updateable over a website that enables remote configuration and monitoring of the vehicle using cloud services over the Internet for the master account, the master account enabling one or more user accounts to be used on the vehicle, such that one or more custom configurations are usable on the vehicle during respective sessions.

In some embodiments, the predefined code is application programming interface (API) for communicating with at least one control interface of the system component.

In one embodiment a computer implemented method is provided. The method provides providing access to cloud services over the Internet for customizing a user interface of a vehicle; providing selection options to identify a vehicle type among a plurality of vehicle types, each vehicle type being associated with system components native to the vehicle type; identifying a plurality of applications available for the vehicle type, each of the applications provided with code for linking to at least one control interface of the system components; receiving selection of an application selected from the plurality of applications, the selection of the application being made so as to add an app interface for the application to the user interface of the vehicle; generating a custom configuration of the user interface for the vehicle type that includes system interfaces for some of the system components native to the vehicle type and the app interface for the application; saving the custom configuration to a user account in a database interfaced with the cloud services; and transferring the custom configuration to electronics of a vehicle from database, the custom configuration being defined to set a display of the vehicle to provide the user interface having the system interfaces along with the app interface, the method being executed by a processor.

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention. Some embodiments are defined by combining features from embodiments defined throughout the present application and materials incorporated by reference.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a vehicle, user account, user device, or some target associated with a user account or profile.

Overtime, machine learning can be used to reinforce learned behavior, which can provide weighting to certain inputs. For instance, the more times a user turns on the windshield wipers when it is raining, and within two minutes of turning on the car, may signal that this patterns is likely to happen again. In another example, if a user stops to charge his vehicle at a particular charge station, which is 20 miles from his home, repeatedly on Tuesdays, at 6 pm, when nobody is a passenger in the vehicle, and the vehicle had less than 5% charge, may be used as a strong pattern that this may occur again in the future. This data, combined with other data, may be used to recommend data regarding the charge station in advance, so that the user need no look up the charge station to reserve a spot, or the like. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user or vehicle and user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "*Introduction to Machine Learning*", Second Edition, by Ethem Alpaydin, The MIT Press (ISBN 978-0-262-01243-0), Cambridge, Mass., London England (2010), which is herein incorporated by reference for all purposes.

In one embodiment, a display of a vehicle can include one or more displays. For example, a display screen of the vehicle may include any one or more of a main dashboard display, or a center console display, or a combined main dashboard and center console display, or a surface display, or a glass surface, or a windshield display, or a window display, or a touch surface display, or a headrest display, or a movable display, or a wireless display, or a wire-connected display, or combinations thereof.

In one embodiment, biometrics may be associated to the user account. The biometrics may be used to monitor use of the vehicle and determine if the custom user interfaces is to be enabled, or if a guest custom user interface is to be enabled, or if public custom user interface is to be enabled, or identify an interaction mode. The user account may include profile data defining when particular custom user interfaces are to be enabled or interactions modes are to be used. The biometrics may include one or more of image data of a driver's face, a passenger's face, a finger print, a retina scan, a signature, a gesture, a user input, a login, a key, a paring device, or combinations of two or more thereof.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

The invention claimed is:

1. A method, comprising,
receiving, by a server, data from a vehicle over a wireless network, the data includes information usable to identify a user account, the user account being accessible by the server to identify a profile of a user, the profile of the user includes preferences of the user and learned behavior of the user;
receiving, by the server, a geo-location of the vehicle for a time of day;
identifying, by the server, supplemental content that is available for sending to the vehicle based on the geo-location of the vehicle;
filtering, by the server, the supplemental content based on a contextual analysis of one or more preferences of the user, the learned behavior of the user, the time of day and the geo-location of the vehicle, such that the filtering eliminates sending supplemental content to the vehicle for display that is predicted to have a likelihood of not being used by the user based on said contextual analysis; and
sending, by the server, supplemental content to the vehicle for display to a screen or output via a speaker of the vehicle, the supplemental content that is sent is not filtered out from being sent to the vehicle.

2. The method of claim 1, wherein as geo-location of the vehicle changes from time to time based on geographic movements of the vehicle, the server continues to filter the supplemental content that is available for sending to the vehicle.

3. The method of claim 1, wherein the supplemental content sent to the vehicle is configured to be presented on the vehicle for a predefined period of time after receipt by the vehicle.

4. The method of claim 3, wherein supplemental content received by said vehicle is configured to fade-in to one or more screens and then fade-out after a period of time, the period of time of said fade-out being after the sent supplemental content is no longer contextually relevant to either the time of day or the geo-location of the vehicle.

5. The method of claim 1, wherein the likelihood of not being used by the user is further based on analysis of explicit preferences in the profile of the user or at least one learned preference of the user that is associated with said learned behavior.

6. The method of claim 1, wherein the likelihood of not being used by the user is further based on examination of user data obtained from one or more internet services holding data associated or related to the user, the server is configured to access said data.

7. The method of claim 1, wherein the server is one of a plurality of servers of a cloud system, the cloud system is configured to provide services to the vehicle and other vehicles, the server is configured to access one or more databases that hold information associated with user accounts, including the user account of the user.

8. The method of claim 1, wherein the contextual analysis of the time of day is used to identify one or more patterns for the time of day, the one or more patterns used to predict future behavior and said predicted future behavior is identified as learned behavior of the user.

9. The method of claim 8, wherein the one or more patterns for the time of day include traveling between or along geographic locations via the vehicle, the traveling being identified at least in part using the a geo-location of the vehicle.

10. The method of claim 9, wherein the contextual analysis of the time of day includes accessing calendar data of the user, wherein certain calendar data of the user provides information that enforces said likelihood of said supplemental content not being used during said time of day and for other times of day certain calendar data of the user provides information that predicts a likelihood that supplemental content may be used by said user if sent by the server to the vehicle.

11. The method of claim 1, wherein supplemental content sent to the vehicle for presentation on the screen is configured in accordance with an interaction mode setting,
wherein the interaction mode setting is configured to use the filtering to define or set an amount of said supplement content to be sent for presentation on the screen, the amount being for said time of day or for specific times of day.

12. The method of claim 11, wherein the interaction mode setting at least partially defines a style of user interfaces for the screen or screens of the vehicle, or a style of user interfaces of the screen or screens that identify one or more of text format, or gauge arrangement, or clutter level, or skins, or wallpaper, or layout styles, or design, or voice input/output display features, or combinations of two or more thereof.

13. The method of claim 1, wherein at least one aspect of one of the preferences is data obtained from an internet service or website, or social network, or internet accessible storage.

14. The method of claim 1, wherein the profile further includes data regarding an interaction mode, and supplemental content is not sent when a rule of the interaction mode identifies that the sending should not occur at least at a particular time, or based on a condition, or based on a conflict with learned data, or based on notification limitations defined by the interaction mode, or based on a clutter level setting, or for reducing distracted driving, or based on a combination of rules or settings, or based on a combination of two or more thereof.

15. The method of claim 1,
wherein the supplemental content sent is recommendation data;
wherein at least one aspect of one of the preferences is data obtained from an internet service;
wherein data obtained from the internet service is sent or received by the vehicle along with or in addition to the recommendation data, the data obtained from the internet service includes data or instructions for causing at least the screen of the vehicle to be populated with at least some of said supplemental content and data received from the internet service automatically or automatically launch an application by the vehicle for rendering specific supplemental content on the screen.

16. The method of claim 1, wherein at least one aspect of one of the preferences or at least some of the supplemental content is data obtained from an internet service, wherein the internet service is one of a website, or a calendar having data of a user associated with the user account, or social network website having data of the user associated with the user account, or a news site, or a dictionary site, or mapping service, or a to-do list of the user associated with the user account, or a phone list of the user associated with the user account, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet, or a combination of two or more thereof.

17. The method of claim 1, wherein the preferences associated with the profile of the user include data associated with a setting for an interaction mode that defines how information items of the supplemental content are to be displayed and when information items of the supplemental content are to be presented on the screen of the vehicle, wherein the interaction mode is customizable or customized for the user account, or customized over time based on use or computer learning.

18. The method of claim 17, wherein the interaction mode is selected from a range of modes that include simple modes that have less information items displayed on the display screen and reduce distractive notifications and intense modes that increase a number of information items displayed on the screen and increase information presented, and custom hybrids modes that select the level of information items and a level of notifications to be sent to the display screen, and a learning mode that enables dynamic changes to the information items and notifications based on use over time and predictive use, and combinations of simple, intense, hybrid, custom, and learning modes.

19. The method of claim 1,
wherein some of the supplemental content sent to the vehicle is associated with an identifier that describes when presentation is allowed to occur; or
wherein supplemental content sent is data that defines when the presentation should no longer occur after being received at the vehicle; or
wherein supplemental content sent is processed to avoid presentation if a determination is made that distracted driving is likely to occur based on one or more of a current geo-location, a current time, a current state of driving, a current speed, or detected traffic conditions.

20. The method of claim 1, wherein the profile of the user is associated with a type of interaction mode that is configured to dynamically change a display associated with physical inputs of the vehicle,
wherein the physical inputs can change in function, or complexity, or display, or tone, or color, or font, or text, or icons, or combinations thereof to be consistent or associated with the type of interaction mode.

* * * * *